United States Patent [19]
Dolgoff

[11] Patent Number: 5,300,942
[45] Date of Patent: * Apr. 5, 1994

[54] HIGH EFFICIENCY LIGHT VALVE PROJECTION SYSTEM WITH DECREASED PERCEPTION OF SPACES BETWEEN PIXELS AND/OR HINES

[75] Inventor: Eugene Dolgoff, Westbury, N.Y.

[73] Assignee: Projectavision Incorporated, New York, N.Y.

[*] Notice: The portion of the term of this patent subsequent to Jun. 4, 2008 has been disclaimed.

[21] Appl. No.: 659,596

[22] Filed: Feb. 21, 1991

Related U.S. Application Data

[63] Continuation-in-part of Ser. No. 290,040, Dec. 23, 1988, Pat. No. 5,012,274, which is a continuation-in-part of Ser. No. 140,233, Dec. 31, 1987, abandoned.

[51] Int. Cl.$^5$ .............................................. G09G 5/00
[52] U.S. Cl. ........................................ 345/32; 345/84; 345/90; 345/151; 353/38; 353/122; 348/749; 348/761; 348/833
[58] Field of Search .............. 340/701, 702, 783, 784, 340/785, 786, 787, 788, 794, 795, 815.17, 815.31, 705; 358/3, 60, 61, 62, 63, 88, 89, 230, 231, 232, 236, 241, 56, 251; 353/31, 32, 33, 34, 84, 122, 38; 359/40, 41, 42, 69, 70, 71, 720, 742

[56] References Cited

U.S. PATENT DOCUMENTS

| | | |
|---|---|---|
| 3,442,508 | 5/1969 | Rudas . |
| 3,523,717 | 8/1970 | Glenn, Jr. . |
| 3,824,003 | 7/1974 | Koda et al. . |
| 4,025,724 | 5/1977 | Davidson, Jr. et al. . |
| 4,127,322 | 11/1978 | Jacobson et al. . |

(List continued on next page.)

FOREIGN PATENT DOCUMENTS

| | | |
|---|---|---|
| 79596 | 1/1973 | Japan . |
| 59-214825 | 12/1984 | Japan . |
| 2916 | 8/1985 | Japan . |
| 179723 | 10/1985 | Japan . |

OTHER PUBLICATIONS

A. G. Dewey et al., 7.1/2:00 P.M.: A 64-Million Pel Liquid-Crystal Projection Display, SID 83 Digest, p. 36.

(List continued on next page.)

Primary Examiner—Jeffery Brier
Attorney, Agent, or Firm—Anderson Kill Olick & Oshinsky

[57] ABSTRACT

A light valve such as an active matrix LCD between crossed polarizers, utilizing, for instance, individual transistors to control each "pixel area" of the LCD and storage elements to store video signal data for each pixel, with optically shielded "dead spaces" between pixels to eliminate electric field crosstalk and non-information-bearing light bleed through, is illuminated with a bright independent light source which creates a video image projected via specialized projection optics onto an internal or external screen without distortions, regardless of the angle of projection onto the screen. Use of heat sinks, IR reflective coatings, heat absorbing optics, optional fluid and a thermistor controlled pixel transistor bias voltage injection servo circuit stabilizes image performance, maintaining accurate color and contrast levels as the LCD changes temperature. In one embodiment of the invention, use of a multi-color LCD with a stepped cavity, producing different thicknesses of LCD for the different wavelengths that pass through it, allows a linear correspondence between the wavelengths passing through the LCD to produce true black, high contrast and CRT-like color rendition. A dichroic mirror arrangement is used to overlap differently colored pixels in the projected image. Use of lens arrays to expand pixels, where necessary, eliminating spaces between pixels, creating a continuous image with no apparent stripes or dots. A special venetian-blind type of screen is also disclosed and methods for using the system to view three-dimensional video are also explained.

168 Claims, 34 Drawing Sheets

U.S. PATENT DOCUMENTS

| | | |
|---|---|---|
| 4,158,860 | 6/1979 | Irie et al. |
| 4,191,456 | 3/1980 | Hong et al. ............................ 358/61 |
| 4,215,762 | 8/1980 | Cunningham et al. |
| 4,349,817 | 9/1982 | Hoffman et al. |
| 4,365,869 | 12/1982 | Hareng et al. |
| 4,389,096 | 6/1983 | Hori et al. |
| 4,455,576 | 6/1984 | Hoshi . |
| 4,460,247 | 7/1984 | Hilsum et al. |
| 4,591,902 | 5/1986 | Masubuchi . |
| 4,611,245 | 9/1986 | Trias . |
| 4,632,514 | 12/1986 | Ogawa et al. |
| 4,635,127 | 1/1987 | Togashi . |
| 4,672,457 | 6/1987 | Hyatt . |
| 4,680,579 | 7/1987 | Ott . |
| 4,730,211 | 3/1988 | Hasegawa . |
| 4,733,948 | 3/1988 | Kitahara . |
| 4,739,396 | 4/1988 | Hyatt . |
| 4,745,485 | 5/1988 | Iwasaki . |
| 4,748,510 | 5/1988 | Umezawa . |
| 4,766,430 | 8/1988 | Gillette et al. |
| 4,864,390 | 9/1989 | McKechnie et al. ............... 340/784 |
| 4,904,061 | 2/1990 | Aruga . |
| 4,984,091 | 1/1991 | Murata ................................ 358/244 |
| 5,005,968 | 4/1991 | Tejima et al. ....................... 358/251 |
| 5,046,827 | 9/1991 | Frost et al. ............................ 359/54 |
| 5,161,027 | 11/1992 | Liu . |
| 5,161,042 | 11/1992 | Hamada ................................ 359/41 |

OTHER PUBLICATIONS

Morozumi et al., 4.25-in. and 1.51-in. B/W and Full-Color LC Video Displays Addressed by Poly-Si TFTs; SID 84 Digest; p. 316.

Morozumi et al., 20.4: LCD Full-Color Video Projector; SID 86 Digest, p. 375.

Aruga et al., 6.4 High-Resolution Full-Color Video Projector with Poly-Si TFT Array Light Valves, SID 87 Digest, p. 75.

7.5/4:00 P.M.: An 8' Display Using a Laser-Addressed White-on-Black Mode Liquid Crystal Light Valve, SID 83 Digest, p. 44.

F. Funada et al., 16.5: An Amorphous-Si TFT Addressed 3.2-in. Full-Color LCD SID 86 Digest, p. 293.

S. Hotta et al., 16.6: Full-Color Multi-Gap LC-TV Display Panel Addressed by a-Si TFTs, SID 86 Digest, p. 296.

F. C. Luo et al., 15.3: A 640×400 CdSe TFT-LC Display Panel, SID 85 Digest, p. 286.

FIG. 4
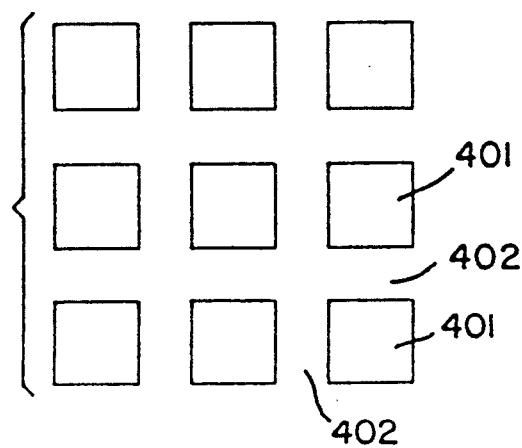
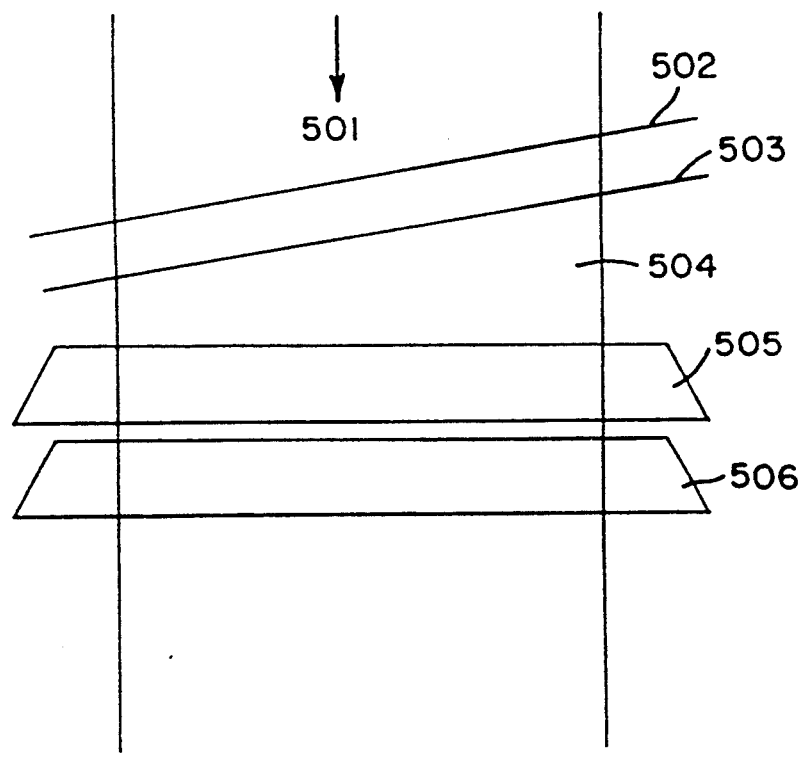
FIG. 5

FIG. 15d
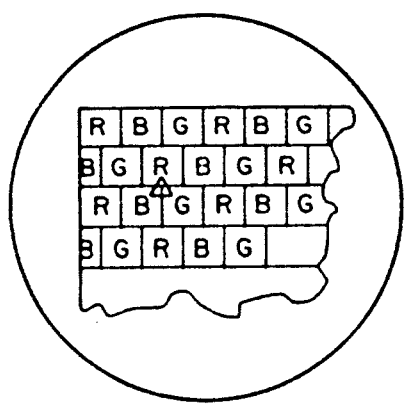
FIG. 15c
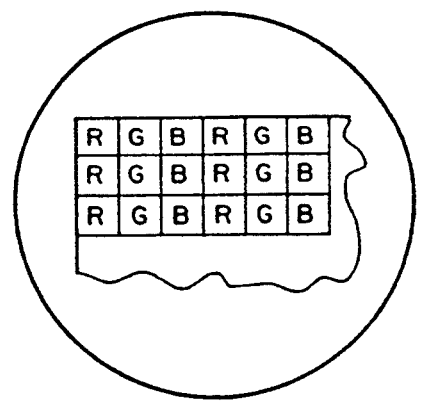
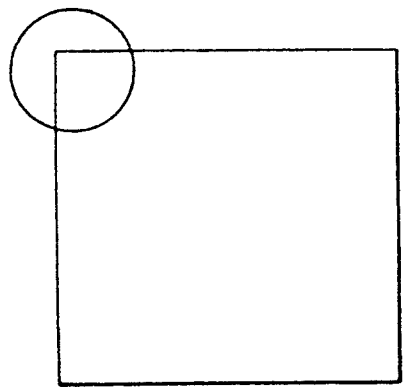
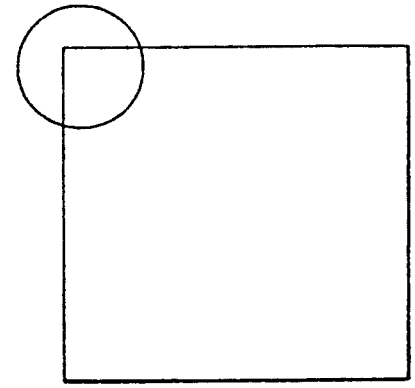
FIG. 15b
FIG. 15a

HIGH EFFICIENCY LIGHT VALVE PROJECTION SYSTEM WITH DECREASED PERCEPTION OF SPACES BETWEEN PIXELS AND/OR HINES

This is a continuation-in-part of U.S. patent application Ser. No. 07/290,040, entitled "An Active Matrix LCD Image Projection System," filed Dec. 23, 1988 now U.S. Pat. No. 5,012,274, which is a continuation-in-part of U.S. application Ser. No. 07/140,233, entitled "An Improved Video Display System," filed Dec. 31, 1987 now abandoned.

FIELD OF THE INVENTION

The present invention relates generally to video and data display devices and more particularly to an improved video display system employing light valves such as an active matrix LCD in conjunction with novel projection optics.

BACKGROUND OF THE INVENTION

The mainstay of electronic imaging, since its beginnings, has been the cathode ray tube (CRT) or kinescope. Although CRT technology has progressed over the years, several major drawbacks remain. Picture size is still limited, making group viewing difficult. CRT picture tubes larger than about 30" (measured diagonally) become impractical because of size, weight, expense and danger of implosion because of the high vacuum used. To achieve high brightness they use dangerously high voltages and may produce health hazards from x-rays and electromagnetic fields.

Image quality of CRT-based video displays may be degraded by color distortion, image shape distortions, color impurity from the influence of the earth's magnetic field, and color misconvergence. In addition, CRT displays are subject, particularly when viewed at close range, to visual artifacts such as scanning lines and discrete phosphor dots or stripes, which are inherent in such TV displays. These visual artifacts provide a poorer image quality than images in movie theaters.

Research has been continuing on for many years to develop other types of light emissive displays which would overcome some of these drawbacks. Plasma, electroluminescent (EL) and cold cathode phosphor displays are among the most promising candidates, although they have not proved themselves to be practical. Furthermore, it is highly questionable whether these other emissive displays, if and when successful, would provide any advances over current CRT brightness or size in practical applications.

"Pocket Tvs" with a 2" to 3" picture are constructed today using liquid crystal displays which are addressed via electronic multiplexing or active matrix addressing. Creating a large picture for direct viewing however poses many problems which have heretofore not been overcome. Simple multiplexing cannot produce a satisfactory image because of cross-talk. An active matrix relieves the cross-talk problems, but has so many more production steps and so many switching and storage elements that must be deposited over a large surface area that production of large, defect-free active matrix displays for direct viewing has not been possible and may never be economically feasible for very large displays.

Demand for large video imaging systems and for thinprofile or "flat screen" imaging systems, both large and small, has increased significantly in recent years and is expected to increase dramatically with the advent of high definition television broadcasts. "Projection televisions" have been developed and commercialized in recent years. Unfortunately, such projection display devices have exacerbated many of the problems associated with earlier video display systems and have created new problems. Projection televisions are more expensive than standard direct-view televisions and are more cumbersome, heavier, and larger so that portability is impractical. Two types of projection television systems have become popular: one using three CRTs with projection lenses and the other using an oil film scanned by an electron beam.

The CRT-based projection system remains relatively dim, requiring a dimly-lit viewing environment and a costly special screen which provides a very limited viewing angle. The three CRTs produce images in the primary colors, blue, green, and red and are driven with higher anode voltage than conventional systems to obtain as much brightness out of them as possible. The higher anode voltage lowers tube life and increases the radiation hazards and other problems associated with high voltage. The three tubes also increase the danger of tube implosion. The standard oil-based system, referred to as an Eidophor, has three "scanned oil elements" which have a relatively short life and uses external light sources. In either system, all three color images utilizing three sets of optics must be precisely converged onto the viewing screen, in addition to requiring adjustments of hue, saturation, vertical and horizontal size and linearity, and minimization of pincushion and barrel distortion. Proper alignment in either system is therefore beyond the abilities of the average person. Proper convergence is not easily achieved and often requires up to a half hour of additional set-up time because of the curvature of the lenses and variations in the performance of the circuits in either system. If the projector or screen is moved, the convergence procedure must be repeated.

Experimentation has also been performed on laser systems which scan out an image on a viewing screen in the same way an electron beam scans the image onto the face of a CRT. The laser systems developed thus far are much too large to be portable, very complex to use and maintain, extremely expensive, potentially dangerous and have proven too dim for large images.

Many attempts have been made to solve the above-mentioned problems, resulting in experimentation on several novel "light valve" based systems. This type of system uses an external light source which can theoretically be as bright as desired, with a "light valve" to modulate the light carrying the picture information. The research and experimentation to develop a workable light valve system has been primarily directed to using different optical, electronic, physical and other effects and finding or producing various materials to accomplish the desired results. The various light-valve system attempts have mainly utilized crystals (such as quartz, Potassium Di-Hydrogen Phosphate, Lithium Niobate, Barium Strontium Niobate, Yttrium Aluminum Garnet and Chromium Oxide), liquids (such as Nitro Benzene) or liquid crystals (of the smectic or nematic type) or a suspension of particles such as iodoquinine sulphate in a liquid carrier) or other similar materials to take advantage of one or more optical effects including electro-optical effects, such as creating a rotated plane of polarization or altering the index of refraction of the material due to an applied electric field, magneto-optical effects using an applied magnetic field, electro-striction effects, piezo-optical effects, electrostatic particle orientation, photoconductivity, acousto-optical effects, photochromic effects and laser-scan-induced secondary electron emission. Except for liquid crystal light valves, such light valves proved impossible to manufacture economically and with a sufficiently large aperture and have often been toxic, dangerous, and inconsistent in production quality.

In all light valves, different areas must be supplied different information or "addressed," so that a different amount of light emerges through each area, adding up to a complete picture across the total beam of light. Techniques for addressing different picture elements (or "pixels") of a light valve have included methods for deflecting a laser or electron beam to that area or the use of a tiny criss-cross of electrically conductive paths, i.e., a matrix, deposited on or adjacent to the material to be addressed in order to activate that area of the matrix. In scanning beam systems, problems have included outgassing and erosion of material. The electrical matrix system has proved difficult to engineer, requiring deposition with extremely high precision of a transparent material having good conductivity characteristics. Further, such matrices must be driven by extremely fast switching circuits, which are impractical at the high voltages required to activate a given area of most materials.

The most frequently used system for addressing small areas is often referred to as electronic multiplexing. Electronic multiplexing works well with only low voltage-requiring materials such as liquid crystals. With this method, all pixel addresses are x and y coordinates on the conductive grid. To activate a given pixel area a specific amount, different voltages must be applied to the x and y conductors so that, where they meet, they together exceed a threshold voltage and modulate the area. A major drawback to such multiplexing is crosstalk, where surrounding areas are affected by the electric field, causing false data to influence surrounding pixels, reducing contrast and resolution, as well as color saturation and accuracy. The crosstalk problem increases when resolution increases because liquid crystal materials respond fairly linearly to applied voltage. Since all pixels are interconnected within the same system, all pixels are given partial voltage and are, thus, partially activated when any one pixel is addressed. Non-linear materials can be added to the liquid crystal mix, but this still doesn't allow for more than about 160 lines of resolution before crosstalk significantly degrades the image.

An "active matrix" light valve in which all pixels from the matrix are selectively disconnected except for those pixels which are addressed at any given time eliminates the crosstalk problem, regardless of the number of pixels or lines in a display. Recently, active matrix displays have been made utilizing transistors, diodes, or an ionizing gas as the switching element to disconnect the pixels.

Since liquid crystal light valves have very little persistence and one pixel or line of pixels is activated at a time, substantially less light is projected to the screen to be ultimately viewed since all pixels are "off" most of the time. This characteristic wastes light, produces a dimmer image with poorer contrast and generates more heat because of the brighter source necessary to compensate for the dim image. High refresh rates are impractical because they would require faster switching times and faster responding material.

Active matrix displays, however, also utilize a storage element, such as a capacitor, connected to each pixel, which allows each pixel to retain the proper charge, and thus, the proper transmissivity after the pixel has been addressed and disconnected from the system. Thus, each pixel remains "on" the correct amount all the time. This increases light throughput and eliminates flicker.

If high-wattage light sources are used in order to achieve very bright displays, heat sensitivity can cause a decrease in contrast and color fidelity. Absorption of high intensity light by color filters an polarizers (if used), even if little or no infrared light is present, results in heating of these elements which can also degrade image quality and may even damage the light valve. Use of fan cooling causes objectionable noise, especially in quiet environments when source volume is kept low.

Another inherent problem of light valve projection systems relates to the fact that each pixel of the frame is surrounded by an opaque border that contains addressing circuitry or physical structure. This results in visibly discrete pixels and contributes an objectionable "graininess" to the image that becomes progressively more annoying when viewed at close distance or on large screens. The problem is amplified if a single fullcolor light valve is used in which the individual red, green, and blue color elements of each pixel are not converged or blended and are visible to the viewer.

Consequently, projection by means of a small light valve provides the most practical and economical way to produce a large, bright image. Unfortunately, such light valve projectors have, up to the present, exhibited several shortcomings which fall generally into at least four broad categories, namely:
1) light valve restrictions;
2) light source limitations;
3) optical system inefficiencies; and
4) screen performance weaknesses.

These problems must be addressed to allow for the successful production of acceptable quality, practical display systems, capable of large projection imagery and display of small or large images from a device with a "thin profile."

To address these and other problems associated with prior art video display systems, it is an object of the present invention to provide an adjustable size video image which can be very large, yet possess high quality and sufficient brightness to be visible from wide viewing angles without distortions, in a normally lit room as well as in environments with high ambient light.

Furthermore, an object of the invention is to create a video display system which utilizes a light valve such as a specially constructed LCD light valve, an independent light source with a long life, high brightness, average luminance, and color temperature, and novel optics, providing for high light efficiency for front or rear projection and which operates without excess heat or fan noise.

Another object of the invention is to produce such a system with high resolution and contrast (eliminating the appearance of stripes, pixels, or lines), with highly accurate color rendition (equal to or better than that of a CRT).

An additional object of the invention is to produce a display that reduces eye strain by the elimination of flicker and glare and by the broadening of color peaks.

A further object of the invention is to produce a small, lightweight, portable system, having a long maintenance-free operating life, which is operable in conjunction with or without a special screen and can be mass-produced relatively inexpensively.

Yet another object of the invention is to produce a system which requires no convergence or other difficult adjustments prior to viewing.

Still another object of the present invention is to produce a system with greatly reduced radiation and hazard of tube implosion and operates with relatively low voltage.

An additional object of the invention is to produce a system which does not require a special screen, can be easily projected onto a wall or ceiling, and can be viewed comfortably at relatively wide angles.

A further objective of the invention is to produce such a system capable of three-dimensional projection.

Additional objects of the invention include the creation of a system which will overcome drawbacks associated with CRTs in terms of weight, bulk, high voltage, radiation, implosion hazard and convergence difficulty in 3-CRT projection systems.

Further objects will include increasing image contrast, color reproducibility, resolution and yield while reducing color pixel visibility, flicker, heat sensitivity, image artifacts, system cooling noise and bleedthrough of non-image bearing light, while decreasing the cost and complexity of light valve systems.

Additional objects of the invention involve creating a system to overcome and improve upon light source limitations by increasing brightness efficiency, average luminance and color temperature, while lengthening bulb life and reducing the weight and bulk of the power supply.

Yet additional objects of the invention involve creating a system with improved light collection, decreased light losses due to color selection and polarization, decreased light valve aperture ratio losses and other non-image light waste.

Further objects of the invention involve creating a system which involves improving performance by use of particular screen materials with reduced light absorption, while reducing lenticular-lens-pattern image degradation, off-axis projection distortion and off-axis brightness fall-off, while reducing the effect of glare and ambient light to image visibility.

Moreover, it is an object of the invention to create a system which minimizes and virtually eliminates the wasted space of projection distance and enables three-dimensional projection.

Other objects will become evident from the disclosure.

SUMMARY OF THE INVENTION

These and other objects of the invention which will become apparent hereafter are achieved by "A HIGH EFFICIENCY LIGHT VALVE PROJECTION SYSTEM" employing a light valve, such as a liquid crystal display (LCD) device, for the formation of an image utilizing an "active matrix" for electronically addressing and activating each of the liquid crystal elements in the matrix. The matrix is "active" in that a separate transistor or other suitable material is adjacent to each picture element or "pixel" to control each pixel and a storage element, such as a capacitor, is employed to store the respective pixel video signal. The system further comprises a direct projection optics arrangement which includes a light source for illuminating the light valve, optics which collimate light from the source and improve light throughput efficiency and quality of the projected image and a lens system for projecting and focusing an image from the light valve onto a viewing surface.

An important aspect of one embodiment of the invention is the use of a dichroic mirror system to superimpose color pixel triads from a single, multicolored LCD to form full-colored pixels with spaces between them.

Another aspect of one embodiment of the invention relates to the filling of spaces between pixels. These spaces may be filled using a 4-mirror system, in which a first striped mirror pair duplicates each pixel and the image is shifted horizontally into the spaces which previously existed between pixels. A second mirror pair duplicates the newly created rows of pixels and shifts the original and the duplicated pixel images vertically to fill the remaining spaces between pixels.

Other methods are described for the filling of spaces between adjacent pixels through the use of an expanding lens array and a collimating lens or a second collimating lens array to expand and collimate individual images of the pixels.

The invention will be better understood by the Detailed Description of the Preferred Embodiment in conjunction with the appended drawings, of which:

BRIEF DESCRIPTION OF THE DRAWINGS

FIG. 4 is a schematic view of a projected image of superimposed "full color pixels";

FIG. 5 is a schematic view of a four-mirror system depicting a method of filling in spaces between adjacent pixels;

FIG. 15a is a schematic view of color filters on corresponding color-pixel areas in a full-color LCD;

FIG. 15b is a schematic view of an alternate arrangement of pixels in which three pixels of a color triad are indicated by a triangle;

FIG. 15c is an enlarged view of a portion of a color pixel area designated in FIG. 15a with a circle;

FIG. 15d is an enlarged view of a portion of the alternative arrangement of pixels shown in FIG. 15b and also designated with a circle;

FIG. 23b is a schematic side view of a technique utilizing mirrors to compensate for path length differences of beams travelling from the light valve to the projection lens in the embodiment of the present invention shown in FIG. 23a;

DETAILED DESCRIPTION OF THE PREFERRED AND ALTERNATE EMBODIMENTS

The present invention is directed to A HIGH EFFICIENCY LIGHT VALVE PROJECTION SYSTEM. This overall system was devised to overcome the problems of video display systems and to meet the objectives delineated in the "Background of the Invention" section.

The most promising technology available to circumvent CRT problems is light valve technology. This technology uses an external light source and a "light valve," which modulates the light source, imposing image or data information on the light beam, so that the beam can be projected onto a viewing surface. Utilizing the same strategy as in a CRT projection system, a light valve projection system can be constructed to produce a brighter image than a CRT projection system. Such a system could also be produced to display black and white, monochromatic, or full-color images.

Of all known light valve video display systems, the one which presents the greatest potential for solving the problems associated with CRTs is the LCD with a conductive matrix for addressing, utilized in transmissive or reflective mode, taking advantage of the polarization/rotation, birefringence, or scattering capabilities of the liquid crystals. Various changes must however be made to current video display designs which use electronic multiplexing to eliminate the current problems. Although LCD technology is preferred at this time, most of the present invention is applicable to light valve technology in general and is to be interpreted with that broader view in mind.

Figure 1:
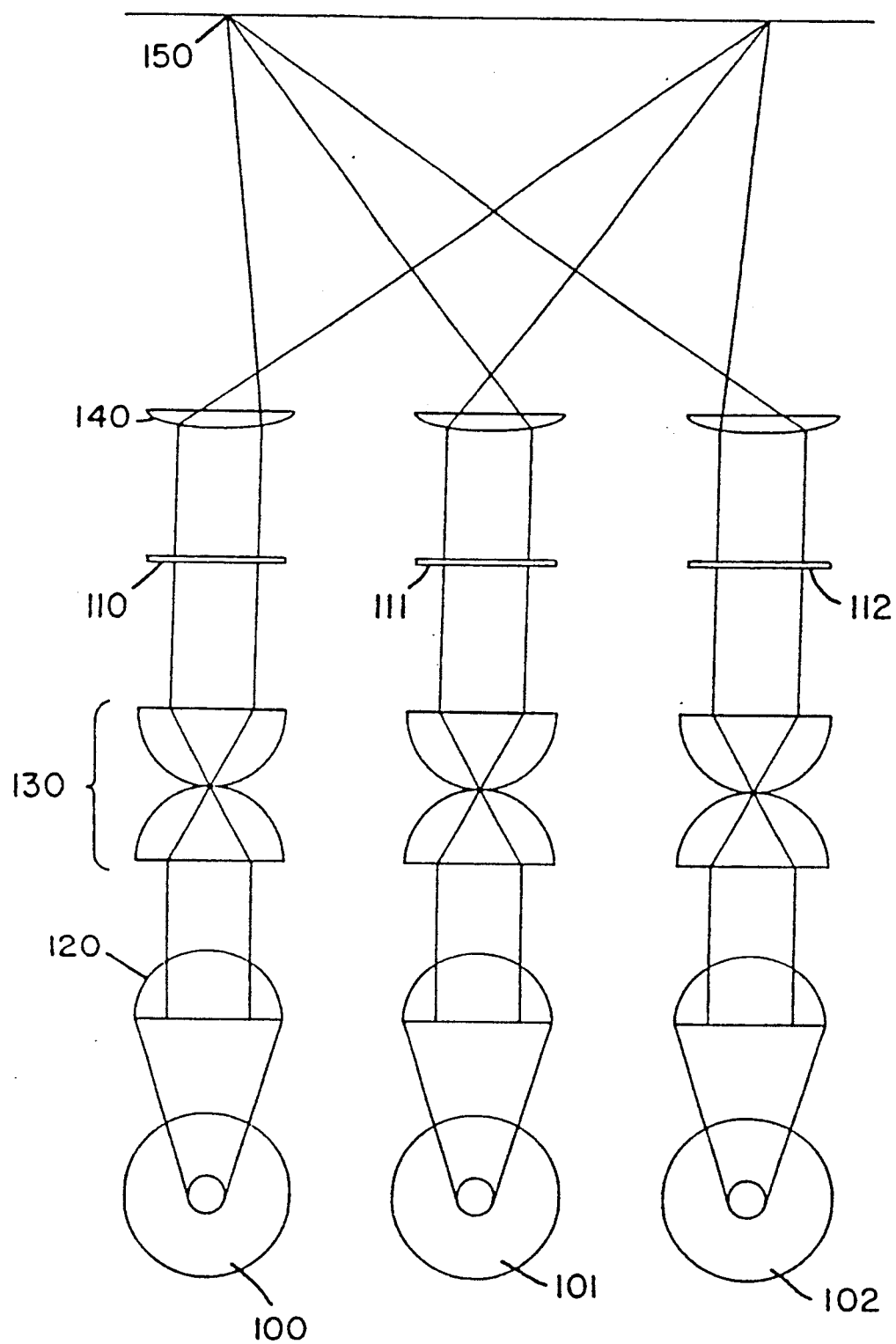
FIG. 1 is a schematic view of the invention depicting three LCDs projecting their image onto one common screen.
Figure 2:
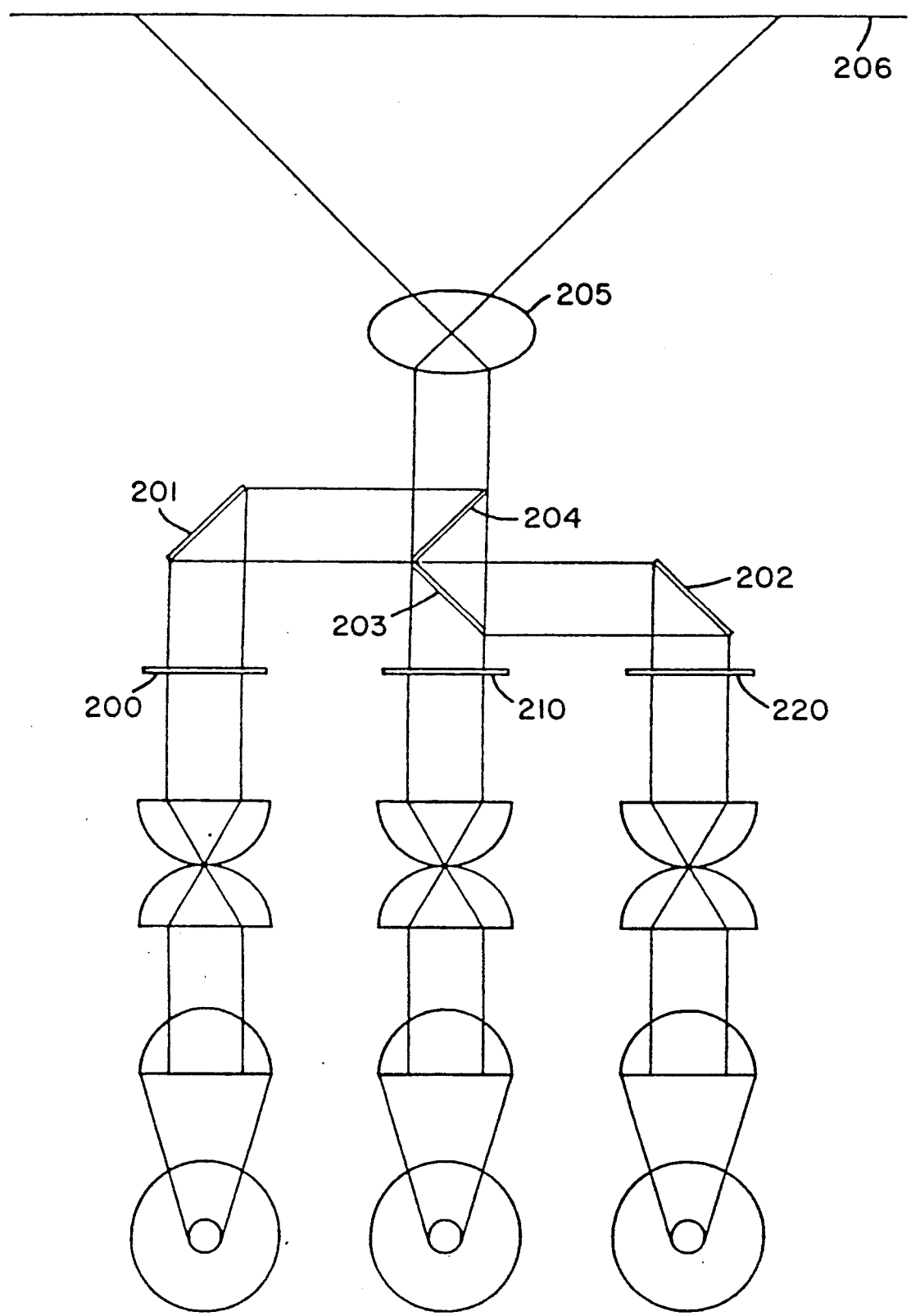
FIG. 2 is a schematic view of a modified embodiment of the present invention in which the images of three LCDs are internally superimposed and projected onto a common screen employing one set of projection optics.

FIG. 1 shows three light valves, one displaying red 110, one green 111 and one blue 112 picture data, each light valve illuminated with light of the appropriate color (100, 101, 102). The red light from source 100 is collected by condenser 120, collimated by collimating optics 130 and projected by projection optics 140 which focuses a red image on screen 150. Similarly, the green and blue images are projected and made to converge on the screen, forming a full color image. The disadvantage of this full-color system, however, is that adjustments must be made to the optics to converge the images whenever the projector or screen is moved. The need for convergence is eliminated in the present invention by the use of dichroic mirrors and a single projection lens as schematically shown in FIG. 2. Red image information from light valve 200 reflects off front-surface mirror 201 to dichroic mirror 204 which reflects red light but passes blue and green light. Blue image information from LCD 220 reflects off front surface mirror 202 and then off dichroic mirror 203, which reflects blue light but permits green light to pass and then passes through dichroic mirror 204. A totally registered full-color image is thus projected by projection optics 205 onto screen 206. Convergence is always perfect, regardless of repositioning of the projector or screen. The same invention can be applied to making a CRT projector alleviate convergence problems.

If a picture is to be a mosaic of red, blue and green pixels, each pixel must acquire a precise amount of current to reproduce the brightness of each picture element's originally broadcast brightness, as well as its color rendition. Although present LCD TV displays using electronic multiplexing produce a satisfactory small image, when such images are projected to a large picture, the transmitted light never reaches zero, causing low contrast. Additionally, with electronic multiplexing, crosstalk and electronic "bleed through" to neighboring pixels reduces resolution and color fidelity. Furthermore, light is wasted and the picture appears dim with each pixel being turned on for only part of a scanning field. The image cannot be refreshed sufficiently and so flicker, as well as brightness efficiency, is dependent on the persistence of the LCD, which is not adjustable.

To solve the above problems, applicant's system can include a light valve in which the data used to address each pixel is stored, causing that pixel of the light valve to remain activated the desired amount of time until new data is received, dictating a different value for that pixel The data may be stored by various means, but preferably in a capacitor which is disconnected from the charging circuit immediately after it is charged so as to remove the path for capacitive discharge.

Network analysis shows that when a given pixel is addressed through its X and Y conductors, one-third of its addressing voltage will also appear across other pixels. Since liquid crystal materials are fairly linear, this results in partial activation of incorrect pixels with false data. This can be alleviated by adding means to restrict the liquid crystal from being activated by increasing the threshold voltage of the liquid crystal, making its response to voltage non-linear, or by adding a switching mechanism to disconnect the pixel from the circuit until it is to be addressed. The preferred way to accomplish this is by adding a "switch" to each pixel, creating what is known as an "active matrix" addressing system.

Figure 18:
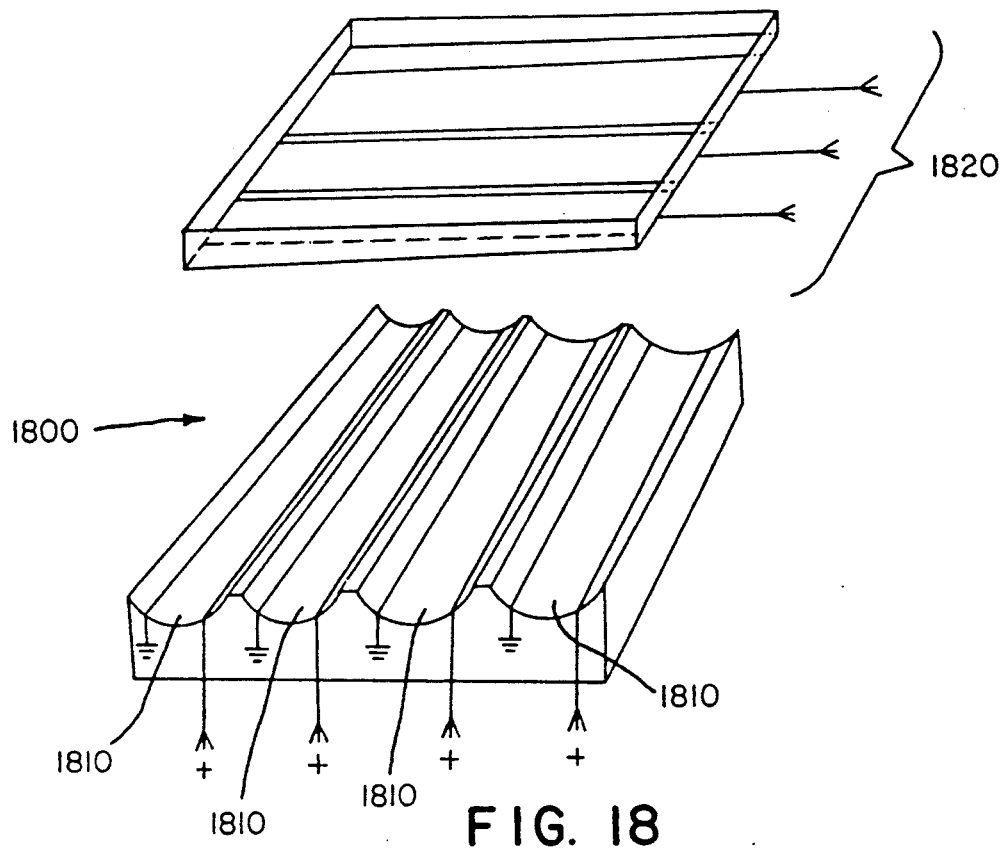
FIG. 18 is a schematic view of an active matrix liquid crystal display which utilizes a gas as a switching element to disconnect pixels from the circuit.

For instance, as shown in FIG. 18, an X-Y matrix of pixels made of transparent conductive material, such as indium tin oxide, is coated on the inner faces of a glass container which is filled with liquid crystal material 1800. Each pixel in a given horizontal row on one face is put in contact with a gas such as helium in a reservoir 1810 which requires a threshold voltage to ionize it and create a path for current flow to the pixel electrodes in the row. The corresponding pixel electrodes 1820 on the opposite glass plate are connected, for instance, to video signal inputs along vertical lines. When a threshold voltage is reached at which the gas for a given row on the first glass plate becomes ionized, the video signals applied in vertical columns to the corresponding pixel electrodes on the opposite glass plate charge those pixel electrodes, the liquid crystal material between the plates acting as a dielectric to form a capacitor. Immediately thereafter, removal of the threshold voltage necessary to ionize the gas leaves the pixel electrode capacitors along the horizontal row charged the required amount to maintain the polarization rotation through the liquid crystal material along that row until new data is available to replace the data already stored.

Alternately, an "active matrix" can be created by the deposition of a thin film transistor next to each pixel and by using a storage element at each pixel. Each transistor receives a gate signal, turning it on and allowing the conduction of a video signal voltage to the pixel associated with the transistor that is turned on. When the transistor is switched off (by removing the gate signal), the pixel electrodes with liquid crystal material between them act as a capacitor storing the charge and maintaining the state of activation of the liquid crystal material until changed by a new signal. An additional capacitor can be added to maintain the charge if the liquid crystal material has too much charge leakage.

This way, each pixel can be addressed, turned on (to transmit or reflect light) and will remain on until data for the next frame is presented. With this system, flicker can be eliminated as in a progressively scanned picture. Each pixel will be on for the entire length of a frame, immediately changing to the appropriate level of transmissivity or reflectivity for the pixel in the next frame. Each pixel will be on (the desired amount) all the time, allowing the highest throughput of light from the external light source. State of the art methods of deposition of semiconductor material can be utilized to mass-produce such an active matrix system.

The light valve can be used in conjunction with direct projection optics. A general overview of the present invention is depicted schematically in FIG. 17 as comprising a light source 1700 from which emerges a beam of light, collimating optics 1710 which collimates the beam, including a spherical or parabolic reflector 1720 which reflects the beam, a condensing lens 1730 which focuses the beam forward and collimating lenses 1740 which again collimate the beam. The light valve (or light valves) 1750 is illuminated by the collimated beam, creating a full-color optical image thereupon. Projection optics 1780 then focuses this image onto a viewing surface 1790. To improve the quality of the projected image as explained further herein, subsystem 1760 is used to superimpose pixels of color triads forming full-color pixels with spaces between them and subsystem 1770, also explained herein, may be used to fill in the spaces between pixels.

An active matrix light valve made by the deposition of thin film transistors also has significant drawbacks. The chances for defects such as shorts and opens abound because of the small feature dimensions, the many layers of deposition and the high density of conductive paths, transistors, and other features in such light valves. A simple defect can cause an entire row of pixels to be permanently on or permanently off and can render an entire display useless since defects projected onto a screen become very noticeable and unacceptable. The display yield accordingly goes down dramatically as the resolution and/or size of the display increases and the cost of an acceptable display dramatically increases. Techniques such as redundant transistors at each pixel, redundant conductive pathways and the use of a laser to eliminate shorted transistors or pathways have been devised to compensate for such defects. However, even with these techniques, many defects are not correctable, keeping yield low and costs high.

Figure 19:
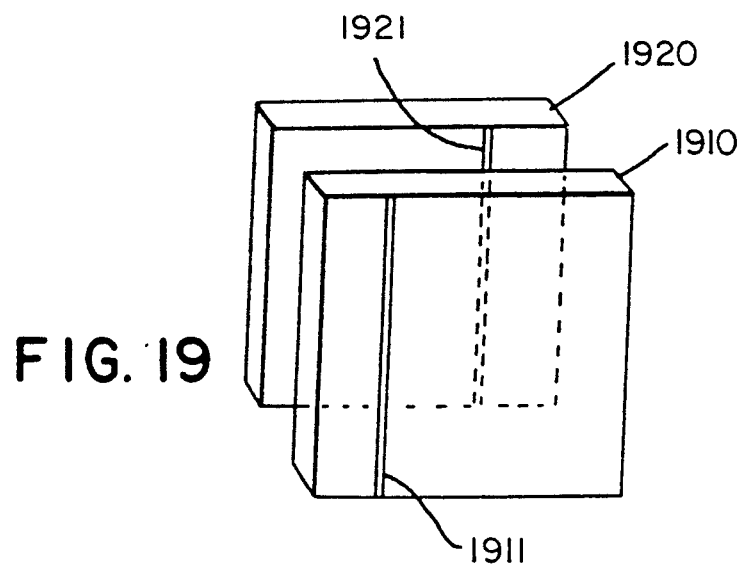
FIG. 19 is a schematic view of an embodiment of the electronic image projection system in which two light valves are placed together, where one light valve would compensate for defective pixels in the other light valve.

Applicant's technique of placing two otherwise unacceptable displays back-to-back with appropriate display drivers greatly increases the yield and reduces the cost of producing active matrix displays. (See FIG. 19.) Although each display 1910 and 1920 separately is unacceptable because of its relatively few uncorrectable defects, 1911 and 1921, respectively, two rejected displays can be combined where the defects in one do not correspond to the defects of the other. The output faces or the input faces of the two displays must be facing one another in a conventional LCD which has a twist angle of 90 degrees (unless a half wave plate is placed between them). This way, vertically polarized light, for instance, entering the input face of the first display is rotated 90 degrees by the liquid crystal material when no current is applied, exiting as horizontally polarized light. It can now enter the output face of the second display and be rotated by the liquid crystal material to become vertically polarized and exit the input face of the second display. Consequently, no polarizer need be placed between the displays.

Although transmission light valves are preferred in applicant's system, reflection light valves could be used as well. When utilizing liquid crystals as the active medium, use of the twisted nematic effect is currently the most common method of modulating the light to produce a satisfactory image. However, use of the twisted nematic effect does not work well in a reflection light valve. This is because polarized light which enters the light valve (polarized, for example, in the vertical direction) will rotate 90 degrees, hit the rear reflector and rotate back 90 degrees upon passing a second time through the twisted nematic cell. Thus the light will exit predominantly as it went in with the initial polarization. When there is a signal causing a voltage to be imposed on the liquid crystal material, the nematic liquid crystals will become perpendicular to the cell faces to some degree (depending on voltage), losing their twisted orientation with respect to the light. Thus, light entering the cell will pass through the cell and reflect back out unaltered. Thus, whether or not a voltage is applied, light comes out of a reflective cell unaffected by the twisted nematic effect.

A reflective liquid crystal cell can work utilizing scattering or the birefringence of the liquid crystals A reflective active matrix light valve can be constructed in many ways. For instance, a single silicon chip can be made into an active matrix utilizing state-of-the-art silicon chip fabrication technology such as proposed by Hughes in the 1970s with reflective pixel electrodes on the silicon chip made of a material such as aluminum. The opposite faces of the cell can be made of glass with transparent indium tin oxide pixel electrodes.

Figure 20:
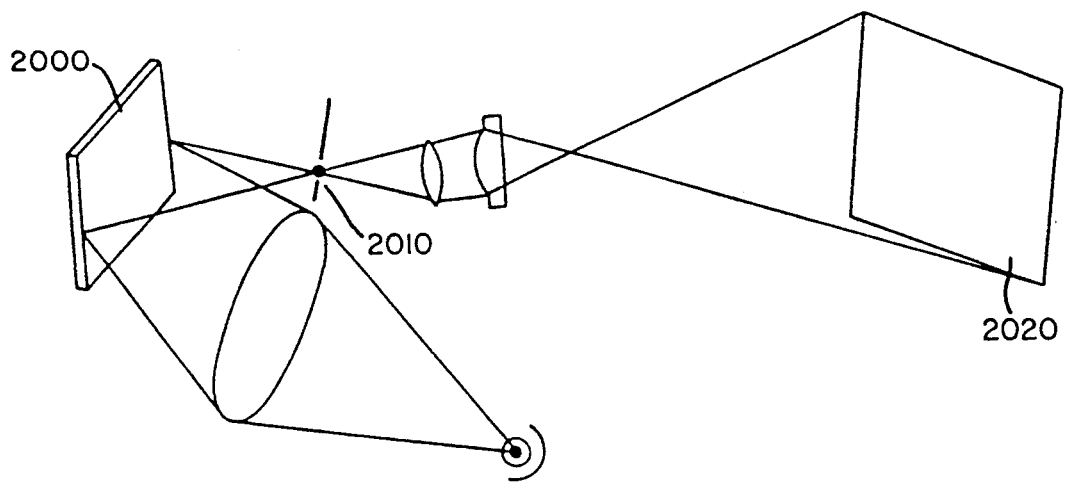
FIG. 20 is a schematic view of a projection arrangement utilizing a reflective light valve.

Utilizing the scattering effect (see FIG. 20), light which enters the cell 2000 can hit a specularly reflecting back surface and reflect out of the cell for focusing, for instance, through an aperture 2010, as in a Schlieren type optical system. When a voltage is applied in a given area, light is scattered in proportion to the voltage, preventing it from being focused through the aperture on to the screen 2020. To make use of the birefringence of liquid crystal molecules, a cell can be constructed wherein the liquid crystal dipoles are oriented either parallel or perpendicular to the faces of the cell or somewhere in between, depending upon the applied voltage. In this case, polarized light entering the cell when the molecules are oriented perpendicular to the faces of the cell, will emerge from the cell after reflection from a rear reflective surface with its polarization unchanged. However, with the proper cell thickness when the dipole molecules are completely or partially parallel to the cell's faces, the birefringence of the liquid crystal molecules will cause the liquid crystal material to act like a quarter wave plate of varying efficiency. Thus, after passage in and out of such a reflective cell, polarized light will have its plane of polarization rotated, to some degree (up to 90 degrees) depending upon the voltage applied (double passage through the cell making the cell operate as a half wave plate).

Heat and IR radiation generated by the required projection bulb are sources of lowered resolution and contrast as well as color and gray-level distortion, and could damage the light valve. Heat and IR, like the light, irradiates the light valve in a Gaussian-like pattern, causing a "hot spot" in the center of the light valve. Even if the damage threshold is not reached, image degradation could still occur because the light valve expands, increasing the distance light must travel through it. When the polarization rotation effect is used, the rotation of the plane of polarization of the light passing through the light valve could change, throwing off contrast, resolution and color and gray-level rendition in a Gaussian-like pattern.

Several steps may be taken to deal with the detrimental effects of heating of the light valve. First, all optics including the light valve, should be mounted with good contact to large heat sinks, as is done, for instance, with power transistors. Optics in the system, including the light valve windows, can be made of or coated with substances such as diamond and sapphire, which have excellent optical qualities and unusually high heat conductive capabilities. Additionally, all optics can be coated with material of proper thickness, such as is done for dichroic reflectors to reflect the infrared (IR) spectrum. IR reflecting mirrors and heat absorbing glass can also be used in the optical path. Additionally, a fluid means such as a liquid or gas in a container, consisting of a large body of index-matched high-boiling-point fluid (liquid or gas), can be used for further cooling. This fluid may be static or circulating within a contained area and placed in contact with the components to be cooled. Alternatively, instead of transmissive optics, reflective optics such as optics made of metal can be utilized for further heat sinking and to suppress reflection at IR wavelengths (with anti-reflection coating for the IR).

Figure 16:
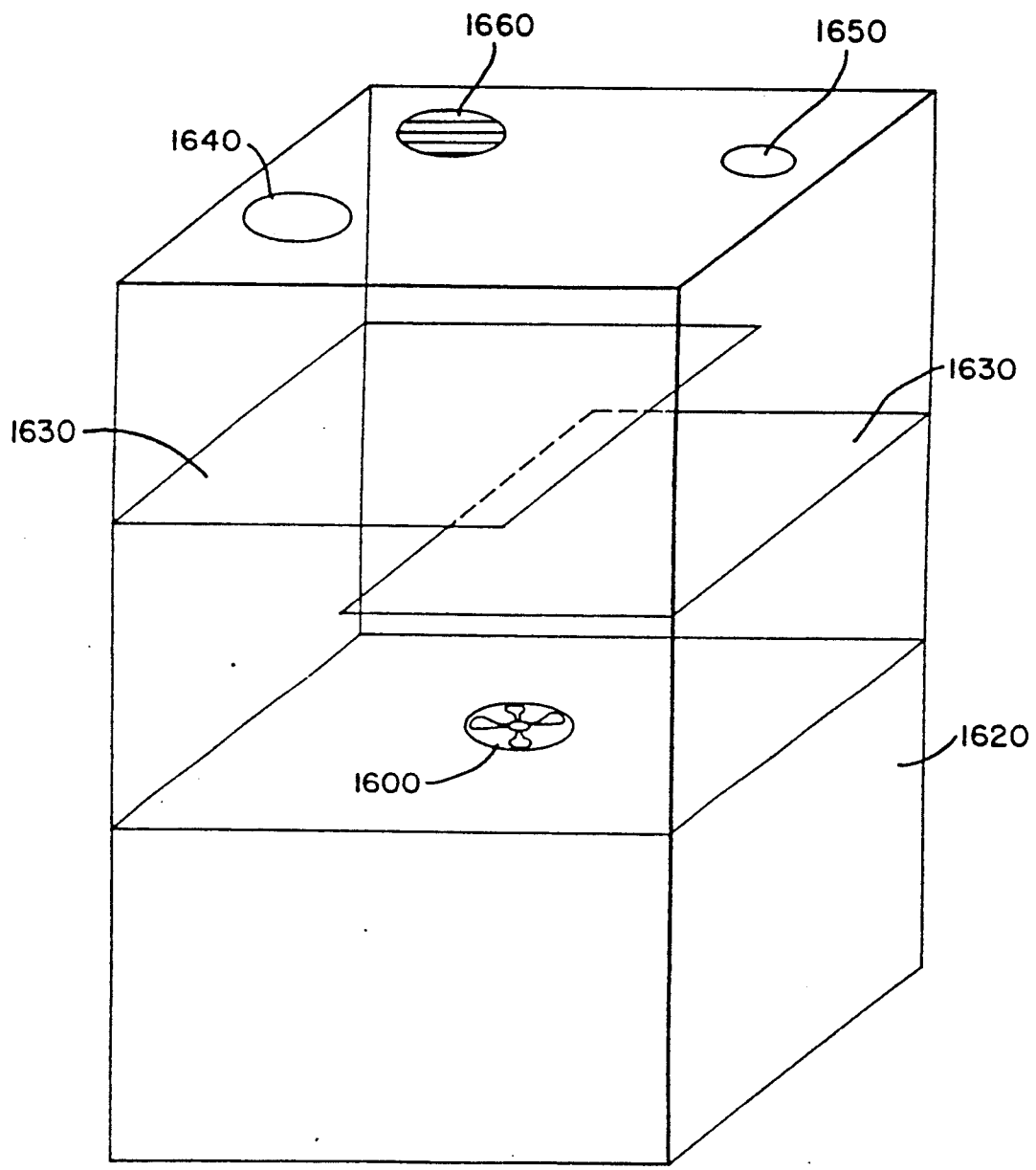
FIG. 16 is an open perspective view of a sound suppression system which may be adapted to the present invention.

Cooling fans may be used to cool the light valve as well as the other components of the system. Ducts and narrow tubes can be used to provide cooling to specific spots. However, a fan can pose a noise problem, particularly noticeable when the audio volume of the system is at a low level, particularly in a small room. To suppress the noise, an "air baffle" may be used between the fan and the outlet of, for example, a housing for various components of the invention. FIG. 16 shows a sound suppression system, comprising fan 1600 resting on platform 1620. Airflow blockers 1630 forces the air to traverse a curved path with deflection prior to exiting the housing through outlet 1640. The surfaces from which the air and sound reflects are covered with sound absorbing materials, greatly reducing the noise entering the listening environment. Since some noise will still be present at outlet 1640, a further measure may be taken for noise reduction. This measure could comprise microphone 1650 which picks up the remaining noise and sends it to an amplifier which inverts the phase of the noise by 180 degrees. The inverted noise is played back through speaker 1660. By properly adjusting the volume and phasing of the amplifier, the remaining perceived fan noise could be substantially reduced and made practically inaudible.

Depending upon the brightness of the light source utilized and the physical and economic constraints of a given system, some significant Gaussian-like heat pattern could remain at the light valve and could change with time as overall heat builds up during operation. An electronic approach can therefore be used in conjunction with the other recited remedies to eliminate the problem. Modifying the electronic field in opposition to temperature effects will substantially cancel the distortion resultant from such effects, since the degree of rotation of the plane of polarization of the light is not only dependent on the thickness of the light valve that it passes through, but also upon the amount of applied electric field. The result will be uniform performance across the light valve. Such a system would use a bias voltage applied differently to different pixels, distributed in a Gaussian-like pattern across the light valve. A thermistor or other temperature-sensing device, placed at the light valve, can monitor overall average light valve temperature, adjusting the Gaussian-like bias voltage distribution as the temperature fluctuates, using an electronic feedback circuit. For even more accurate temperature control, a thermistor-type device can be deposited next to each pixel in the space between the pixels to independently control the heat-compensating bias of each pixel.

An "active matrix" will allow for more brightness in the projected image than a multiplexed array and less heat will be generated for a given level of brightness. Addressing each pixel separately in this way eliminates crosstalk. However, all the conductive pathways, transistors, and capacitors create substantial "dead space" between pixels. These dead spaces are generally in the area of "overlap" where electric fields from neighboring pixels could co-mingle and produce false data, reducing contrast and distorting the color mix. Placing an opaque, black, reflective or other covering over these areas serves at least three purposes: it stops passage of improperly modulated and unmodulated light from passage to the screen, protects the semiconductors from damage due to irradiation from the intense light and heat and reduces the chance of discharge of pixels. The covered area may be a fraction of the size of a pixel.

As an alternative to using three light valves in a projection system to produce full-color, there are several ways to construct a full-color projection system using a single light valve. A simple, compact and inexpensive full-color video projection system may be constructed using a single "full-color" light valve. Previously full-color, direct-view video image displays not using projection had been constructed with a single "full-color" LCD. When such images were enlarged by projection, however, several problems explained herein become apparent.

In a standard CRT-based TV system, red, blue and green pixel data are sent to adjacent red, blue and green phosphor spots on the CRT face. Analogously, in a direct-view full-color LCD TV system, red, blue and green pixel data are sent to adjacent areas of the LCD. These areas are then covered by red, blue and green filters to appropriately color the light passing through those LCD pixel elements. FIG. 15a depicts a simple arrangement of color pixels in which pixels of a given color are located above one another creating vertical color stripes. Three horizontally adjacent pixel areas make up a pixel triad which represents a single, full-color pixel from the actual image. FIG. 15b depicts an alternate arrangement of pixels in which the three pixels of a color triad are arranged to form a triangle. In the preferred single light valve embodiment, such a full-color light valve can be placed at position 1750 in FIG. 17 to produce a full-color image.

Figure 21:
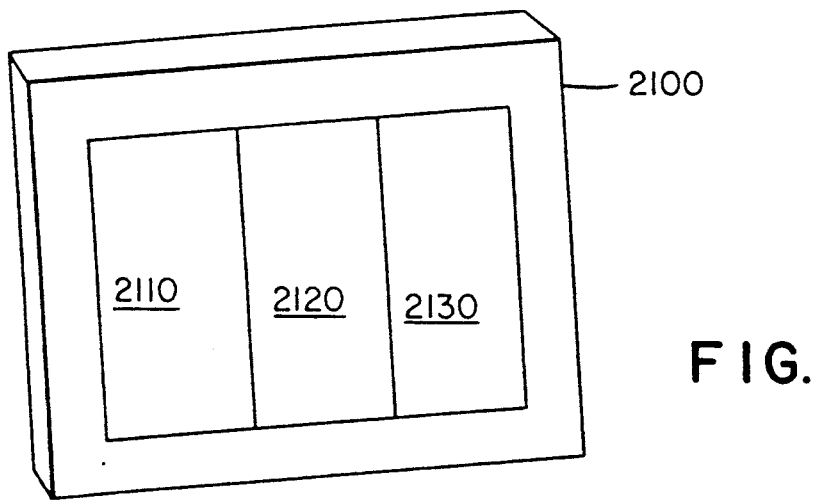
FIG. 21 is a schematic top view of a single light valve divided into three sections for use in full color projection.
Figure 22:
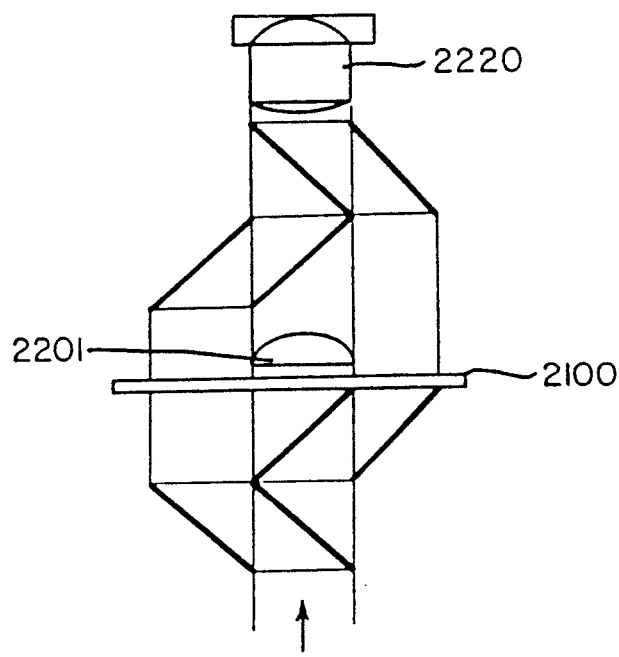
FIG. 22 is a schematic view of a method of matching the path lengths of beams travelling from a light valve to a projection lens utilizing a path length compensation lens.
Figure 23A:
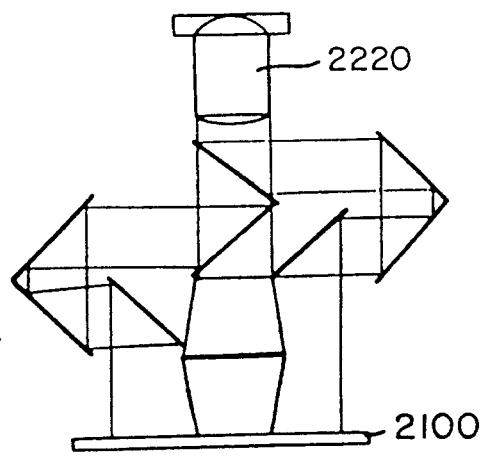
FIG. 23a is a schematic top view of a technique utilizing mirrors to compensate for path length differences of beams travelling from the light valve to the projection lens in an embodiment of the present invention.
Figure 23B:
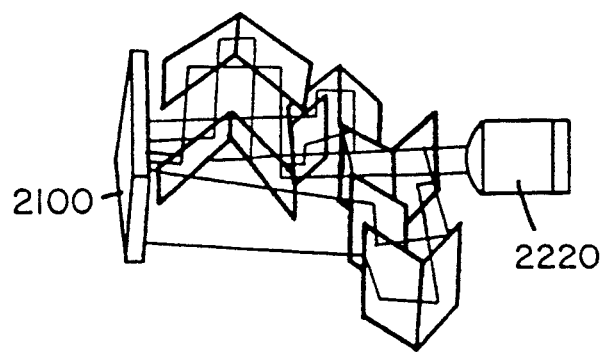
Figure 24:
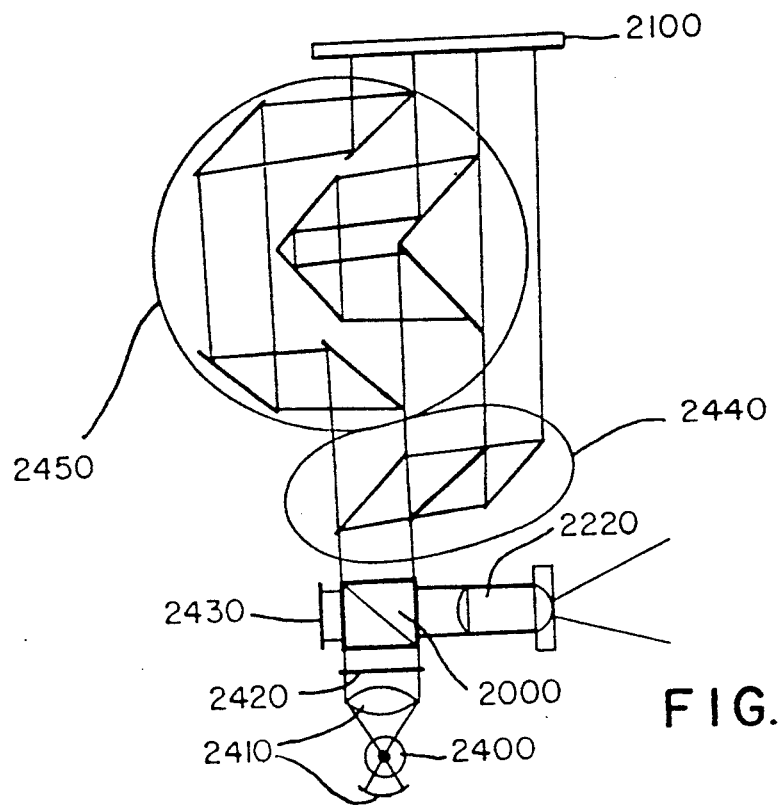
FIG. 24 is an alternate embodiment of the electronic image projection system utilizing a reflective light valve to produce a full color image and a MacNeille prism for polarizing and analyzing beams.

In one embodiment, a single light valve 2100 may be divided into three sections. The red image for instance, can be made to electronically address the left ⅓ of the light valve panel 2110, while the electronic data corresponding to the green component of the image addresses the center ⅓ of the light valve 2120, and the electronic data representing the blue component of the image can address the right ⅓ of the light valve 2130. (See FIG. 21.) Light from these three images can then be overlapped and projected through projection optics to the screen. Since the projection lens 2220 has a given focal length, it must be placed approximately its focal length away from each color component image. (It must be optically equidistant from each image.) This can be accomplished in a number of ways. One or more lenses can be positioned just after the light valve 2100 to adjust the focus of one or more of the three images through the same projection lens even though the three images may traverse different light paths. (See FIG. 22.) For instance, correction lens 2201 can correct for the distance difference in the straight-through path as compared to the reflected paths. Alternatively, path lengths can be matched by the appropriate use of mirrors, as for example, depicted in FIG. 23. As mentioned earlier, reflection optics, including a reflection light valve, can be used to produce the full-color video image. An example of this type of setup with a single light valve is shown in FIG. 24.

In this setup, light from light source 2400 is collected and collimated by condenser optics 2410. After passage through a quarter wave plate 2420, the light enters a MacNeille beamsplitter cube 2000. S-polarized light reflects from the internal face within the cube to front-surface mirror 2430. This reflects the S-polarized light back through the cube, through the quarter wave plate, back through the condenser optics and light bulb, and back through the quarter wave plate. At this point, the S-polarized light, having passed twice through the quarter wave plate is rotated 90 degrees to become P-polarized light It can now pass through the cube, resulting in utilization of a majority of the source light, even though plane polarization is performed.

Dichroic mirror setup 2440 separates the light into red, green and blue beams which reflect from path equalization mirrors 2450 and illuminate three sections of light valve 2100, which is addressed with three color-component images. The light reflects from the light valve and retraces its path to the MacNeille prism. Light which should appear in the projected image is converted by the light valve from P-polarized light to S-polarized light. It therefore reflects from the inner surface of the cube and exits through the projection lens 2220 to the screen. Non-image light remains P-polarized and passes through the cube and is reinjected into the system, making the projected image somewhat brighter. A birefringence transmission light valve with a mirror behind it could also be used in this arrangement.

In conventionally-made LCDS, color filters are deposited within the cavity of the LCD. This must be done because any difference in physical location of the actual LCD pixels and the color filters coloring them will produce a parallax difference which will be perceived as misregistered or incorrect colors when viewing a direct-view LCD from any angle aside from head-on.

Since the space between the glass plates forming an LCD is typically less than 10 microns, the deposition of color filters requires a high degree of thickness control as well as color transmissivity and overall transmissivity uniformity in such thin coating thicknesses. In addition, high efficiency filtering must be used to eliminate the possibility of contaminating particulate matter in the coating chemicals which may be on the order of or larger than the space in between the glass plates Projection, however, presents the unique situation in which a light valve can be illuminated with substantially collimated light and viewed on a screen from all angles even though light passes through the light valve substantially in a parallel direction eliminating any possible parallax error. This means that the making of full-color light valves specifically for their use in projection will allow the use of external color filters whose thicknesses do not have to be as precisely controlled. Also, being placed outside of the light valve cavity reduces the risk of contamination as well as the complexity and thus the cost of production of light valves for that purpose.

Using a "full-color" light valve can create another problem which, although not very noticeable on small displays, creates major problems in a large image. This problem results in a poor contrast ratio and poor color fidelity. To understand and correct this problem the workings of a full-color LCD display must be analyzed.

The following discussion explains the nature of the problem. The transmitted light intensity (TI) from a twisted nematic liquid crystal device, under no applied voltage, with a crystal thickness (d) for any given wavelength ($\lambda$), is dependent on the refraction anisotropy ($\Delta n$) and the liquid crystal twist angle ($\Phi$). TI can equal zero for only a few unique simultaneous combinations of values for these parameters. This means that except for very specific combinations of wavelength ($\lambda$) and thickness (d) for any given crystal, zero transmitted intensity or true "black" will not occur. Thus, if the anisotropy, twist angle, and crystal thickness are fixed, as they are in a conventional light valve such as an LCD (consisting of liquid crystal between two flat plates), only one color can go to black at a time. If a voltage is applied, changing the light rotation, then a different color can go to black. This non-linearity eliminates the possibility of true black in all colors simultaneously (and thus limits possible contrast) and since perceived color is produced by addition, this eliminates true color fidelity.

Figure 10:
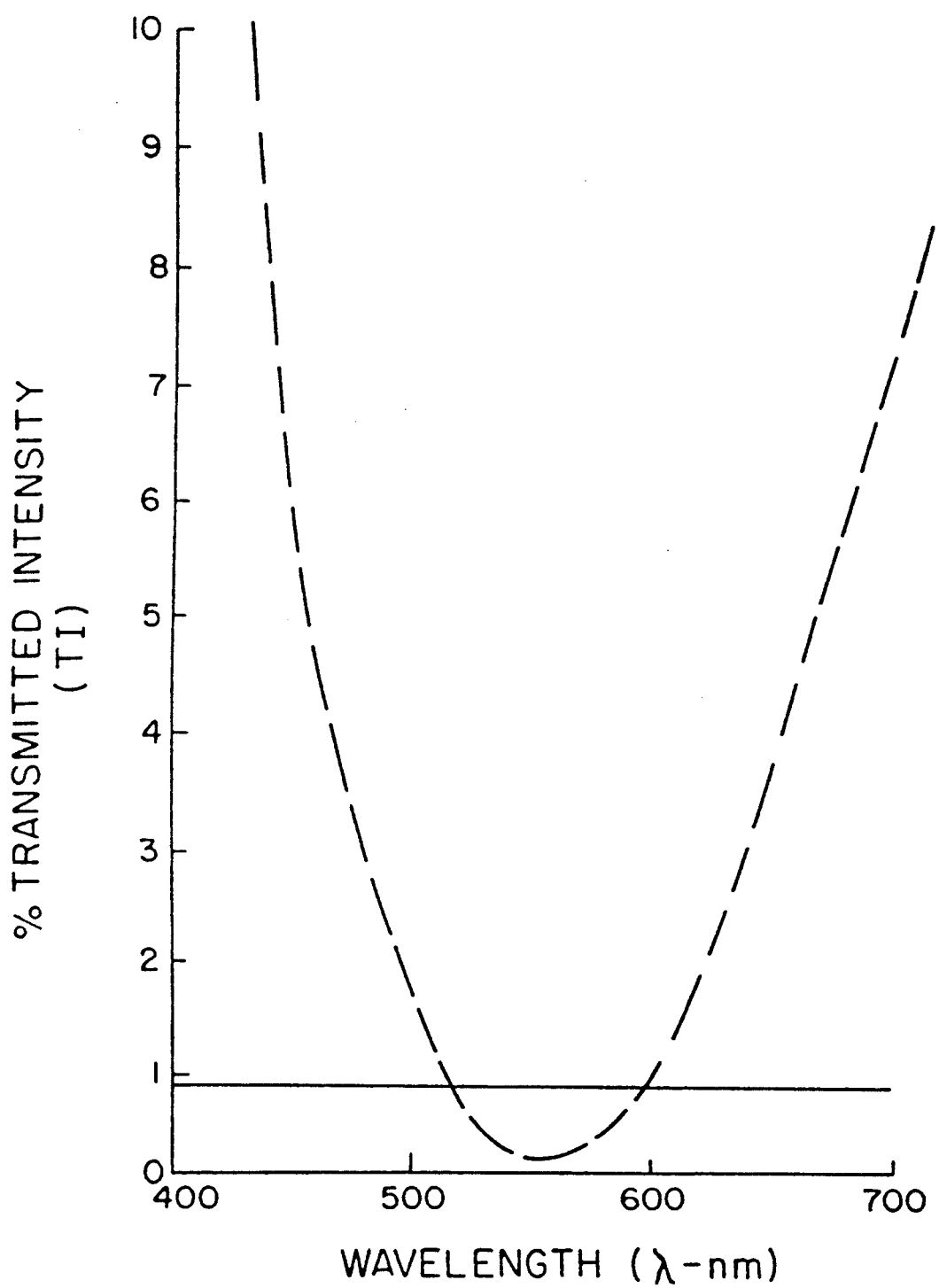
FIG. 10 is a graphical plot of transmitted light intensity over the visible spectrum throughout two full color LCDS, one with a constant LCD cavity thickness contrasted with a "stepped thickness" LCD cavity.
Figure 11:
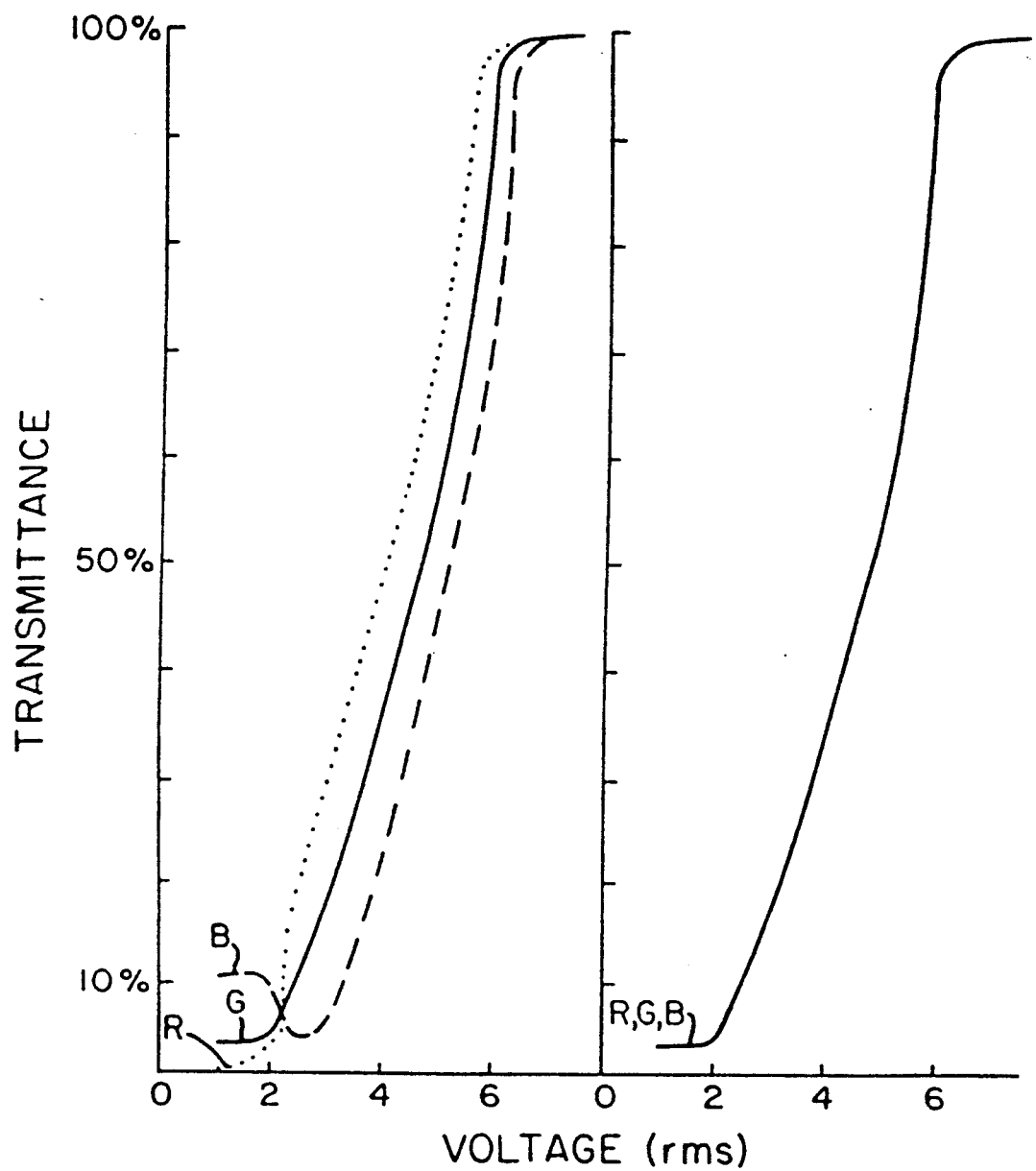
FIGS. 11a and 11b are graphical plots of transmitted light intensity vs. applied voltage for three wavelengths used in two full-color LCDs, one for a constant thickness LCD cavity and one for a "stepped thickness" LCD cavity.

To further illustrate this problem, the dashed curve of FIG. 10 shows the transmitted intensity over the visible spectrum of a standard full-color LCD with a given thickness. FIG. 11, plot A shows the non-linear transmittance variations for the three wavelengths used in a full-color LCD of uniform thickness plotted against the voltage. When red transmission, for instance, is at a minimum, blue transmission is over 10 percent and green transmission is about 5 percent. Having no true black results in a low contrast ratio which is one of the main problems with today's LCDS. To solve this problem, one of the variables given above must be modified to produce the desired transmissivity for a given signal voltage. This can be done by electronically biasing the pixels, which are addressed with data corresponding to two of the color components (such as red and green). This would cause the net transmissivity through the red and green pixels to equal the transmissivity of the blue pixels, when no signal voltages are present for any pixels. With proper selection of d, all colors will be at a minimum.

Figure 12:
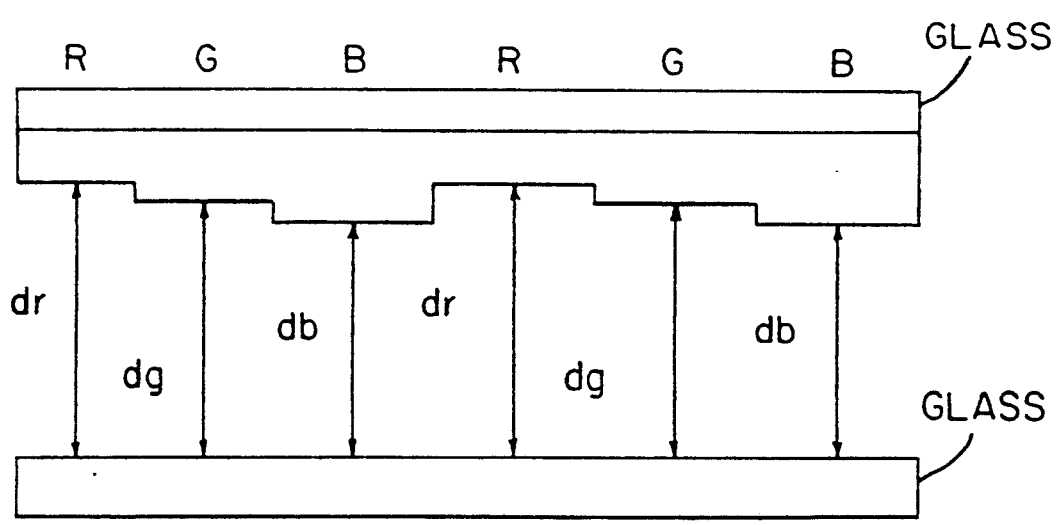
FIG. 12 is a magnified schematic view of a "stepped thickness" LCD cavity showing the different thicknesses of LCD through which the red, green, and blue light traverse.

Alternatively, the crystal thickness (the space between the plates encasing the liquid crystal) can be selected under each color filter such that at exactly zero (signal) volts, the proper rotation is imposed on the polarized light for the specific wavelength transmitted by that color filter. By doing this for each of the three sets of color filters, the minimum amount of light for each color will be transmitted with no voltage applied. This, again, will provide a blacker black and thus a high contrast. This result is accomplished, for instance, if stepped deposition or etching of one plate is done to produce steps as illustrated in FIG. 12.

By using a light valve with such a "stepped thickness" cavity, the crystal thickness-wavelength combination will allow true black for all three colors simultaneously and a linear relationship between applied voltage and transmitted intensity for all colors simultaneously. This is demonstrated by FIG. 10 (solid line) where transmission is nearly zero for all colors simultaneously with no voltage applied and in FIG. 11, plot B, where the transmission for all colors varies with voltage simultaneously.

Figure 13:
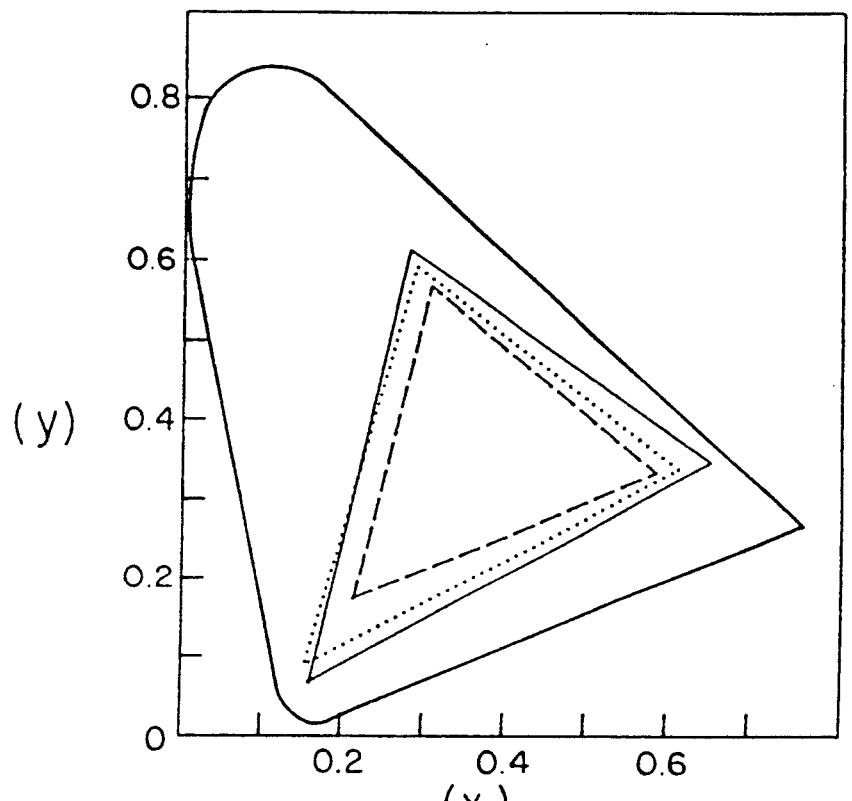
FIG. 13 is a CIE chromaticity diagram comparing color ranges of a CRT display, a conventional color LCD display with a fixed cavity thickness and a "stepped thickness" LCD cavity in accordance with the present invention.

In applicant's demonstration model, using a "stepped thickness" cavity results in a contrast ratio as high as 100:1 and color fidelity approaching that of a CRT. This high color fidelity can be seen in the CIE diagram of FIG. 13 in which the dashed line represents the chromaticity of conventional multi-color LC displays, the dotted line represents the chromaticity of an LC color display with varying crystal thicknesses and the solid line represents the chromaticity of a conventional CRT.

The small, closely packed red, blue and green spots of light that make up a direct-view image create the illusion of color in a scene as they are supposed to appear. However, when this image is magnified by projection, each adjacent red, blue, and green pixel no longer merges to produce properly colored areas. Instead, they appear as disjointed red, blue, and green areas, detracting from the appearance of a naturally colored image. Furthermore, dead spaces between adjacent pixel areas in the light valve are magnified as well, further creating a disjointed, disruptive, unnatural looking image. The appearance of disjointed red, blue and green spots instead of actual colors in a full-color light valve can be eliminated by various methods.

Figure 52:
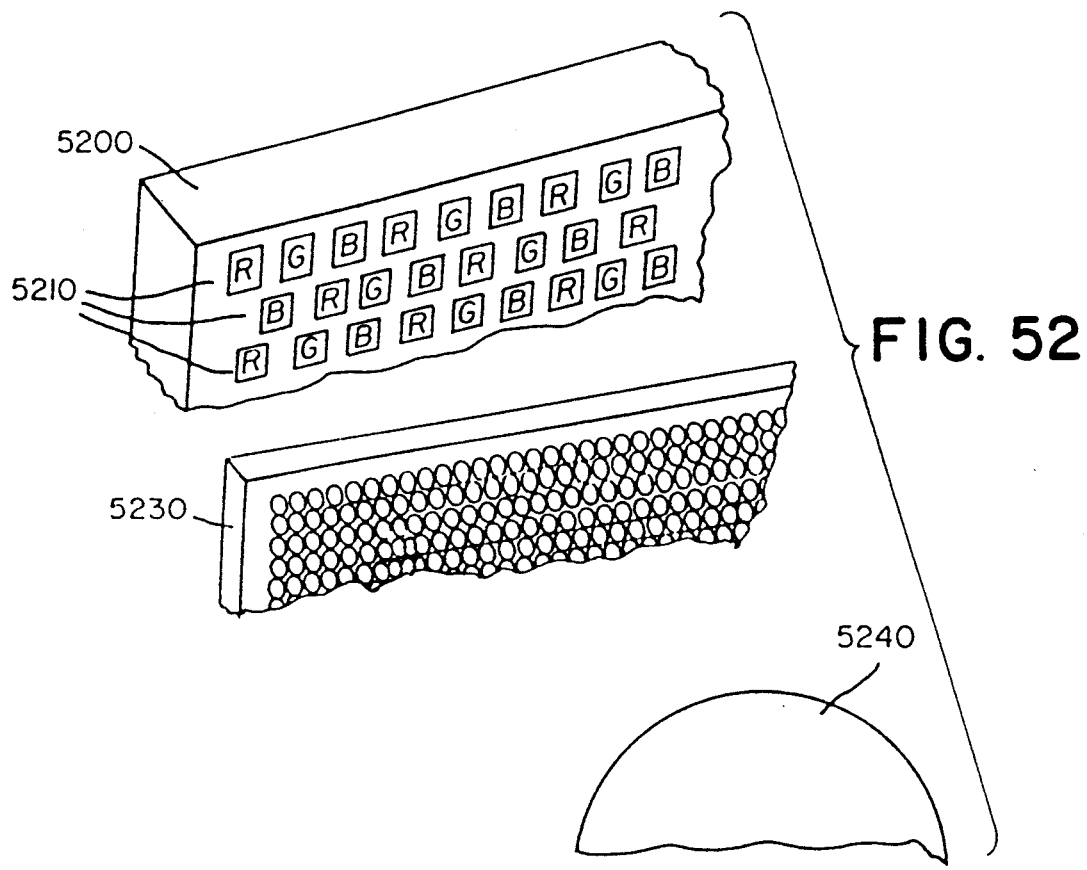
FIG. 52 is a schematic view of an embodiment of the electronic image projection system in which a full color light valve is followed by a lens array to create demagnified real images of the light valve pixels in front of the lens array to allow for the projection of a full color image in which the individual red, green and blue pixels are merged.
Figure 52A:
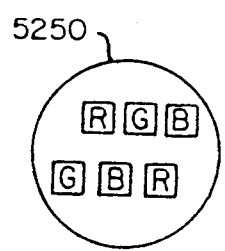
FIG. 52a is a schematic view of a single lenslet of a lens array shown in FIG. 52.

The preferred method of eliminating them in the projected image, utilizing a single, full color light valve, entails the use of lens arrays. FIG. 52 shows a full-color light valve 5200 with red, green and blue pixels arranged in horizontal rows 5210. The rows are preferably arranged so that each succeeding row is offset by 1½ pixels from the previous row, although many other arrangements are possible. A lens array 5230 is placed in front of the light valve and behind the projection lens 5240. The lens array could comprise spherical lenses, although cylindrical or other types of lenses could be used, each of which is ½ the width of a pixel on the light valve. The curvature of each lenslet and the distance between the lens array and the light valve can be chosen so that each lenslet 5250 creates a demagnified real image of a portion of the light valve, floating in space, slightly in front of the lens array, between the lens array and the projection lens. Other arrangements are, of course, possible.

Figure 53:
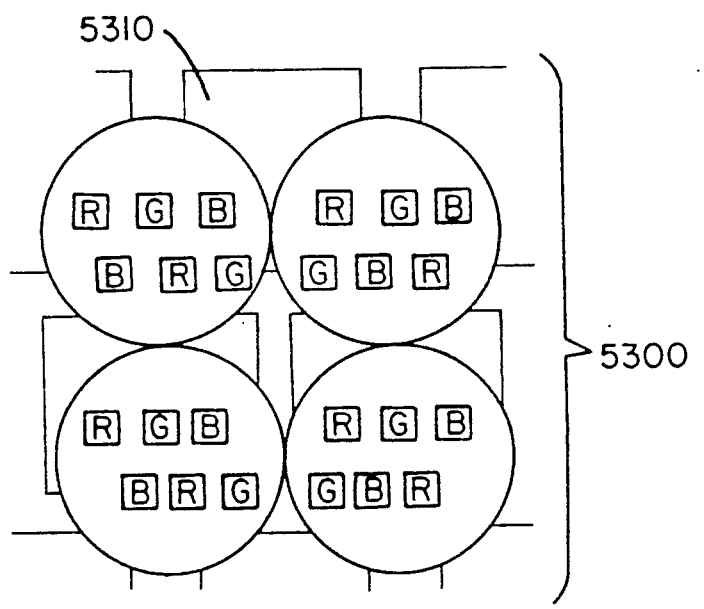
FIG. 53 is a schematic view of four lenses in a lens array placed in front of a full color light valve in an embodiment of the electronic image projection system creating a real image of 24 pixel color components after the lens array.

As shown in FIG. 52 (inset) 5250, the real image produced by a single lenslet contains data from 6 pixels. These 6 pixel images come from two horizontal rows with 3 pixels on top and 3 pixels below. Other lens sizes and curvatures could be used and each real image could contain a different number of pixel images while still producing essentially the same result. The addition of the lens array separates the planes of best focus of the red, green, and blue pixel data and the image information displayed on the light valve. The projection lens focuses through the lens array onto the plane of the best image focus, near the plane of the light valve. Since 4 lenslets 5300 (see FIG. 53) occupy the same amount of space as a single pixel 5310 and each lenslet produces an image of 6 pixels, in this case the image focused on the screen of a single pixel will be the superimposition of 24 red, green and blue dots. These dots, however, are not 24 different pixels, but contain the data from only 6 pixels on the light valve (which may correspond to only two pixels in the actual scene). The 24 dots that superimpose to create the image of the next pixel contain some of the same information as the previous 24 dots or some portion of the same dots and some new ones. Consequently, each adjacent pixel image is a weighted average of approximately 2 triads, causing only a slight reduction in resolution. However, since each newly created pixel image is an out-of-focus superimposition of 24 dots, its colors combine to produce a net uniform color. Thus, a full-color image is still displayed with correct colors in the correct locations to a sufficient degree of accuracy so that the image appears essentially unchanged from that projected without the lens array, except that individual red, green and blue dots are no longer visible. This blending process also eliminates the appearance of any spaces between pixels. This combined function eliminates the appearance of pixels altogether. Use of an anamorphic lenslet profile, or the optical equivalent formed by crossed lenticular lenses, is preferred so that the "blur" is only a mix of one red, one green and one blue pixel.

When constructing a rear-screen display unit, an additional flexibility is provided since the screen is built into the unit. This allows for the addition of optics just before the screen. If the image projected onto a rear screen has individual red, green and blue pixels, a lens array as described, which has for instance twice as many lenses as there are pixels in each orthogonal direction, can be placed near the focused image that is to hit the screen. As explained above, each lens element can create a demagnified image of one or more triads in space. A second lens array with the same number of lenslets as there are pixels can then focus a blended image of the new pixel onto a nearby screen surface (being focused on a plane near the original image plane, not on the plane of real images of the pixels). As before, the individual color pixels will be blended into full-color pixels.

Alternatively, a single lens array can be used if it is made in a special way. The single array should have the same number of lenslets as there are individual colored pixels. The array is placed after the image that is to be focused on the screen. Two of every three lenses in the array also have a built-in wedge so that the images of a triad will all be focused onto a nearby screen overlapped, creating full-color pixels. The wedges can, of course, be separate from the lenslets. These last two techniques can also be applied to a CRT or any imaging device which normally displays individual red, green and blue pixels.

Figure 28:
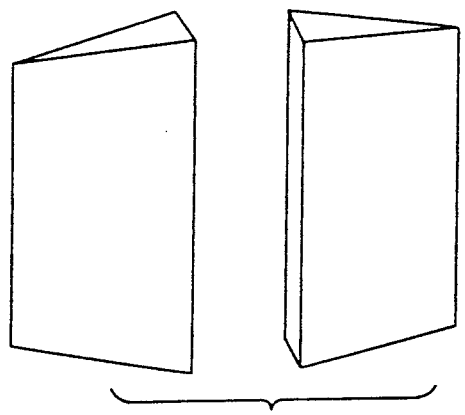
FIG. 28 is a schematic view of wedges used in the optical path of a projector to create three overlapping images of the full color light valve so as to merge red, green and blue pixel color components into full color pixels in the image.

Another method of creating full color pixels entails the use of narrow angled prisms or wedges. As shown in FIG. 28, these two wedges can be placed with a clear-space between them at any place in the system as long as they are not placed too close to the light valve. Since the light distribution is usually Gaussian, more light is concentrated in the center. To make all three images equal in brightness, the clear center section should therefore be smaller than each wedge section. Alternatively, to produce a more uniform image, the wedges can be divided into thin sections and interdispersed with clear spaces. If the wedges are placed somewhere between the light source and the light valve, they will create the equivalent of three very close light sources, illuminating the light valve from slightly different angles. This will create three slightly displaced images on the screen.

The wedges can also be positioned somewhere after the light valve, such as after the projection lens. Such positioning will create three images on the screen, each slightly offset from the other.

If the wedge angles are properly chosen based on simple geometrical considerations, the images will be offset by the width of one pixel. The red pixels of one image will then be superimposed on the neighboring green pixels of the second image, which will be superimposed on the neighboring blue pixels of the third image, creating full-color pixels in which individual red, green and blue pixels will not be visible. This technique will work well in most areas since most groups of three pixels in an image will most likely have the same color value. The only place this technique will create a slight problem is at the boundary between two very different areas. At the boundary, when there is an abrupt change in color and/or brightness, two of the pixels that are overlapped on neighboring pixels will be overlapped on neighbors that should have different values and therefore a noticeable distortion will become apparent, creating a more jagged looking edge at the boundaries of the viewed image. The larger the areas of constant color within a scene, the less noticeable this will be.

Figure 9A:
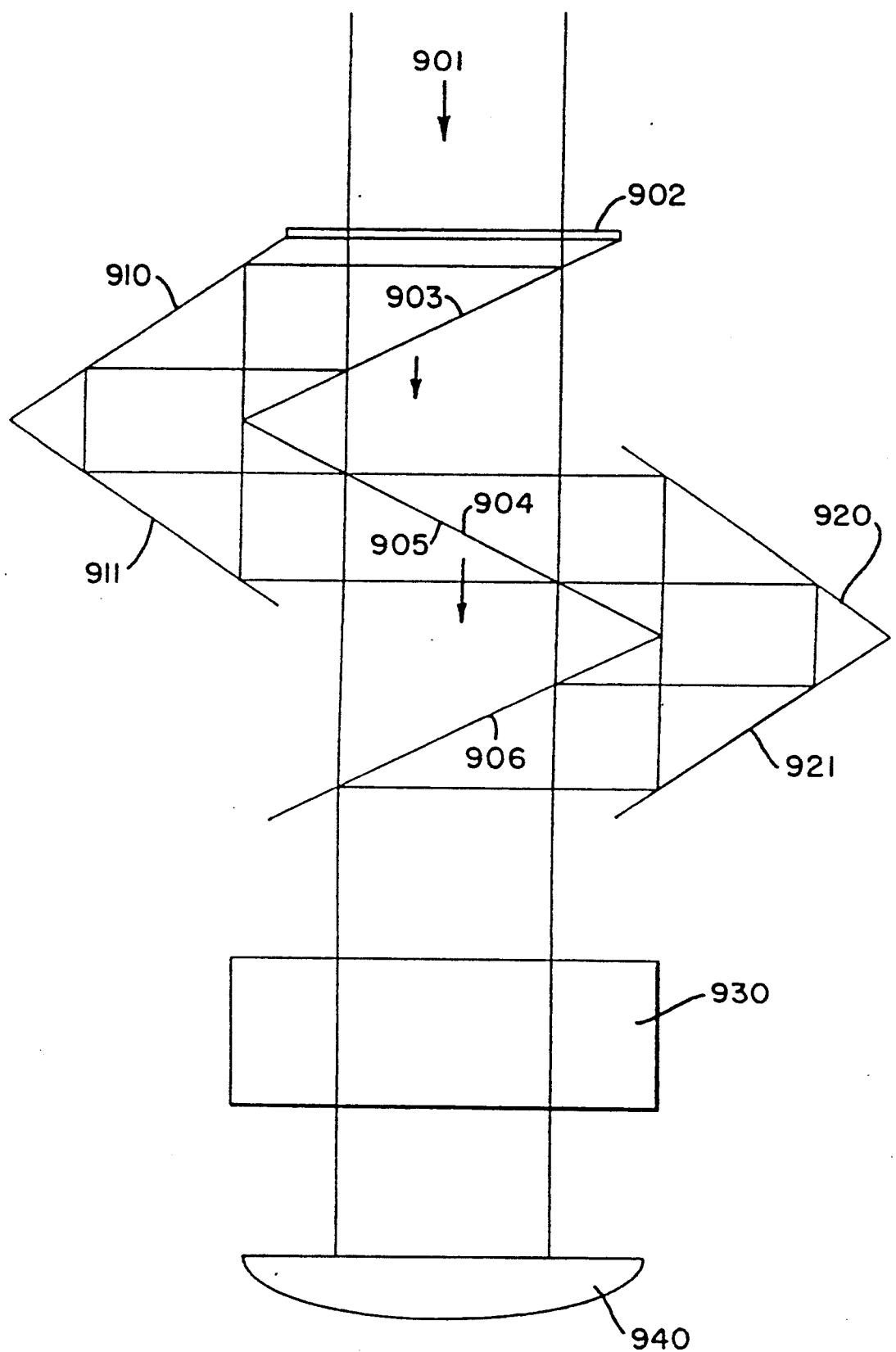
FIG. 9a is a schematic view of a dichroic mirror system of one embodiment of the present invention.

Another method to eliminate the appearance of the individual colored pixels is by the use of a dichroic mirror system as depicted in FIG. 9a. Assuming the pixel arrangement of FIG. 15a, individual red, blue and green pixels can be made to overlap by the following arrangement: collimated light 901 passes through the full-color light valve 902 and hits dichroic mirror 903 which reflects only the blue image. The remaining red and green images pass through dichroic mirror 903, hitting dichroic mirror surface 904 which reflects only the red image, allowing the green image to pass through. The blue image reflects off front surface mirrors 910 and 911 and then off dichroic mirror surface 905 which reflects only blue light. Here the blue image rejoins the green image. By adjusting front surface mirrors 910 and 911 the blue pixels can be made to overlap the green pixels. The red image reflects off front surface mirrors 920 and 921 and then off dichroic mirror 906 which only reflects red light. At 920 and 921, the red pixels can be made to overlap the already joined blue and green pixels. The path lengths could be matched using a compensating lens as described herein or additional mirrors as also described herein. At this juncture, we have a full-color image with large spaces between pixels as illustrated in FIG. 4.

Figure 9B:
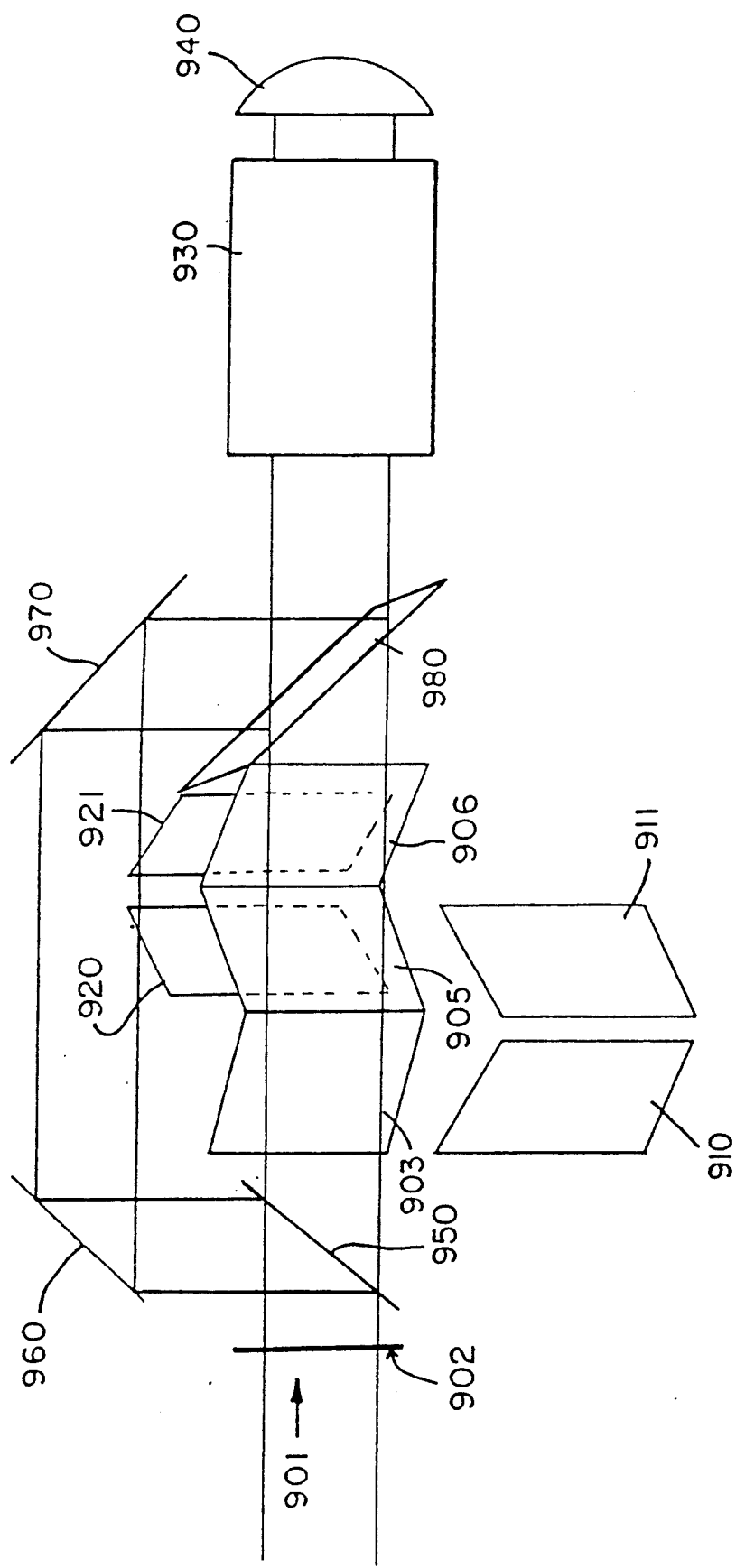
FIG. 9b is a schematic view of the embodiment of the dichroic mirror system of FIG. 9a, modified to include an additional light path.

If individual colored pixels are arranged on the light valve as shown by FIG. 15b, in which a color triad forms a triangle, bringing the red and blue pixels together, as described, will not allow them to superimpose on top of the proper green pixels since the proper green pixels are vertically displaced from their corresponding red and blue pixels. Consequently, this type of pixel arrangement could use an additional dichroic mirror path similar to the paths used by the red and blue light. This is depicted more clearly in FIG. 9b, which is a side view of the system in FIG. 9a modified to include an additional light path. Collimated light 901 passes through full-color light valve 902 as before. However, the distance between light valve 902 and dichroic mirror 903 is increased to allow for the insertion of dichroic mirror 950 which reflects green light and transmits red and blue light. As before, 903 reflects blue light and transmits red light. Mirror surfaces 904 and 905 are front surface mirrors. Mirror 906 reflects red light and transmits blue light. As before, mirrors 910, 911, 920 and 921 are front surface mirrors. In addition, mirrors 960 and 970 are also front surface mirrors. Mirror 980 is a dichroic mirror which reflects green light and transmits red and blue light. By this modified arrangement, proper separation of mirror 910 from mirror 911 and separation of mirror 920 from mirror 921 will still cause the overlap of the red and blue pixels. Additionally, proper separation of mirrors 960 and 970 will cause the proper green pixels to overlap the already joined red-blue pixel pair. This overhead mirror arrangement may also be used with the color light valve whose pixel arrangement is depicted in FIG. 15*a* with the spacing between mirrors 960 and 970 adjusted to prevent vertical displacement of the green pixels since they are already in line with the red and blue pixels. The separate mirror path for the green light makes the distance traversed by each color equal, which is important because the light, although collimated, still expands with distance traveled and the projection lens must focus all three images simultaneously. Now the image can pass through subsystem 930 which can be used to fill the spaces between pixels (as described elsewhere herein) for final projection by projection optics 940. Alternatively, in FIG. 9*a*, mirrors 910, 911 and 920, 921 could be tilted up or down to cause the red and blue pixels to superimpose on the proper green pixel.

Figure 29:
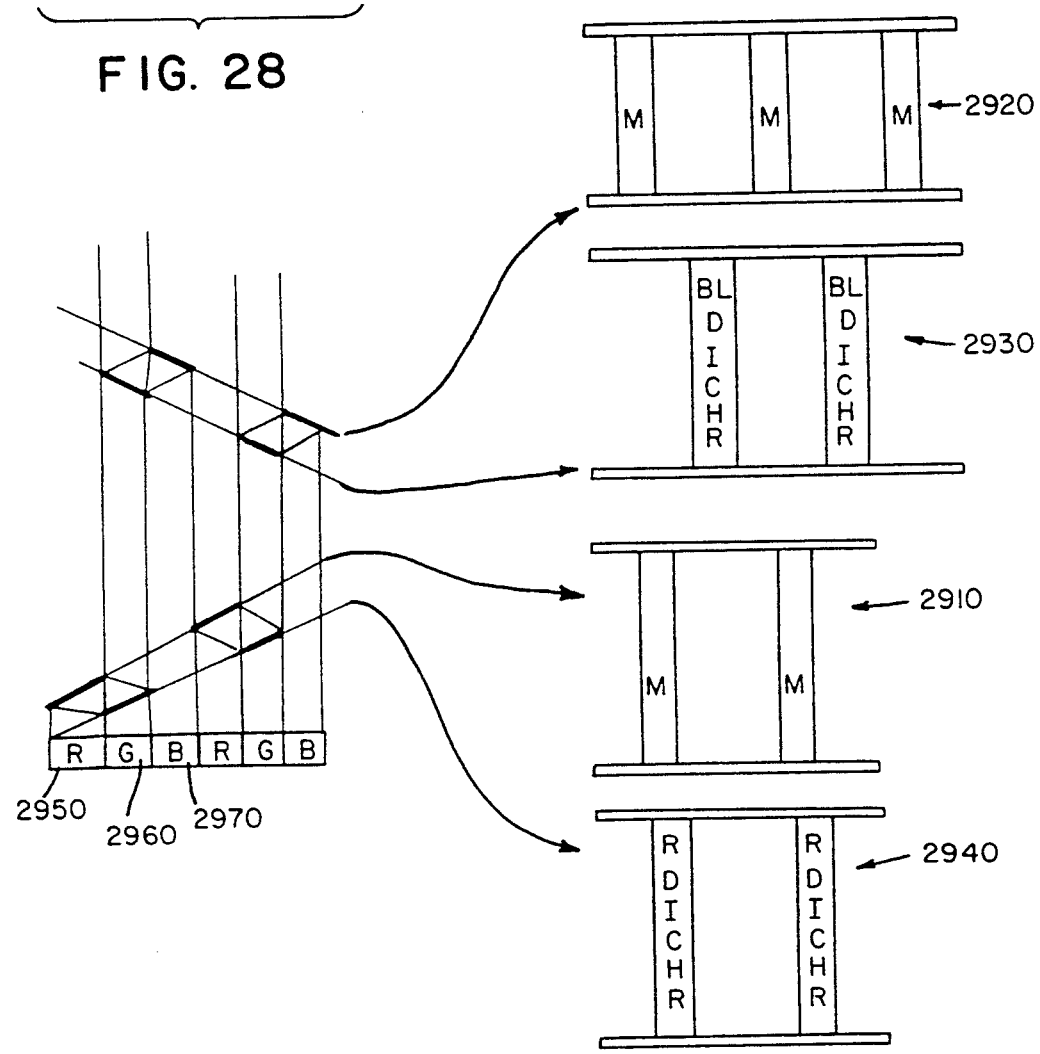
FIG. 29 is a schematic view of a four-mirror system in the electronic image projection system to overlap red, green and blue pixel color components creating full color pixels.

In another embodiment for the elimination of the appearance of red, green and blue pixels depicted in FIG. 29, four special mirrors are used. Each mirror has clear spaces and mirrored areas. Two of the mirrors 2910 and 2920 have ordinary mirrored areas coated, for instance, with silver or aluminum, which totally reflects light of any color. One of the special mirror's 2930 reflective coatings is dichroic and reflects blue light and transmits red and green light. The other special mirror's 2940 reflective dichroic coating reflects red light. As seen in FIG. 29, the mirrored areas of the four-mirrors are positioned out of phase with each other. On each mirror, the clear space between every two mirrored spaces is equal to twice the width of the mirrored space.

Light from red pixel #1 2950 passes through the clear area of the first mirror and reflects off the mirrored area of the second mirror downward towards the red reflective area of the first mirror. The red light is then reflected upward, passing through the clear area of the second mirror and then passes through the clear areas of the third and fourth mirrors.

The green light coming from green pixel #2 2960 passes through the dichroic mirrored area of mirror #1, passes through the clear area of mirror #2, passes through the dichroic mirrored area of mirror #3 and passes through the clear area of mirror #4 and is thus superimposed on the light that came from the red pixel.

Light from the blue pixel #3 2970 passes through the clear spaces in mirrors #1, #2 and #3 and reflects off the mirrored area in mirror #4 down to the dichroic mirrored area of mirror #3. This dichroic mirrored area reflects the blue light upwards, superimposing it on the light from the red and green pixels. Thus, we have created full-color pixels with spaces between them.

Figure 30:
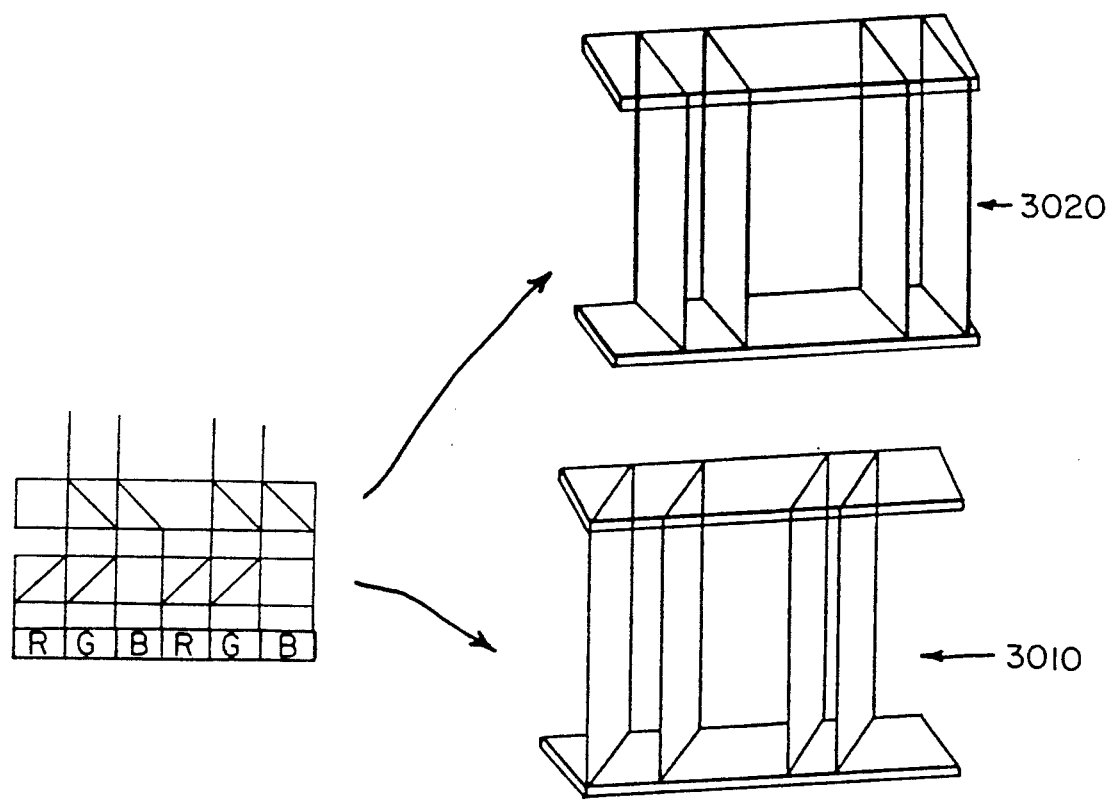
FIG. 30 is a schematic view of a two mirror system in an alternate embodiment of the electronic image projection system used to superimpose red, green and blue pixel color components creating full color pixels.

In an alternate embodiment (see FIG. 30), two special mirrors are used. Each mirror has properly mounted 45 degree dichroic mirror sections. The first mirror 3010 reflects red light and transmits blue and green, while the second mirror 3020 reflects blue light and transmits red and green. In the arrangement, red light from red pixel #1 reflects off two red dichroic surfaces upwardly through the second blue dichroic mirror 3020. Green light from green pixel #2 goes straight upwards, passing through both the red and blue dichroic mirrors. Blue light from blue pixel #3 passes through the clear space in the first mirror and reflects off two blue dichroic mirror surfaces in the second mirror, sending it in an upward direction. As before, this arrangement superimposes the light from the red, green and blue pixels into a single beam, creating full-color pixels separated by spaces.

Figure 31:
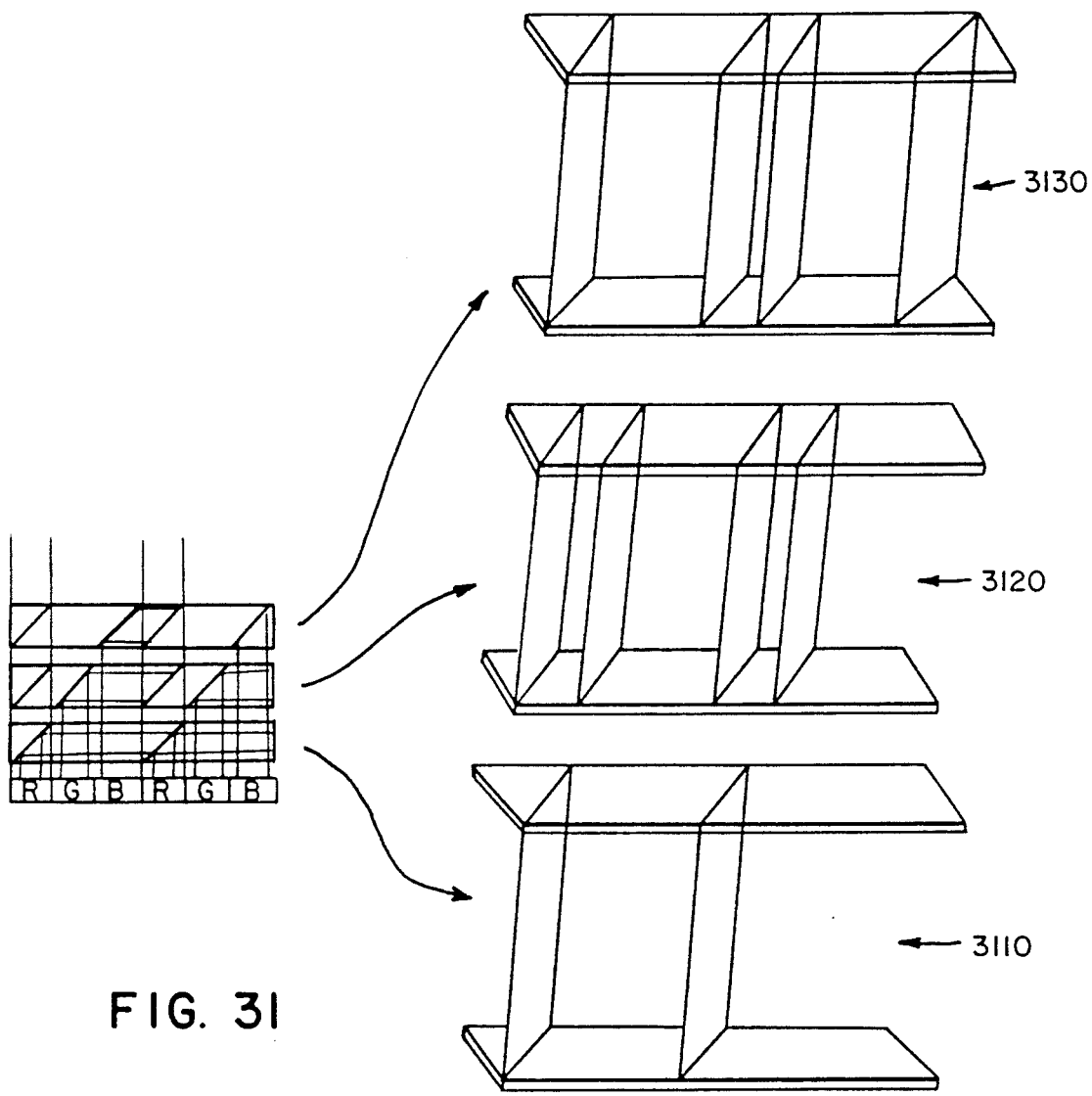
FIG. 31 is a three mirror system in an alternate embodiment of the electronic image projection system to superimpose red, green and blue pixel color components creating full color pixels.

Three special "mirrors" (see FIG. 31) are used in another method of creating full-color pixels. Each "mirror" consists of properly placed 45 degree dichroic mirror sections. The first mirror 3110 is a regular mirror, reflecting red light but transmitting green and blue light. The second mirror 3120 is a green dichroic mirror, reflecting green light but transmitting red light, and the third dichroic mirror 3130 is a blue dichroic mirror reflecting blue light but transmitting red and green light. In this arrangement, red light from red pixel #1 reflects off the two regular mirrors into the upward direction passing through the green and blue dichroic mirrors 3120. Green light from green pixel #2 similarly makes two reflections from green dichroic mirrors 3120 reflecting it in an upwards direction and superimposing on the light from the red pixel. Light from the blue pixel #3 also reflects off two blue dichroic mirrors 3130, upwardly superimposing it on the light from the red and green pixels. Again, full-color pixels are created separated by spaces.

Visibility of red, green and blue pixels could also be eliminated by using a single, relatively low resolution light valve with a "time-share scanning" technique. By dividing time into small segments, each with different data presented to the screen, the eye will integrate the data over time, seeing the sum of the data, as if each different data presentation were being projected simultaneously onto the screen. However, time-sharing of visually-presented data must be done properly or else artifacts, such as flicker and reduced image brightness, will become apparent to the viewer.

As an example, if the light valve is addressed with red information only, and only red light is projected through the light valve during that time, followed by the green and blue images similarly projected, the viewer will perceive a full-color image. However, since a standard video image provides 30 frames per second and since flicker is almost visible to many viewers at this frequency, dividing time into segments as described, would produce 10 images per second for each color, creating a noticeable color flicker. In addition, if a large area is only one color (as often happens in real life), then the entire area will be black for two out of every three time segments, decreasing perceived brightness to one-third and creating a strongly pronounced flicker of the entire area. This problem was studied in great detail in the early days of color television, when CBS attempted to develop their sequential color system, using a spinning color wheel in front of a monochrome CRT. Another problem encountered when using this method is a marked decrease in image brightness, due to another factor. Since, during any given frame, only one color of light is projected on the screen, two-thirds of the light emitted by the source is therefore eliminated from every frame, and thus from the viewed image.

To eliminate these problems, a system can be set up in the following way. Firstly, the light valve is addressed as a full-color light valve, with pixels arranged in an alternating fashion in which every even row contains the pixels in the order of one red, one green and one blue, repeating throughout the line. Every odd line may contain pixels in the same arrangement, but may be displaced some amount such as one and one-half pixels, with respect to every even line. This creates a more random appearing pixel pattern. For a single segment of time (such as 1/30 of a second) the light valve is addressed in this fashion, and light of the proper colors is sent to each pixel through a mosaic of color filters (as previously described) or by the creation of a matching mosaic of colored light beams, created for instance by multiple dichroic mirrors as described elsewhere, herein. For the next segment of time, the light valve is addressed with all color data addressing shifted by one pixel in a given direction. Simultaneously, the distribution of colored light beams addressing the light valve is shifted to correspond to the new positions of the colored data on the light valve by either moving the color filters or by appropriately vibrating mirrors in the dichroic-colored-rayproduction system.

In this embodiment of time-share scanning, pixel #1 of the light valve is addressed with red data corresponding to pixel #1 of the image, for the first segment of time. This produces a red data image in pixel #1 on the screen during that segment of time. In the next segment of time, the color data locations, as well as the arrangement of the colored beams, are shifted so that pixel #1 on the light valve is now displaying the green data from pixel #1 in the original image. This green data from pixel #1 in the original image is now projected onto the same location on the screen that displayed the red data for pixel #1 in the previous time segment. Similarly, the blue data is projected to pixel #1 on the screen in the next time segment, creating the illusion of a full-color image at every pixel location within 1/10 of a second. Any large area, which is one color only, now has one-third of its pixels on with that single color during every time period (such as 1/30 of a second). Thus, the area appears that color all the time instead of being black two-thirds of the time, as explained above.

With this arrangement, at least one of every three pixels sends light to the screen all the time, assuming there is any light in that area in the image. Utilizing the dichroic mirror method (described elsewhere herein) of dividing the light into multiple-colored beams in the proper arrangements eliminates the problem of wasting two-thirds of the bulb's light during any given time segment since all of the light is used in every time segment.

Figure 33:
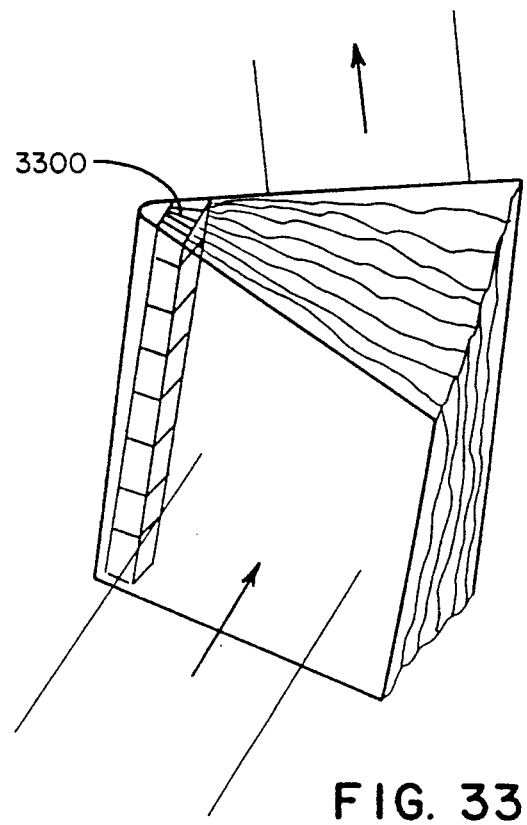
FIG. 33 is a schematic view of an electronically controlled prism for image displacement to be used with the present invention.

As a preferred embodiment of "time share scanning," the light valve can be addressed so that pixel #1 is always addressed with red data, pixel #2 is always addressed with green data, pixel #3 is always addressed with blue data and so on. The illumination is fixed so that pixel #1 is always illuminated by a red beam, pixel #2 is always illuminated by a green beam, pixel #3 is always illuminated by a blue beam, and so on. However, in this embodiment, pixel #1 of the light valve is addressed with red data from pixel #1 of the image in the first time segment and is then addressed with red data from pixel #2 of the image in the second time segment and is then addressed with red data from pixel #3 of the image in the third time segment and then back to red data from pixel #1 of the image, and so on, for all other pixels. The light exiting from the light valve before going to the screen reflects off a mirror. This mirror is oscillated in synchronization with the time segments by an electronicallycontrolled electromagnetic coil or piezoelectric crystal stack on one edge of the mirror. The other edge of the mirror is hinged. Alternatively, reflection from counter-rotating mirrors is used to stabilize the projected image during a given time segment but to shift it for the next time segment. The mirror may also be oscillated with a fluid- or gel-filled piezo-electric prism (see FIG. 33) with two faces which are flat and rigid and hinged along one edge. The other three sides of the prism are collapsible. A stack of piezo-electric crystals 3300 inside the prism causes it to change its angle in an oscillating fashion in synchronization with an oscillating current.

The net result in either event will be to shift the image on the screen by one pixel for the second time segment and by another pixel for the third time segment. Each screen pixel will therefore contain red, green and blue information over time, giving the viewer a full-color image with no discernible color pixels anywhere, using a single, low resolution light valve It should be obvious that other arrangements can be used to accomplish the same ends. This technique creates the perception of three times the resolution of the light valve, or the equivalent of three light valves.

Dead spaces between pixels will be visible whether a "full-color" light valve or multiple "mono-color" light valves are used, especially with the use of an "active matrix." Although such an image may be acceptable in some cases, a better solution is to have all pixels superimposed exactly in triads (red, green and blue together forming "full-color pixels") with spacing between such pixel triads eliminated, creating a "continuous image." In FIG. 4, each pixel 401 is a superimposition of a corresponding red, blue and green pixel. 402 represents spaces which need to be filled. The following are methods to eliminate these dead spaces between pixels in the projected image.

Figure 8A:
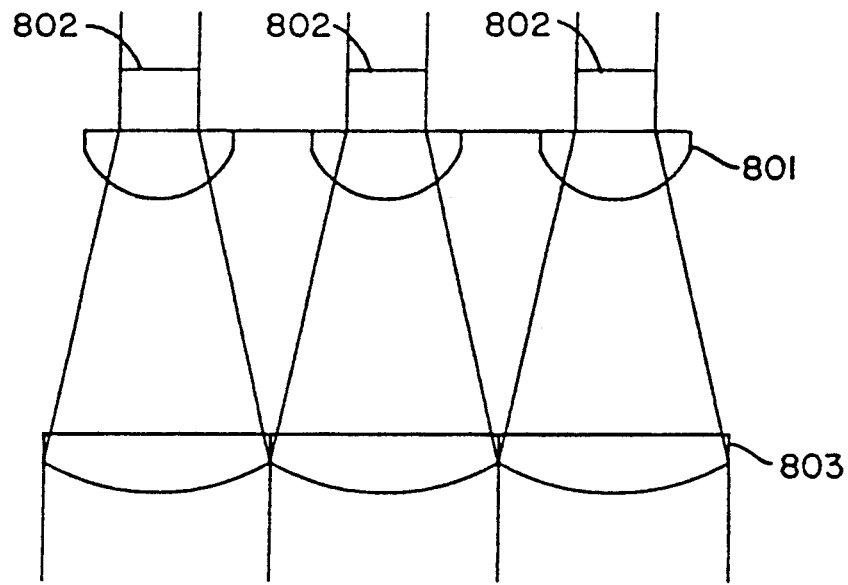
FIGS. 8a and 8b are schematic views of lens-system embodiments of the present invention.
Figure 8B:
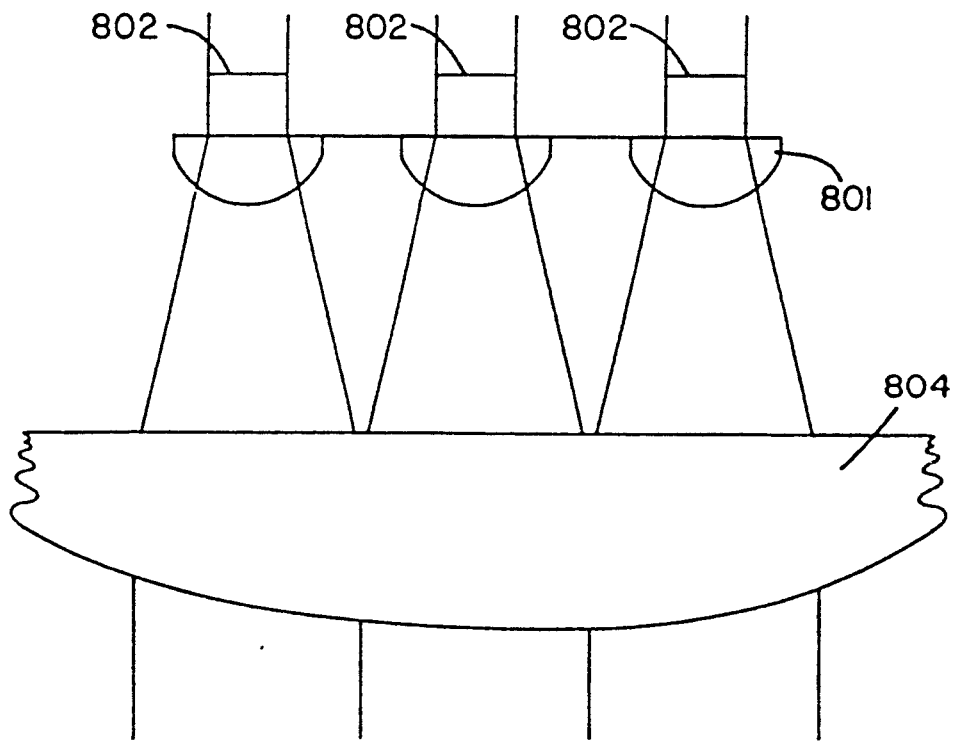

The preferred method of elimination of spaces between full-color pixels (such as are created by the superimposition of the images of three light valves) uses lenses. A lens array 801 (as shown in FIGS. 8a and 8b) constructed with the same number of lenses as there are "full-color" pixels (e.g., the number of color "triads" on the light valves arranged with the center of each lens over each pixel 802) could be used to magnify each pixel as depicted in FIGS. 8a and 8b. Then optionally either a collimating lens array 803 as depicted in FIG. 8a or a large collimating optic 804 as depicted in FIG. 8b could be used to recollimate the now enlarged and contiguous pixels for projection by suitable projection optics.

If the spacing between pixels along the vertical is different than along the horizontal dimension, the pixels can be intentionally underfilled with light, forming a symmetrical dot (as explained below) or anamorphic lenses or equivalent could be used to fill the spaces properly. Although fabrication of small lens arrays is within the state of the art, it is simpler and less expensive to use more readily available lenticular lenses. These cylindrical lens arrays can be overlapped with their axes perpendicular to one another to accomplish the same goal. The separation of lens function for each orthogonal dimension eliminates the need for anamorphic lenses which are difficult to produce accurately and consistently in such small sizes.

It is important to note that eliminating the space between pixels utilizing lenses after the pixels (and before the projection lens) can be done with several different approaches. The lenslet curvature and spacing from the light valve can be selected to produce a real or virtual magnified image of the pixel. These real or virtual images can be magnified just the right amount so that they become contiguous at a plane in space. This plane is then imaged onto the screen by the projection lens.

In actual practice, many virtual and real images of the pixels exist at various locations in spaces of different sizes. The projection lens can be accordingly adjusted slightly back or forth to select the pixel image size which just eliminates the inter-pixel spaces without overlap.

If an arrangement is chosen (as described below) in which the source is imaged into each pixel hole, then the distribution of light within a pixel may not be uniform. If it isn't, a repetitive structure will be apparent on the screen, making pixels visible, even if there actually are no spaces between pixels. In that event, the projection lens should not focus an image of the pixel plane or a magnified real or virtual image of its pixels onto the screen. Instead the projection lens can focus an image of the lens array onto the screen. Each lenslet will be uniformly illuminated even if the light distribution within a pixel isn't uniform.

If the lens arrays aren't constructed well enough so that spacing between lenslets approaches zero, a pixel structure would again be apparent. To eliminate that problem, a second lens array could be used to generate a magnified real or virtual image of the lenslets of the first array. Thus the "pixels" would appear uniform and be contiguous.

With a rear projection system built into a cabinet in which the relationship between the projector and the screen will never be altered, it is possible to build in a system to eliminate the space between the pixels right before the screen. A lens array with the same arrangement as the pixels projected from the projector, placed just behind the screen, will expand the image of each pixel just enough to fill the space between the pixels. This lens array can be built into the screen making it a rigid component of the screen.

The following is a method for inexpensively making the lens arrays necessary for the elimination of the spaces between pixels as well as for other aims which involves creating a master for making lens arrays. The master can be made by taking a semi-soft material such as copper or wax and scoring it with parallel lines with a tool which has a circular curvature at its end. A spherical lens array master can be made by forming a tool with a surface matching the lens surface desired and repeatedly pressing it into such a soft material in a "step-and-repeat" fashion This master can then be made into a hard metal master. If the master is made in copper, the copper can be immersed in an electroplating bath, such as nickel sulfamate. If the master is made in a non-conductive material such as wax, it can first be coated with a thin metallic layer of electroless nickel or by spraying with a stannous-chloride silver solution. Once metallized in this fashion, it can then be placed into the electroplating bath. The nickel master can then be placed on an embossing machine and used to emboss replicas into thermoplastic materials, such as mylar and plexiglass. Such a master can also be used as a mold for injection or compression molding.

Another method of producing the master is to use a computer to make a plot in which the height of the lens is represented as a density. This plot, turned into a transparency, can be photo-reduced and replicated by step-and-repeat procedures to produce a mask with a density pattern which matches the lens array layout. The mask can then be imaged with ultraviolet light onto a photoresist plate. The differing densities on the mask will alter the amount that the photoresist is exposed and after development, will alter the amount of photoresist that will be washed away at each location. This will create a photoresist master in the shape of the lens array. This photoresist master can then by metallized and used for replication.

An alternative method to produce such lens arrays for a projection system is to use lens arrays produced holographically. Such holographic lenses are easier to produce than conventional lens machining at such small dimensions, especially if extremely small F numbers are required. State-of-the-art methods can be used to create the necessary interference patterns.

As was done earlier to eliminate the appearance of red, green and blue pixels, a wedge or wedges may be used to create offset images on the screen, both vertically and horizontally to eliminate the spaces between pixels. The wedge or wedge segments may be conveniently placed at the projection lens to fill each space in the image with a duplicate of the adjacent image data, creating a focused, de-pixelated image. This method is an alternate preferred method of eliminating spaces between pixels in the image.

Figure 32:
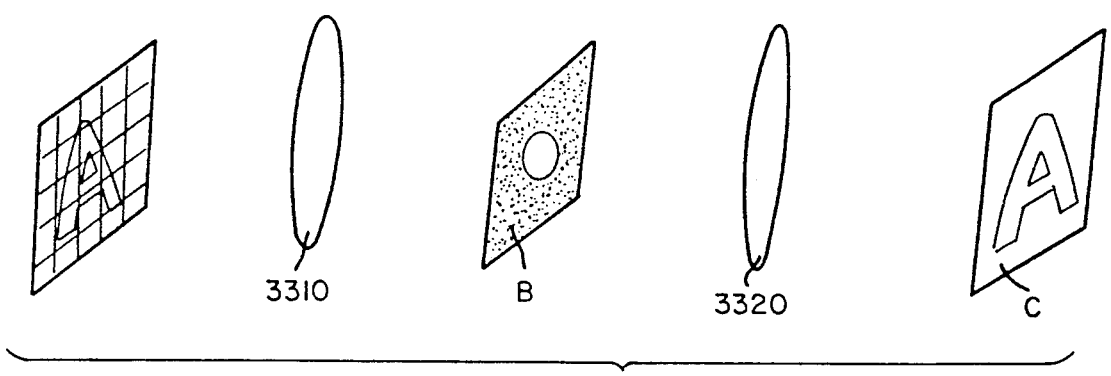
FIG. 32 is a schematic view of the classic method of spatial filtering using a lens to perform Fourier transformation.

Since the spaces between pixels are all horizontal and vertical lines of a fixed width, spatial filtering may be used to eliminate the spaces. The classic method of spatial filtering is demonstrated in FIG. 32. In the input, image A is acted upon by lens 3310, creating a Fourier transform in plane B. Another lens 3320, placed a focal length after plane B, creates a Fourier transform of that transform which is the original image in plane C. If a particular optical filter is placed in plane B, various components of the final image will be eliminated due to the blockage in plane B of the Fourier components. The Fourier components are arranged in a polar coordinate fashion in plane B with the highest spatial frequencies which correspond to the smallest features in the original image located throughout and towards the outside of the Fourier plane. The low spatial frequencies in the image are represented in the central area of the Fourier transform in plane B. Periodic input patterns are represented as localized concentrations of intensities at that frequency in the Fourier plane. Since the thin lines representing the spaces between pixels are high in spatial frequency, they will form large features, located mostly away from the center of the Fourier transform. Therefore, if an appropriate filter is placed in plane B, letting through the lower spatial frequencies, the re-transformed image in plane C will have greatly diminished, or, if the filter is selected properly, eliminated higher spatial frequencies (corresponding to the lines between pixels).

Since all pixels have the same spatial frequency in a given direction, which is different from the higher spatial frequency of the lines between them, those lines can be separated out and suppressed. The image plane A is analogous to the light valve plane in the projector and the lens performing the Fourier transform is analogous to the projection lens. Somewhere in front of the projection lens will therefore be an approximation of a Fourier transform of the image on the light valve. Even though no second lens is used to re-transform the image after a certain distance, a re-transform will occur anyway (at the focused image on the screen), making a final lens unnecessary. All that is necessary in actual operation is therefore the placement of an appropriate filter somewhere after the projection lens. Since the spatial frequency of the line pattern is known, state-of-the-art methods can be used to form a Fourier filter to block out the desired spatial frequency components. The larger the difference between the width of the pixels and the width of the spaces between pixels, the more efficient this spatial filtering process will be. As the widths approach each other, the process will become less effective.

Alternatively, if a lens is placed between the light valve and the projection lens, the light can be made to come to a small focus within the projector. A pinhole can be placed at the focus, allowing most of the light to pass through. Passage of light through a re-transforming lens also placed before the projection lens will create a focused image in space minus the high spatial frequencies of the image from the light-valve plane. If the projection lens is then made to focus on that image, most of the light can be projected onto the screen without lines between the pixels.

Another method of obtaining a brighter image is to use a phase filter beyond the projection lens, constructed in ways that are known in the state-of-the-art either with varying thickness material or a hologram properly laid out. This will still accomplish spatial filtering but will allow more of the light to pass through to the screen.

Figure 6:
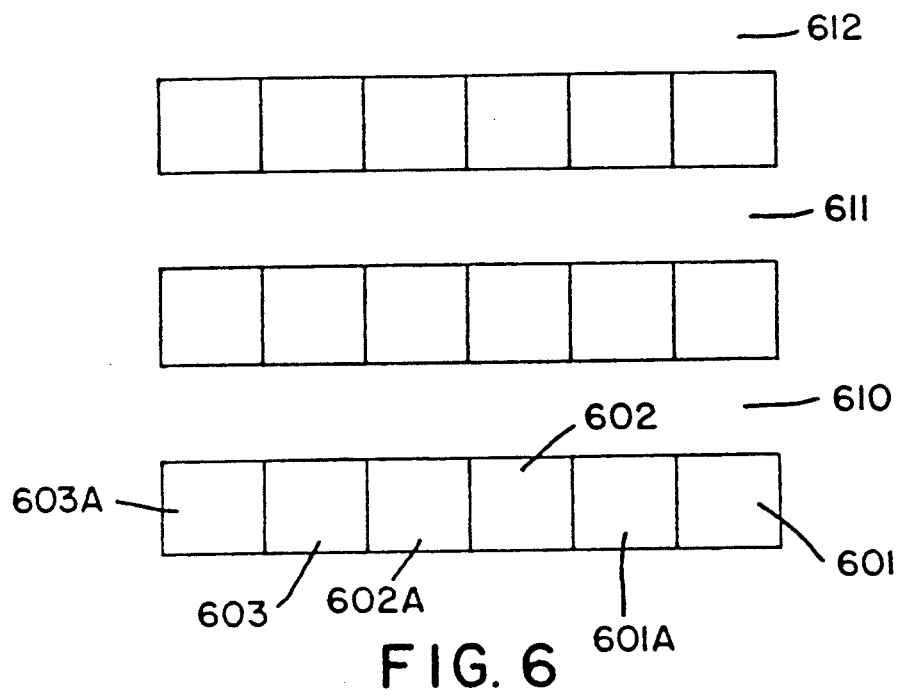
FIG. 6 is a schematic view depicting the filling of spaces between pixels by the first two mirrors (a "striped-mirror pair") of the four-mirror system of FIG. 5.

An alternate method of filling the spaces between pixels is by the use of mirrors. To make a mirror system that duplicates the pixels in the proper places with minimum waste of light, a special "striped-mirror system" can be used. One such configuration is shown in FIG. 5. Light containing full color image information 501 (laid out as indicated in FIG. 4) hits a "striped-mirror pair" labeled as 502 and 503. This causes the entire image to be duplicated and shifted horizontally the width of one pixel with approximately one-half the brightness of the original image (which is also reduced to one half of its original brightness), filling the spaces between pixels in the horizontal rows as shown by FIG. 6. Vertical rows 601A, 602A, and 603A are duplications of vertical rows 601, 602, and 603, respectively The combined (original and duplicated) image existing in space 504 of FIG. 5 then passes through a second "striped-mirror pair" 505 and 506, which duplicates the image but shifts it vertically the height of one pixel. This produces two images of equal brightness, one above the other, filling in the horizontal rows indicated in FIG. 6 as 610, 611, and 612. Thus, a "solid" image is created with no blank spaces. Eliminating blank or dead spaces, separately colored pixels, and thus the distinction between pixels subjectively improves image resolution even above today's CRT images at close range since CRTs have discernible lines, pixels and spaces.

Figure 7:
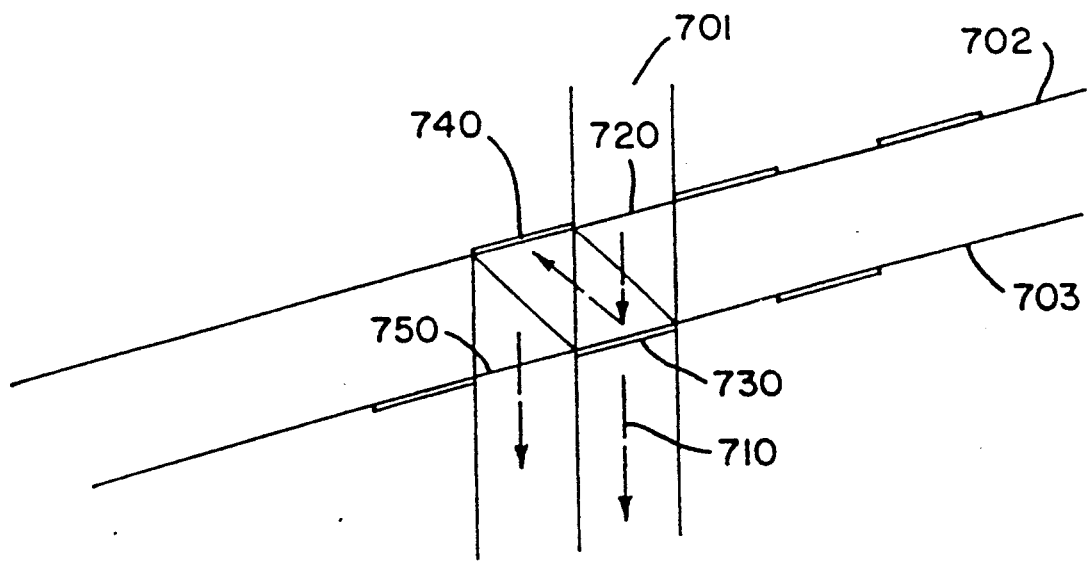
FIG. 7 is an enlarged schematic view of a "striped-mirror pair" of the four-mirror system of FIG. 5.

A "striped-mirror pair" is better understood by reviewing FIG. 7. Light from a single pixel 701 impinges upon a "clear" space 720 on the first mirror 702 of the mirror pair. This first mirror is made of glass, plastic or other suitable material which is AR coated over the visible spectrum and coated on its opposite side in stripes of a suitable reflective material such as aluminum or silver. The striped coating may be accomplished by, for instance, vacuum deposition with a "striped mask over the glass." Alternatively, the glass can be coated with photo-resist and exposed to a projected image of stripes of the desired size. After development, the glass will be exposed for metal vacuum deposition only in the desired stripes. After deposition, the remaining resist could be peeled off or dissolved away, leaving the required clear stripes.

The second mirror 703 of the pair also has alternating clear and reflective stripes. On this mirror however, the reflective coating is thinner, creating partial mirrors instead of full mirrors. The percentage of reflectivity is adjusted so that the two pixel images which emerge are of equal brightness.

Light from pixel 701, after passing through space 720, impinges on partial mirror 730, creating a transmitted beam 710 and a reflected beam which hits mirrored surface 740 on first mirror 702. This reflects light through clear space 750 on mirror 703 creating a second beam 710a which is an exact duplicate of beam 710, except that it is contiguously displaced from beam 710. If the spacing between pixels is not equal to the dimensions of a pixel, the mirrored areas 0 on mirror 702, as well as clear spaces 750 on mirror 703, may be adjusted to the dimensions of the space between pixels.

The overhead view of FIG. 5 shows that "striped-mirror pair" 502, 503, which has vertical stripes, is tilted with reference to beam 501 around a "vertical tilt axis" to create a horizontally displaced duplicate image and a "striped-mirror pair" 505, 506, which has horizontal stripes, tilted around a "horizontal tilt axis" (which is perpendicular to the tilt axis of the first "striped-mirror pair" and to the beam 501) to create a vertically displaced duplicate image.

Arrangements which break up a white collimated beam into colored collimated beams, as well as configurations which combine multi-colored collimated beams into a single collimated white beam are reversible and can be used on either side of a light valve to make full use of all light in the beam, illuminate a monochromatic light valve with the properly colored beams, recombine the colored beams to form full-color images without individually discernible color pixels and produce an image which is continuous, having no spaces between the pixels.

Figure 3:
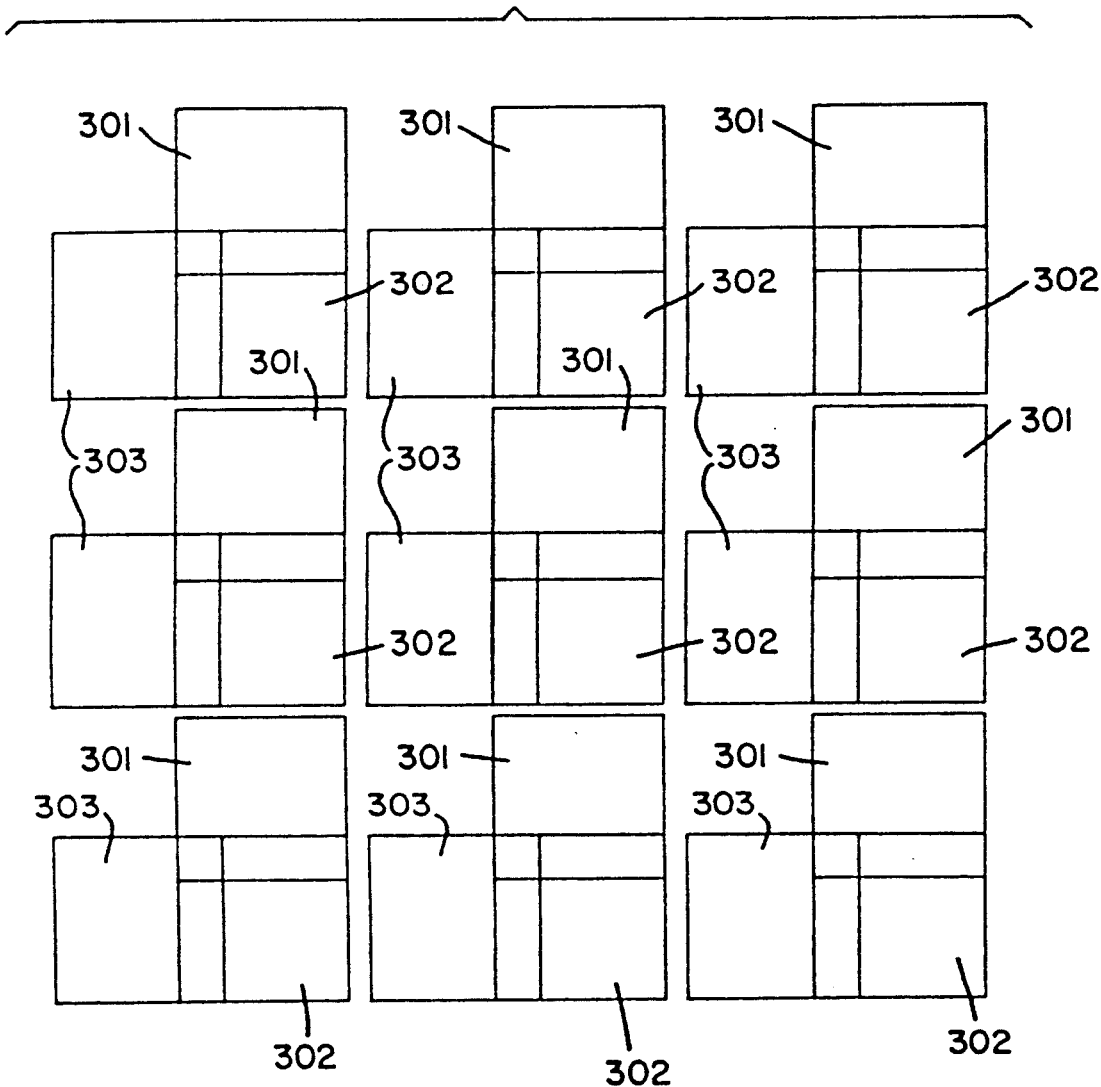
FIG. 3 is a schematic view of various pixels with reduced spaces between them.

The use of time multiplexing, as previously explained, can be used to fill dead spaces between pixels with duplicate pixels to create a "continuous" image. The three color images can be slightly offset to somewhat fill the spaces between pixels. FIG. 3, for example, shows blue pixel 301 slightly higher than red pixel 302 and green pixel 303 slightly to the left of each red pixel 302. Many other arrangements of offsets of the different colored pixels are possible to decrease black spaces in the image; however, the individual colors remain visible at close range.

To produce a good quality color image, it is important to have as high a resolution as possible, as well as to superimpose red, green and blue pixels on one another to eliminate the appearance of individual color pixels and to eliminate spaces between pixels. Whether accomplishing this with three optical paths and three light valves or by dividing up a single light valve with a large number of pixels into 3 sections to produce the 3 color images, the cost is higher and the system consumes more space and weight than a simple single light valve system. However, a single light valve doesn't have the resolution of three light valves. It is therefore desirable to devise methods which produce a high quality, high resolution image without the added cost, complexity, weight and size increase as stated above.

Obviously, increasing the number of pixels in a light valve will increase the resolution of the image. Two or more projectors used to project contiguous images can produce an image with higher resolution than can be produced by a single projector using available light valves. Alternatively, a single projector can be made which essentially contains the components of several projectors but with the contiguous images produced side-by-side within the projector so that the composite image can be projected with a single projection lens. This will eliminate the need for alignment of externally placed projectors and will produce a higher resolution than is capable of being produced by a single light valve system.

Regardless of the relationship between the lines of pixels with respect to the placement of color dots within them, if any grouping of three colored pixels of the light valve is used to form a color triad representing the color of a particular point of the scene displayed, then the resolution capability of the LCD is reduced by a factor of 3. This resolution limitation can be reduced, however, if each pixel of the light valve, being either red, green, or blue, is driven by a signal that corresponds to that light valve pixel's color at that point in the original scene, and the data about the remaining two color values at that point in the original scene is simply discarded. The eye will tend to blend the color contributions of neighboring pixels to produce the correct color for that area of the scene, but retain the capability to distinguish detail as fine as the actual pixel spacing.

"Time-share scanning" (described herein) can be applied to create a high resolution image with a lower resolution light valve. For instance, an image can be projected having a space between every two pixels, along each horizontal line equal to the width of a pixel. This can be accomplished, for instance, by fabricating the light valve that way or by using lenslet arrays to appropriately change the size of each pixel. Thus, if a light valve is capable of, for instance, 500 pixels on a horizontal line, the resolution can be doubled to 1000 by time-share scanning. One-half of the time can be used to project an image from the light valve as it exists onto the screen, while the other half of the time can be used to project an image of intermediate pixels onto the screen, giving the image twice the resolution of the light valve in that direction. Unlike other time multiplexing schemes, no decrease in brightness is created since each segment of time projects all of the light from the light source onto the screen and thus all of the light from the light source is visible to the viewer at all times. This technique could also be used to double resolution in the vertical direction creating, for instance, a high definition image from a standard resolution light valve.

The systems disclosed in this application can use discrete and individually addressed and maintained pixels. This approach provides the basis for true digital television. Presently both audio and video signals are digitized and stored as digital bits on laser disks and "Cds." This digitization preserves the exact values of the signal from micro-second to micro-second. Distortions in the systems, such as amplifier noise and non-linearity, scratches, dropout and other defects on the recording material and so on can be completely ignored by a system looking only at each bit to see if it is on or off, i.e., a "o" or a "1," and not caring if it varies in strength or clarity. This will result in more precise, higher quality television and video display. The upcoming thrust toward High Definition Television should move the field toward this type of a digital display device as the system of choice. In summary, the present invention makes possible a viable basis for implementation of digital and High Definition TV, regardless of the format convention selected.

Use of digital processing makes it easy to eliminate the problems inherent in today's video systems such as ghosts, chroma crawl, moire patterns, snow and crosstalk between chrominance and luminance signals. It also makes the creation of additional pixels in the receiver by interpolation between any two pixels possible, thus creating the appearance of even higher resolution in the receiver than is actually transmitted. It also makes special features very easy to implement such as picture in picture, zooming, frame freezing, image enhancement, special effects and so on.

All electronic image production systems, whose images are made of a finite number of pixels, have an artifact which becomes more noticeable as the number of pixels in the image decreases. This artifact is often referred to as jaggies or aliasing. When a diagonal line, such as a boundary between two different features, is presented in the image, the line becomes jagged, as if it were a staircase, since the pixels are usually square with their edges parallel and perpendicular to the horizon. To reduce the noticeability of these jagged boundaries, known anti-aliasing techniques can be implemented, especially if used in a digital system, since it is already computerized. When a boundary is detected between two areas of different brightness values and/or different color values, a calculation can be performed to find the average brightness and color between the two values. Then, making all pixels along the boundary that new value will create a transition between the boundaries that is much harder to see, thereby reducing the appearance of a jagged edge.

The image brightness which can be produced by a projection system is in part dependent on the bulb brightness. This generally means that for more brightness, a higher wattage bulb should be used. The bulb wattage that can be used in many environments is, however, limited. A home projector shouldn't draw more than about 5 amps, which corresponds to about 600 watts. A higher wattage projector becomes very expensive to operate and discharges a great deal of heat. It is therefore desirable to use a bulb which has as high an efficiency, measured in lumens produced per watt consumed, as possible. The best light source uses a microwave stimulated plasma. This type of bulb, currently in prototype form, can produce up to 130 lumens per watt. Other sources which can be used include Xe, Hg and metal halide bulbs which can produce from 75 to 95 lumens per watt. Tungsten halogen bulbs can produce as much as 40 lumens per watt and regular tungsten can produce up to 25 lumens per watt.

Figure 37:
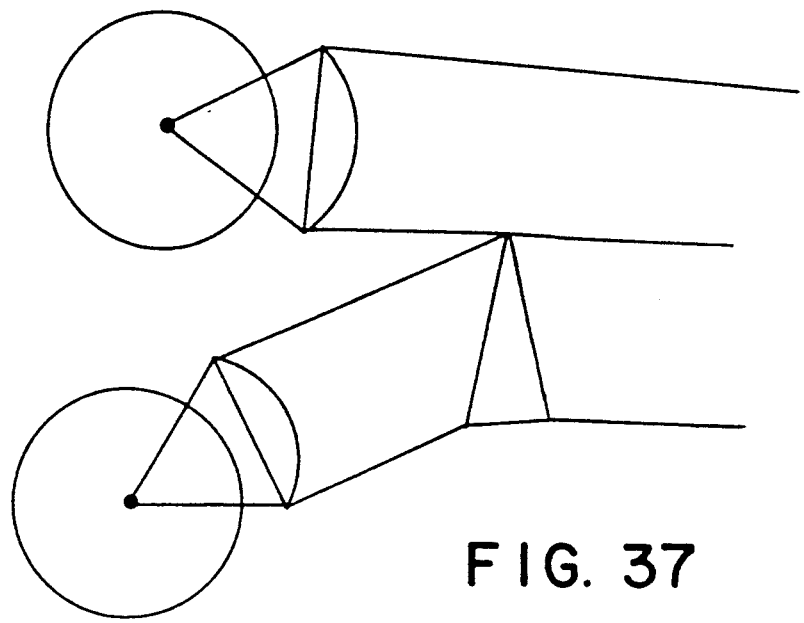
FIG. 37 depicts a schematic view of a section of the electronic image projection system in which two light sources are used whose beams are collimated and made continuous by the use of a prism.
Figure 38:
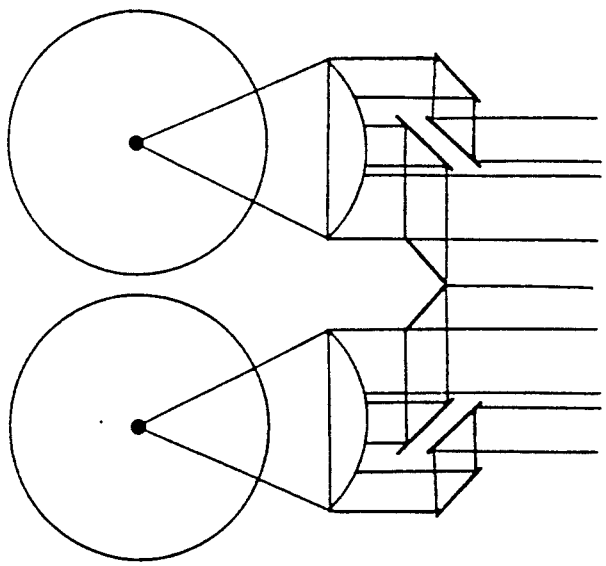
FIG. 38 is a schematic view of a section of the electronic image projection system in which light from two collimated beams is redistributed by the use of mirrors to produce a single beam with a Gaussian-like distribution that would be found in a single beam.
Figure 45:
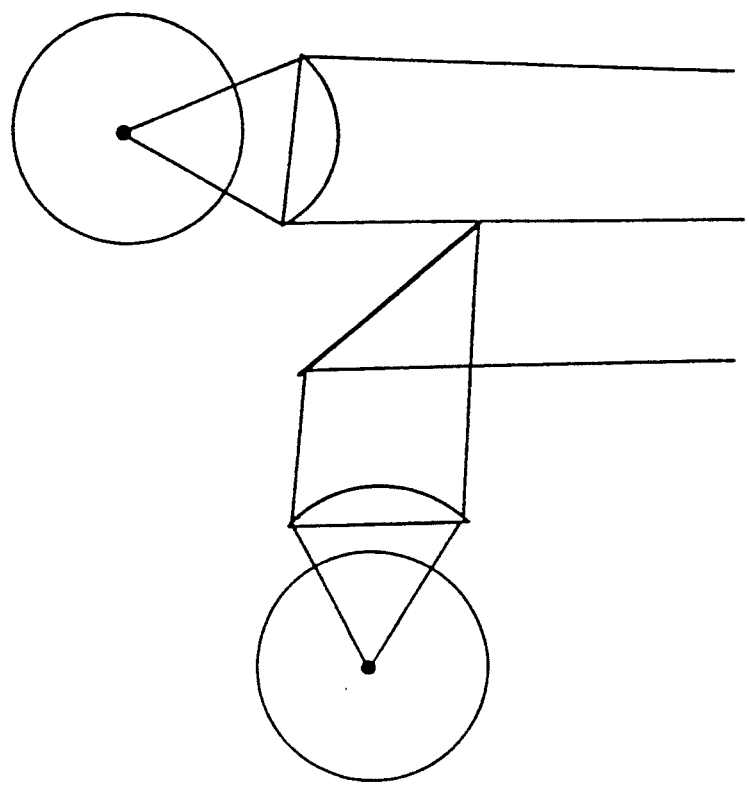
FIG. 45 is a schematic view of a section of the electronic image projection system in which two collimated beams are made contiguous by the use of a mirror.

Instead of using a high powered bulb with a large filament or arc, two or more bulbs of lower wattage and smaller filaments or arcs can be used. Using multiple lamps presents several advantages. If a lamp should burn out, the system would only diminish in brightness, operating with the remaining lamp(s) until the lamp is replaced. Each bulb, being of lower wattage, can have a much longer lifetime, and a smaller filament or arc can make focusing an image of the source into the pixel hole easier. Various methods can be used to combine the beams for use. FIG. 37 illustrates one example in which two light sources are collimated and made contiguous by the use of a prism. FIG. 45 shows how a mirror can be used to make 2 collimated beams contiguous. Another method of eliminating space between separate beams is the use of mirrors to take light from one part of a beam and use it to fill in spaces between beams. An example of this is illustrated in FIG. 38.

Figure 43:
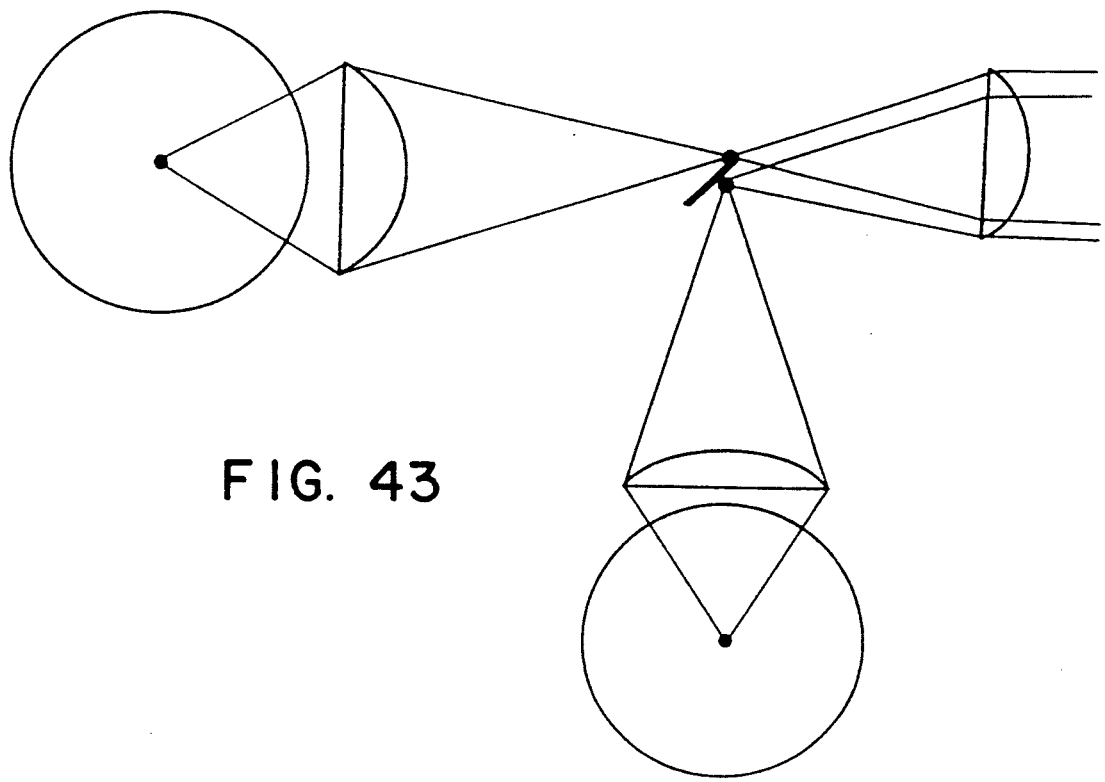
FIG. 43 is a schematic view of a section of the electronic image projection system in which separate light beams are caused to become a single light beam by bringing the beams to separate foci and using a mirror to redirect one of the beams so that the two beams become collinear.

Alternatively, the beams can be made to come to a focus at an area in space so that the filament or arc images abut one another, forming a new composite light source. By the use of mirrors, these point sources can be made to propagate in the same direction, making it easy to collect with a single condenser lens to form a single collimated light beam containing most of the light originally captured. An example of this is shown in FIG. 43.

The accuracy of reproduced color depends on several factors. With the use of properly selected color filters or dichroic mirrors, correction for wavelength versus light valve cavity thickness versus voltage, as described above, and normal Gamma correction and other normal TV color circuitry, the fidelity of color reproduction is still limited by the color makeup (i.e., color temperature) of the light passing through the projection system. Incandescent lighting, although simple and inexpensive, produces a low color temperature, resulting in a "reddened" image, while discharge lamps, such as metal halide, xenon, mercury and especially microwave driven plasma (which provides constant brightness and color temperature even with tens of thousands of hours of operation) produce higher color temperature with more realistic whites and colors. However these lamps have the drawbacks of being more expensive, have bigger and heavier power supplies and are often more difficult and dangerous to use and replace. Realistic colors can be produced with the use of incandescent sources if a color-temperature-compensating filter is used. At the expense of some brightness, the entire color spectrum can be shifted towards the blue, producing more realistic whites and colors. The advantages of using an incandescent source are that they are rugged, inexpensive, safe and easy to replace and need a small power supply or no power supply at all.

A number of approaches might be taken to extend the life of the light source. The microwave stimulated plasma bulb for example has virtually an unlimited lifetime, and is thus best for eliminating bulb replacement.

To extend the life of a filament bulb, circuitry could be used to run the filament on smoothed DC. Furthermore, the circuit could ramp up the voltage slowly whenever the lamp is turned on to reduce shock due to rapid heating and filament motion.

For an incandescent bulb to have the highest efficiency as well as high color temperature, it is necessary for it to have a tightly wound filament which runs on relatively low voltage and high amperage. This would normally necessitate the use of a large and heavy stepdown transformer. To eliminate this burden, a triac circuit can be used to chop up the duty cycle, utilizing only part of each cycle. Selecting the proper duty cycle will provide the filament with the reduced voltage that it requires. A feedback circuit can also be included to monitor line voltage and to adjust the duty cycle to compensate for line voltage changes so that a constant reduced voltage is fed to the filament.

The projection systems described herein have brightness limitations due to low efficiency at various points in the system. Various methods can be used to increase the efficiency at these points and thereby the overall efficiency and brightness of the projector can be dramatically increased.

One problem common to all projection systems is the efficiency of the light collection optics. Usually, only a small percentage of the light produced by a bulb is actually collected and utilized in the projection system. To further improve the efficiency of the system, various methods can be used to increase the amount of light that is captured from the bulb for use in projection. In the prior art, a light source, such as a filament or arc, is positioned with a condenser lens, such as an aspheric condenser, in front of the source with a spherical mirror behind it. This arrangement is used in most projectors and captures some of the rearward and forward propagating light. The majority of the light, however, propagates to the sides, upwards and downwards and is wasted.

Figure 42:
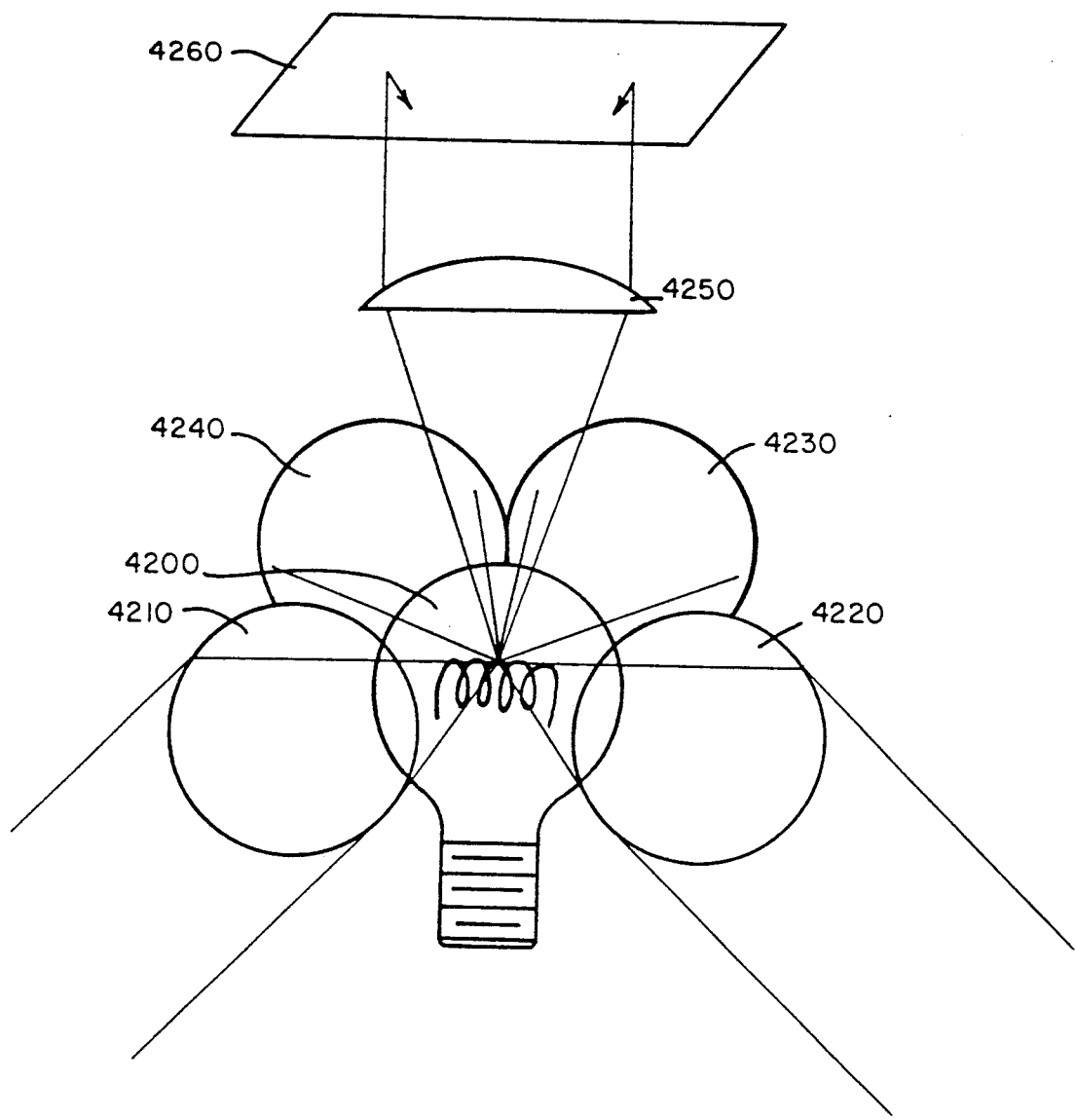
FIG. 42 is a schematic view of a segment of the electronic image projection system in which multiple condenser paths are used to capture more light from a light source for use in projection.

A preferred method of utilizing this normally wasted light is the use of multiple condenser paths as shown in FIG. 42. Two condenser lenses 4210 and 4220 and two spherical mirrors 4230 and 4240 will capture twice as much light emanating from a bulb 4200 as in the conventional system. In all bulbs today, light traveling in one direction can never be utilized since one side of the bulb is used to connect power into the bulb to the arc or filament. Light from the remaining (upwards) direction can be captured by an additional condenser lens 4250 and reflected by a mirror 4260 into the system. The beams can be joined into a single beam using the methods described elsewhere herein.

Figure 39:
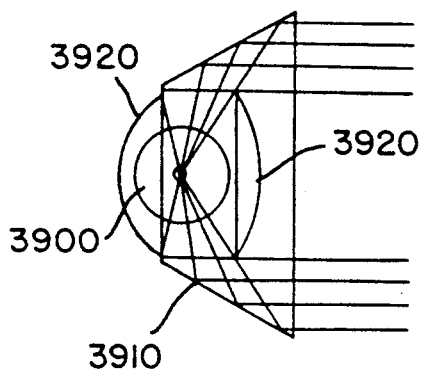
FIG. 39 is a schematic view of a section of the electronic image projection system in which a parabolic reflector is used in conjunction with a conventional spherical reflector and condenser lens to capture more light for use in projection.
Figure 40:
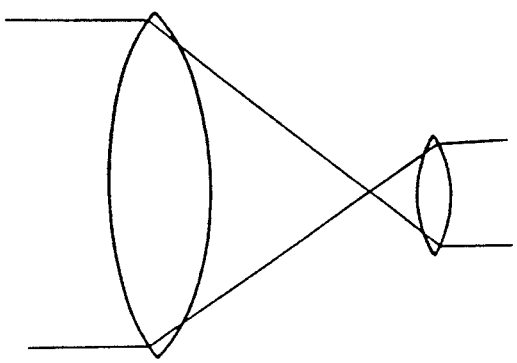
FIG. 40 is a schematic view of a Galilean telescope which may be used to reduce a collimated beam's diameter to a smaller collimated beam.

Another method to utilize this otherwise wasted light is to place a section of a parabolic reflector 3910 around the lamp 3900 in a conventional condenser setup 3920 as shown in FIG. 39. Light that would otherwise be unused is now collimated and sent forward to join light emerging from the condenser lens. To reduce the size of the resulting collimated beam, which will probably be necessary in most applications, various optical methods may be used, such as the Galilean telescope made of two lenses, as depicted in FIG. 40.

Figure 41:
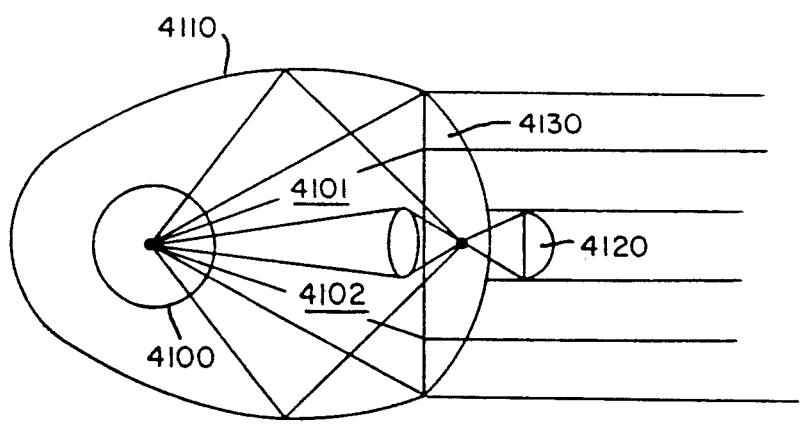
FIG. 41 is a schematic view of an alternate embodiment of a section of the electronic image projection system in which an elliptical mirror is used in conjunction with two collimating lenses to capture and use otherwise lost light.

Another method used to capture more light from a bulb is depicted in FIG. 41. In this arrangement, a source 4100 is placed at one focus of an elliptical mirror 4110. Any light which hits this reflector will be focused to the second focus of the ellipse where it can be captured for collimation, for instance, by a condenser lens 4120 with a low F number. However, light which misses the reflector (4101 and 4102), except for light on axis, is lost. This light can be utilized by placing a collimating lens 4130 at the second focus. This lens will collimate light that would miss the second focus, but will have almost no effect on the light going to the second focus.

Alternatively, a section of a parabola 4610 can be used to capture and collimate that otherwise lost light. This can be seen in FIG. 46.

Figure 50:
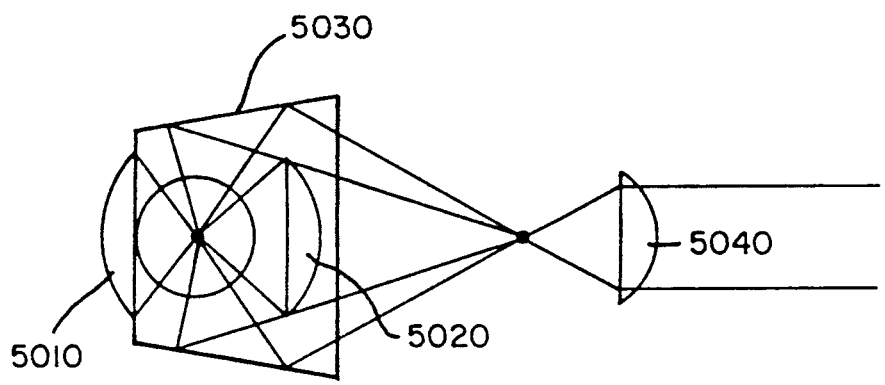
FIG. 50 is a schematic view of an alternate embodiment of a section of the electronic image projection system in which a section of an elliptical reflector is used to capture light that is not captured by a spherical reflector and a condenser lens to bring the light to a focus at the same point at which the condenser lens brings light to focus for use in projection.

An alternate method of using an elliptical surface efficiently is depicted in FIG. 50. In this setup a spherical mirror 5010 makes rearward going light into forward going light. A lens 5020 captures forward going light and brings it to a focus. A surrounding elliptical surface 5030 captures light which misses both the spherical reflector and the focusing lens and brings it to the focus of the focusing lens. At this point light can be gathered from the focal point and collimated by a single lens 5040.

Collection systems which capture light from wide angles, such as those disclosed herein, generally have large apertures. This leads to a large collimated beam. As pointed out herein, such a beam can be reduced in diameter, for instance, by a telescope arrangement where the output lens has a shorter focal length than the input lens. This reduction of beam diameter is accomplished with an increase of angles of non-collimated rays within the beam. This results in a restriction of how long the internal optical path of the projection system can be before light spreads so much that it doesn't get into the projection lens.

Several measures can be taken to condition the light to allow for an increased internal path length if one is desired for a particular system design.

Figure 51:
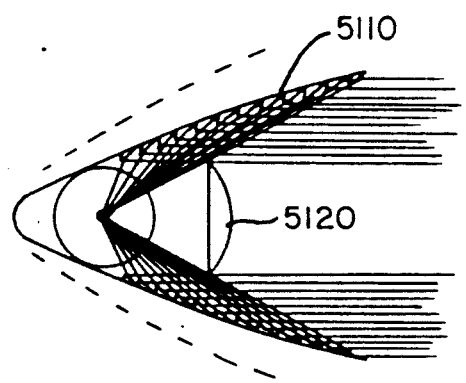
FIG. 51 is a schematic view of an element of the electronic image projection system referred to as a Fresnel parabolic reflector.

A preferred method of dealing with this limitation is depicted in FIG. 51. This method is accomplished by generating a reflector surface which will be referred to herein as a Fresnel Parabolic Reflector. (The same logic can be used to produce other surfaces such as a Fresnel Elliptical Reflector and so on.)

By assembling segments of a parabola (dashed curve), an equivalent parabola 5110 can be constructed with a narrow opening (solid curve). Thus, the collimated beam need not be reduced much, if at all. Thereby, angles are not increased and collimation length is left longer.

An alternate approach to this limitation is to use the idea used in fiber optic cables. In such a cable, light can travel a long distance but, because of continued low-/loss internal reflections, the beam diameter does not increase until the end of the "tunnel," which in our system can be where the light valve is placed. Multiple tunnels can be used if multiple light valves are used. Such a tunnel can be made of mirrored surfaces instead of fibers and can take various shapes such as square, rectangular or circular.

The use of non-imaging concentrator optics can be used to further reduce the beam diameter, essentially allowing for the optical reduction of the size of the light source. This will allow for the use of a brighter bulb, with a larger arc or filament. The concentrator optics, normally used to concentrate light for solar collectors, can concentrate the light to a smaller area than the original arc or filament. This will allow for greater collimation and, thus, permit more light into a longer path system. One name commonly used to describe such a concentrator is a "compound parabolic concentrator" although the reflective surface actually has hyperbolic walls. The two currently known designs for non-imaging concentrators, originating in the 1960s, are referred to as "edge-ray" concentrators and "geometric vector-flux" concentrators.

To further increase the amount of light that gets into the projection lens and thus, reaches the screen, the distance from the light valve(s) to the projection lens must be kept to a minimum (so non-collimated light gets into the projection lens). To accomplish this the focal length and F number of the projection lens should be kept to a minimum.

If three light paths are used because three light valves are used to modulate the red, green and blue images separately, the colored images must be recombined to form a fullcolor image. This can be done with various arrangements, such as the one depicted in FIG. 2. However, to minimize the distance between the light valves and the projection lens, a dichroic combiner cube will keep the distances to a minimum. Such a cube, known in the art, consists of four equilateral triangular prisms placed together to form a cube. The faces that touch one another include dichroic coatings to allow the three colored image-bearing beams to combine into a fullcolor image.

Conventional direct-view light valves utilize color filters to create a full-color image. Color filters work by absorption, which unfortunately wastes approximately two-thirds of the light, converting it to heat, which exacerbates the heating problem.

Figure 25:
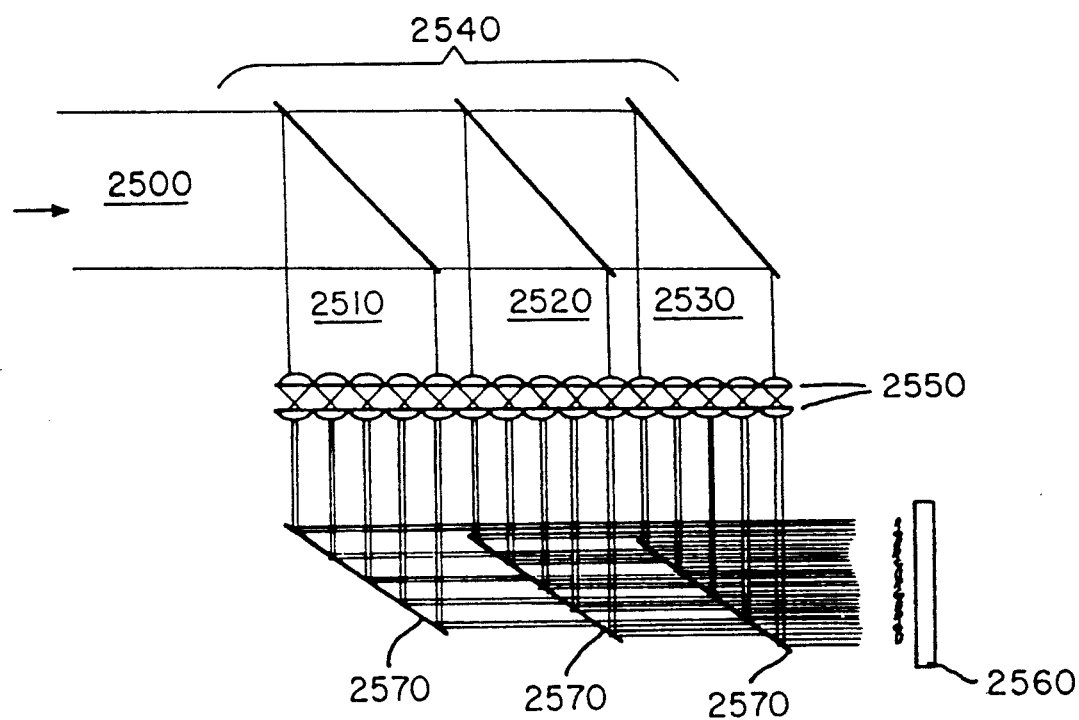
FIG. 25 is a schematic view of a section of the electronic image projection system in which dichroic mirrors separate a collimated beam of a white light into colored beams of light which pass through a double lens array creating demagnified collimated beams of colored light arranged side by side by a second set of dichroic mirrors for use as a multicolored beam to illuminate a full color light valve.

An alternative method to making such a color mosaic without the use of absorptive color filters is illustrated in the following embodiment. FIG. 25 shows a collimated beam of white light 2500 which is separated into three collimated beams, one red 2510, one green 2520 and one blue 2530, by a dichroic mirror arrangement 2540. These beams then pass through a double lens array 2550, each array containing the same number of lenses as the number of pixels in the light valve 2560. Each lens pair formed by one lens from each lens array produces a Galilean telescope, producing a collimated beam of reduced diameter. The lens curvatures are chosen so as to provide a 3:1 reduction in diameter of each collimated beam. A second dichroic mirror arrangement 2570 brings the color beams together, but, due to displacement of two of the mirrors, the beams do not actually overlap, forming a mosaic of colors to illuminate the monochromatic light valve in whatever color arrangement is chosen (such as the two arrangements described above and depicted in FIGS. 15A and 15B).

Figure 26:
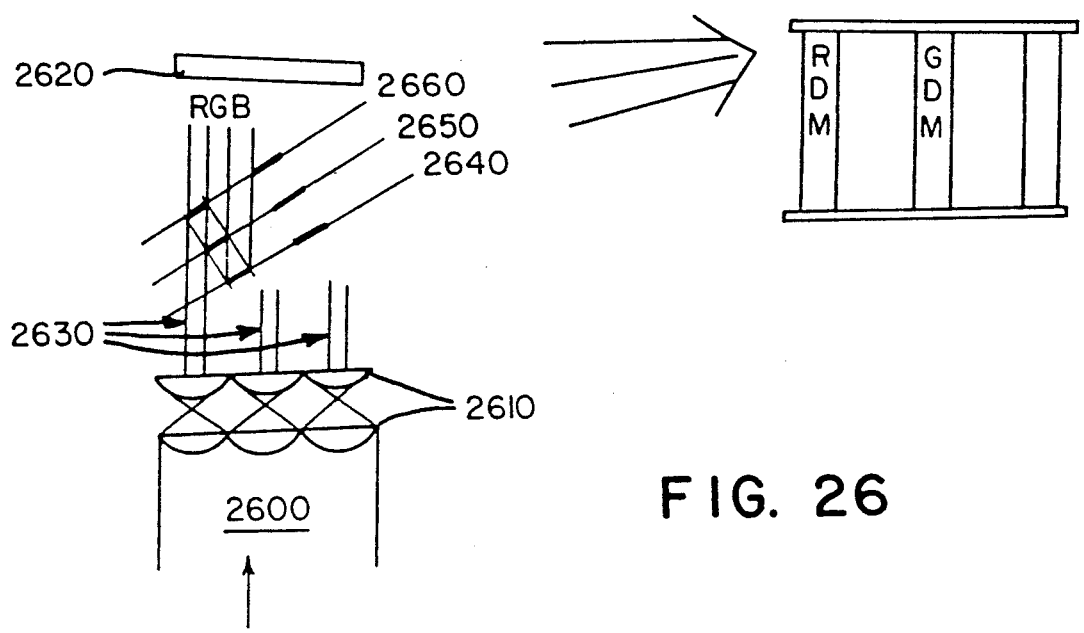
FIG. 26 a schematic view of an alternate method of producing a multicolored light beam in the electronic image projection system for use in illuminating a multicolored light valve.

An alternative method of producing a mosaic of colored beams is illustrated in FIG. 26. Collimated light 2600 passes through a double lens array 2610, which again contains the same number of lenslets per array as there are pixels in the light valve 2620. The focal lengths of the two arrays are different, such that a series of collimated beams is formed 2630. The width of each beam is the size of a pixel and the spacing between collimated beams is equal to twice the pixel pitch. Each collimated beam intercepts a stack of 3 special mirrors.

These "mirrors" consist of mirrored areas, separated by clear spaces which are twice the size of the mirrored areas. The width of the mirrored areas is chosen so that each collimated beam will exactly fill each mirrored area when hitting the mirror at 45 degrees to the normal of the mirrors. Tracing the path of a single collimated beam emerging from one of the lenslets, the beam passes through clear areas in the first two mirrors 2640 and 2650 in the stack, hitting a dichroic mirrored surface on the third mirror 2660. This dichroic mirror transmits the red light and reflects the blue and green light downward. This blue-green beam hits a dichroic mirrored area on the 2nd mirror, which reflects a collimated green beam in a direction parallel to the red beam, while transmitting the blue beam. The blue beam hits the first mirror, which is a standard first surface mirror, so that the beam is parallel to the red and green beams. These red, green and blue beams illuminate three pixels on the light valve, which is monochromatic, but is addressed with red, green and blue data, respectively. Alternately, the dichroic mirrors could be replaced with volume holograms to accomplish the same result.

Figure 27:
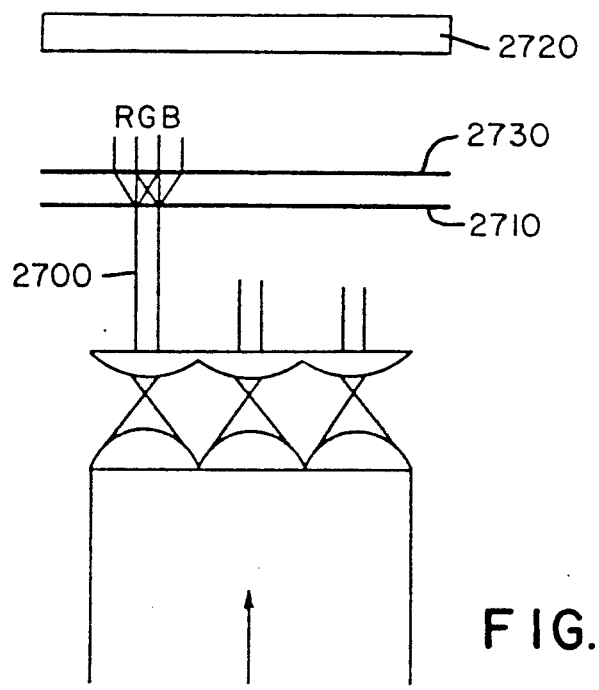
FIG. 27 is a schematic view of an alternate method of producing a multicolored light beam utilizing a hologram to separate a white light beam into red, green and blue beams and a second hologram to make parallel the resulting beams.

In another embodiment, shown in FIG. 27, one of the collimated mini-beams 2700 (as described above) hits a hologram 2710 which refracts/diffracts the light, breaking it up into essentially red, green and blue beams. A second hologram 2730 or series of prisms bends the off-axis beams back on axis, so that parallel red, green and blue beams are formed, which can then illuminate a full color light valve 2720, as previously explained.

Use of a dichroic or holographic system to produce a mosaic of colored beams can be done in conjunction with a color filter mosaic as well. Since the light is properly colored before hitting the filters, less will be absorbed and selected saturated colors will result.

Light valve systems that utilize rotation of the plane of polarized light have a major loss of efficiency because, to rotate polarized light, the light valve must be illuminated with polarized light. Systems in use today make polarized light by using sheet polarizers which produce polarized light (inefficiently) by absorbing all light except that which is polarized in the desired direction. This wastes more than two-thirds of the light and causes the polarizer to heat up. In the light valve systems in use today, the polarizers are mounted on the light valve. Thus, when the polarizer heats up, the light valve heats up, limiting the amount of light that can be sent through the system.

One solution to this light valve heating problem is to mount the polarizers a sufficient distance away from the light valve and to cool the polarizers directly.

A better solution which also alleviates the inefficiency of sheet polarizers is to use a MacNeille prism for polarization. The MacNeille prism makes use of the fact that light which hits a dielectric surface at an angle, such as Brewster's angle, splits into reflected and transmitted beams which are somewhat orthogonally polarized. This effect can be maximized by applying several layers of dielectric coatings, with alternating indices of refraction, such as by vacuum deposition, onto the surface between two glass prisms, cemented together to form a cube.

When the cube is properly constructed, approximately 50% of the light entering the cube is transmitted as P-polarized light and approximately 50% of the light is reflected by the diagonal surface as S-polarized light. Since most sheet polarizers absorb between 65% and 75% of the light that hits them, just utilizing one of the beams from this cube will increase the amount of light available for the light valve and will greatly diminish the light valve heating problem caused by sheet polarizer heating due to absorption. Both beams can actually be used so that very little light is wasted in the process of providing polarized light for use by the light valve.

Figure 44:
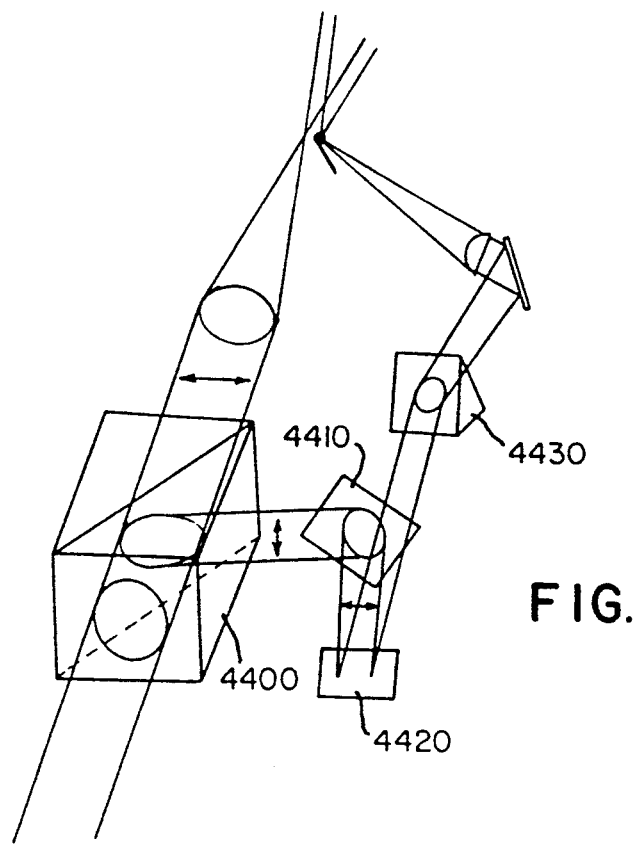
FIG. 44 is a schematic view of an embodiment of a section of the electronic image projection system in which mirrors are used to rotate the polarization plane of a beam coming from a MacNeille prism to make the resulting beam parallel with another beam from the MacNeille prism.

Both beams could be used by employing mirrors which reflect one of the beams emerging from the cube such that its plane of polarization is rotated when the two beams are joined as side-by-side parallel beams of light. As shown in FIG. 44, S-polarized light reflected by the cube 4400 is reflected downwards by a mirror 4410, rotating the plane of polarization of the light with respect to the horizon. A second mirror shown in the diagram as mirror 4420 reflects this light in the direction of the P-polarized light emerging from the cube while maintaining its polarization orientation. By positioning this mirror at the right angle, this beam will be reflected up to the height of the P-polarized beam emerging from the cube. This beam is then reflected forward by a mirror or as shown in the diagram, refracted forward by a prism 4430 forming a second beam of light parallel to the other beam emerging from the cube, both in its direction of propagation as well as in its plane of polarization. Each beam can be brought to a focus with the use of lenses and mirror right next to each other, forming a single expanding polarized light beam. Other methods described herein could also be used to combine the beams so that both would illuminate the light valve.

Figure 54:
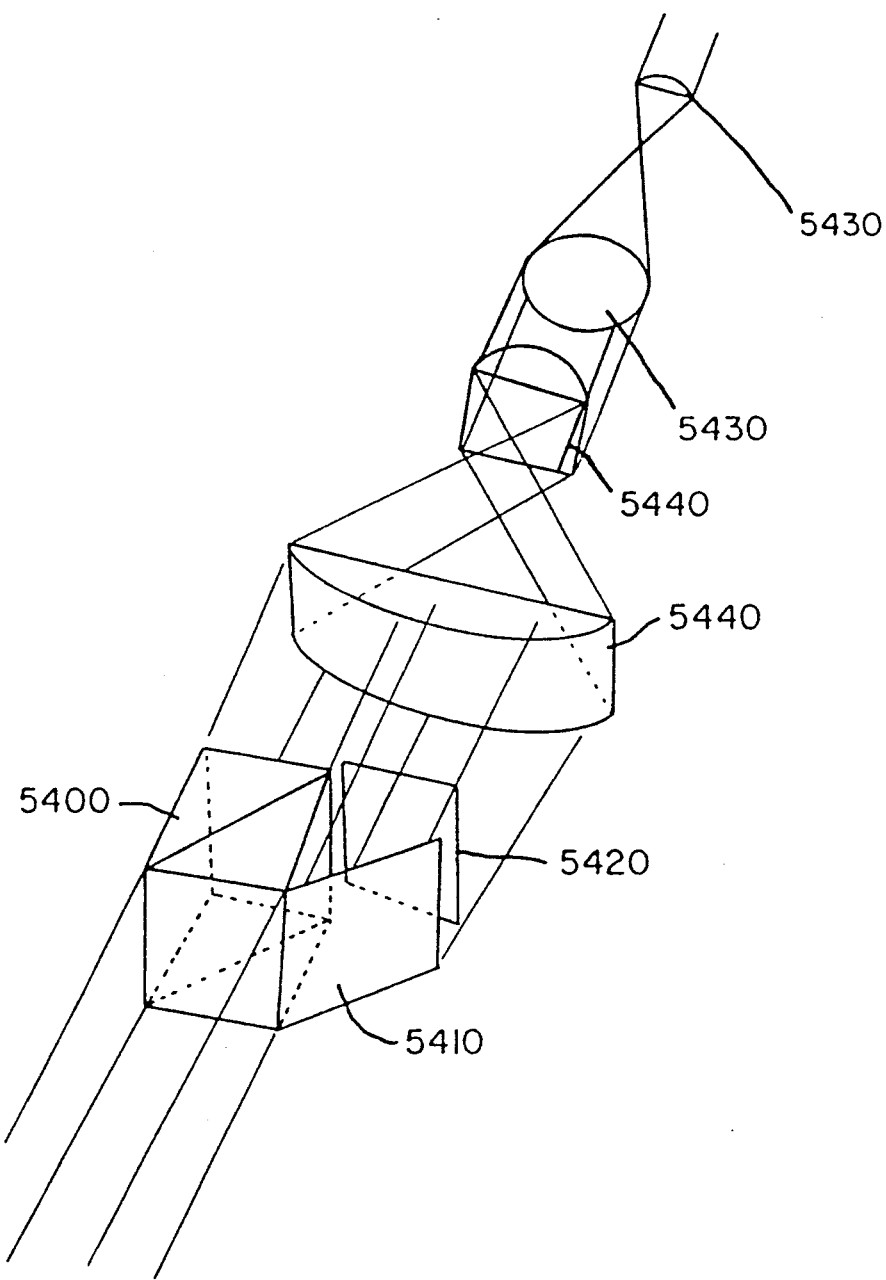
FIG. 54 is a schematic view of a section of the present invention in which a MacNielle prism and halfwave plate are used in conjunction with cylindrical optics to produce a collimated beam of all one polarization with the desired aspect ratio.

A preferred method of utilizing both beams produced by a polarization beam splitter cube 5400 is depicted in FIG. 54. With this method, a mirror 5410 which is parallel to the dielectrically coated diagonal of the cube is placed adjacent to the cube, producing two side-by-side collimated beams with orthogonal polarizations. Placing a half wave plate 5420 in one of the beams produces two side-by-side parallel beams which have the same polarization. The size and aspect ratio of the resulting beam can be altered by the use of spherical 5430 and/or cylindrical 5440 lenses, if required.

If a large beam must be polarized, using a MacNeille prism will unfortunately require a heavy, large, solid beam splitter cube which is expensive to produce and consumes much space. A small beam of light could therefore be used, although this may require using additional lenses and additional space to accommodate the changes to the size of the beam. Unfortunately, reducing beam size increases the angles of non-collimated rays, which then polarize inefficiently in such a cube. A MacNeille plate polarizer which weighs less and consumes less space can be used but will function only over a very narrow bandwidth. In a video projection system, as contemplated by the present invention, a beam of white light could be separated into three color component beams by, for instance, a dichroic mirror system. These three separate color components could then be sent to three MacNeille plate polarizers. Although this does save space and weight, the optics required to separate and recombine the colored beams may occupy the same or a greater amount of space and weight than was saved. Moreover, the three MacNeille beam splitter plates would greatly increase the cost of the system. Applicant has devised a "Fresnel MacNeille prism," which functions as a MacNeille prism beam splitter but has, at the outer surfaces of the plates, a multiplicity of tiny saw-tooth surfaces, each behaving as a normal prism. This device weighs much less than a prism, consumes less space, operates over the entire visible spectrum, and costs less to produce.

Linearly polarized light that passes through an ordinary lens is no longer strictly linearly polarized. This is because a lens consists of curved surfaces which can alter the polarization of light passing through it due to the dielectric polarization effect mentioned above. As a lens surface is continually curving and changing its angle with respect to different portions of the beam of light, different portions of the beam's polarization are altered differently. This will reduce contrast and color fidelity of the image produced by a light valve using polarized light. To reduce this problem, if a polarizer is used, it should be positioned after any lenses, whenever possible. The preferred solution is to use lenses which are as thin as possible, even if several are used in sequence, coated with highly efficient AR coatings on the curved lens surfaces to minimize the polarization effects encountered when light hits a surface at an angle.

Although a MacNeille polarization beam splitter allows approximately 50% of the input light to be transmitted as P-polarized light and reflects approximately 50% of the light as S-polarized light, each beam, especially the reflected S-polarized beam, is somewhat impure. In other words, the transmitted beam, although primarily P-polarized, contains some non-P-polarized light, while the reflected beam, although primarily S-polarized, contains some non-S-polarized light. A small amount of such "contamination" is very noticeable to the eye, making the projection of completely black areas impossible, reducing the contrast and color saturation. To solve this problem, a polarizer could be positioned between the MacNeille beam splitter and the light valve with their axis parallel, causing a relatively small loss of light, but eliminating light of the unwanted polarization, improving the contrast ratio potential from approximately 20:1 to approximately 1000:1 and only increasing the light loss from 13% to 35%, which leaves twice as much light as with the use of just a polarizer.

The use of a dichroic beam combiner cube to produce a full-color image from three separately colored image-bearing beams within a small space has been explained above. The same cube can also be coated to operate as a MacNeille polarization beam combiner cube. This cube will act as a beam analyzer for light valves using polarized light. With this arrangement, one beam will be transmitted through the cube, while the other two beams will be reflected by the internal surfaces. Consequently, the transmitted beam must be P-polarized while the reflected beams must be S-polarized. The light exiting the light valve which is to be transmitted by the cube must be P-polarized while the other two light valves must be manufactured to provide images in S-polarized light. Light polarized by the MacNeille methods disclosed herein, being all of one polarization, can be rotated by a half wave plate before entering the light valve which requires orthogonal polarization. However, a simpler and less expensive alternative is the use of identical light valves (as to required polarization) and a halfwave plate after the light valve which produces a different polarization output from the other light valves.

Another loss of efficiency which is especially noticeable in an active matrix light valve occurs because there are spaces between pixels which do not transmit light. Light that hits these areas do not reach the screen, decreasing the brightness of the projected image and contributing to heating of the light valve. Typically between 35% and 70% of the light illuminating such a light valve actually passes through it. To get around this problem, light must be crammed into the pixel holes, being made to miss the opaque areas between pixels.

The preferred technique to do this is the use of a lens array to focus light coming from the condenser system down into the pixel holes. For a given light valve, the pixel hole size is fixed. Selecting a bulb fixes the filament or arc size. To get as much light as possible from the selected light source into the pixel requires taking into account a few factors. The thickness of the glass used in the light valve limits how closely the lens array can be to the pixel hole and thus how short the focal length of the lens array can be. The ratio of the focal length of the condenser lens system to the lens array focal length determines the demagnification of the filament or arc image. Although we would like a large condenser focal length so that the demagnification factor is sufficient to focus the entire image of the filament/arc into the pixel, increasing the condenser focal length decreases the amount of light it can gather from the filament. Consequently, we must have the condenser focal length as short as possible while still demagnifying the image of the filament/arc sufficiently to fit within the pixel (taking into account diffraction blur). We must therefore select a bulb with the smallest filament or arc size that will provide the minimum acceptable brightness. With a given pixel size, a minimum lens array focal length, a given filament size, a maximum filament efficiency per unit area and a minimum condenser lens focal length, the maximum amount of light that can be put through the pixel holes is determined. Using these parameters, a light source and lenses can be chosen to get as much light through the light valve as possible for any given light valve. As disclosed earlier, techniques such as the use of a collimating hologram or the use of non-imaging concentrator optics can reduce the filament/arc size, allowing more light to be focused into the pixel holes.

Figure 34:
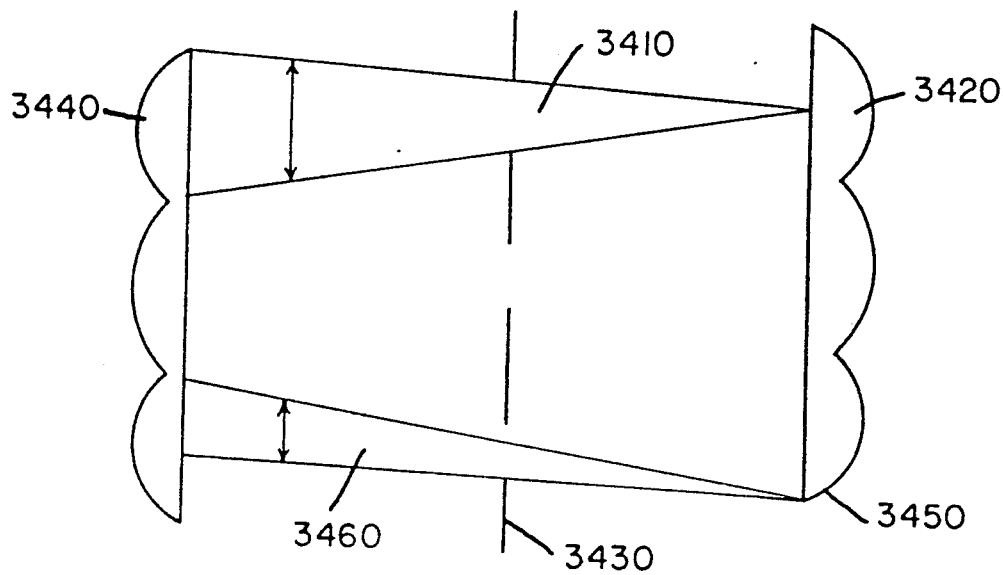
FIG. 34 is a schematic view of pixel holes in a light valve with a lenslet array before and after the pixel holes for use in analysis of illumination uniformity in one aspect of the electronic image projection system.

Using a single lens array before the light valve creates a problem. The illumination at any point on the array after the light valve (used for depixelization) is proportional to the brightness of the source and the solid angle through which that point is illuminated. As seen in FIG. 34, the illumination angle 3410 from the center of the output lens array 3420, positioned after the light valve 3430 to magnify the images of the pixels and eliminate the spaces between the pixels in the image, is that which is subtended by the array element 3440 placed before the light valve, assuming the pixel hole allows the entire cone of light to get through to the array element after the light valve. When looking at the light which hits a point on the lower edge 3450 of an array element after the light valve, as also shown in FIG. 34, we can see that the lower edge of the pixel hole limits the cone angle of light 3460 available to illuminate the array element after the light valve. Thus, illumination along the edge of the array element after the light valve will peak at about 50% of the illumination at the center of the element and fall off to about 25% at the corner of the element.

Figure 35:
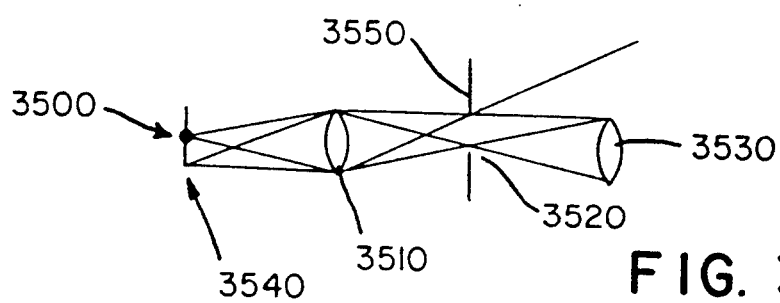
FIG. 35 is a schematic side view of a light valve and lens array elements for further analysis of an aspect of the electronic image projection system.

Another problem can be seen in FIG. 35. If the illuminating light source were a true point source, depicted as the center of the lamp filament 3500, light would focus as a result of passing through the array element 3510 before the light valve into the center of the pixel 3520 and then fully illuminate the array element 3530 after the light valve. This would cause a complete uniform illumination of each pixel on the screen.

However, since the filament is extended and not a true point source, light will be entering the array element before the light valve from other positions and at other angles. As seen in the figure, the light rays coming from the bottom of the filament 3540 would come to a focus at the top of the pixel hole 3550. After spreading out from this point, some of the light would miss the corresponding array element after the light valve. This would also cause a non-uniform illumination of the array element after the light valve and thus the pixel on the screen, in addition to sending some light to an adjacent or nearby pixel. If this light wound up on the screen, it could cause a decrease in contrast and color fidelity in neighboring pixels.

Figure 36:
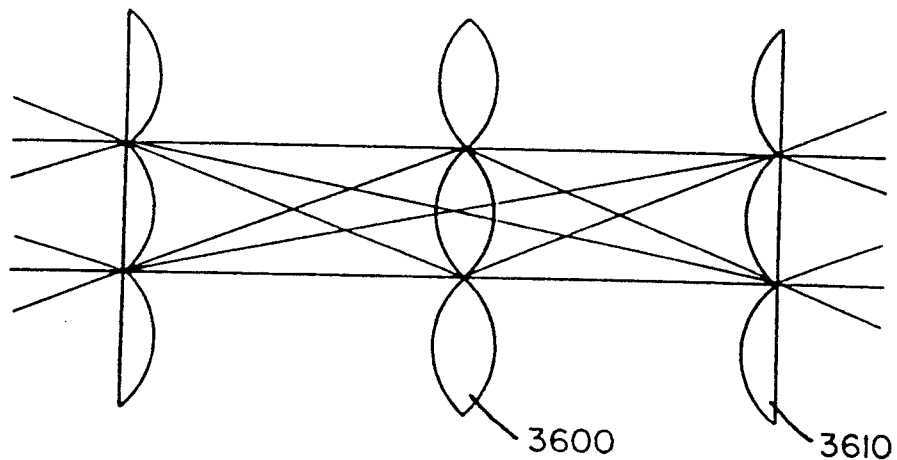
FIG. 36 is a schematic side view of an embodiment of a section of the electronic image projection system utilizing a field lens array with lens arrays.

With each pixel being brightest in its center and dim around its edges, a pixel structure would still appear visible on the screen even though there was actually no space between pixels. To circumvent this problem, ideally a field lens array 3600 at the pixel plane would cause the light that would miss the array 3610 after the light valve to be redirected, causing uniform illumination of that last array and prevent light from hitting adjacent pixels (see FIG. 36). In reality however, the field lens array cannot be placed exactly in the pixel plane. Consequently, we can split the field lens array into two lens arrays. One on either side of the light valve, placed as close to the light valve as possible. With this arrangement, the first lens array focuses an image of the lamp with the first field lens into the center of the pixel. The second field lens (being the first lens array after the light valve) helps steer the light towards the final lens array. This final array magnifies the image of the pixel forming an image to be projected on the screen by the projection lens. This magnified image of the pixel, as explained earlier, abuts the magnified image of its neighboring pixel, causing a continuous image made of contiguous pixels, with no spaces between them on the screen.

As an alternative method of focusing light into the pixels, two lens arrays can be used as an array of Galilean telescopes. By this method, light entering each pixel will still be collimated, but most or all of it will go through the pixel holes.

Another method of cramming light into the pixel holes is by using a fiber optic bundle in which the input end is tightly packed and the output end is arranged so that each fiber is the same size as its adjacent pixel hole.

There is one other source of wasted light in a video projection system which is never thought of as wasted light. This is the light that is removed from certain areas in the image because those areas are supposed to appear as darker areas. This is light that should not reach the screen so that brightness variations can be produced on the screen to create an image. However, this light need not be totally lost.

With the use of a light valve that utilizes polarized light, a polarizer is used after the light valve to act as an analyzer. Light that should not appear on the screen exits the light valve polarized perpendicular to the axis of this polarizer/analyzer and is thereby absorbed by the polarizer. This generates some heat as well, which can heat up the light valve, if the polarizer is near it, and is also inefficient in that only 25% to 35% of the light that should be going to the screen makes it through the polarizer/analyzer. By using a MacNeille polarization beam splitter (as described herein) instead of the final polarizer/analyzer, several advantages are realized. Since there is no absorption, no heating occurs. Because nearly 50% of the light appears in each beam, nearly 100% of the light that should go to the screen passes through the MacNeille analyzer to the screen. A plane mirror in the path of the beam exiting the MacNeille analyzer that normally would have been absorbed by a sheet polarizer can reflect that normally wasted beam back to the light source for reprojection through the system to the extent the beam is collimated. The beam will retrace its path through the system ending up being focussed into the center of the light source to be gathered by the collecting mirrors for reprojection through the system. Although a large portion of this light will not make it to the screen due to non-parallelism, and consequent inability to retrace its path through the entire system, and due to loss of improperly polarized light exiting the first MacNeille polarization beam splitter on its way back to the bulb, some brightness will be added to the image that would not have been available if this technique were not used.

These light saving techniques will greatly increase the light output of a projection system. To summarize, use of a double condenser system to collect light from the light source doubles the light output over a conventional system. Use of a polarization beam splitter, instead of an absorption polarizer, again doubles the light output. Use of dichroic mirrors instead of color filters to produce a colored image more than doubles the light output once again. Use of lens arrays before the light valve approximately doubles the light output again, depending upon the ratio of clear areas to opaque areas on the light valve. Using these techniques in tandem means an overall potential increase in image brightness over a conventional system of 16 times. Use of a polarization beam splitter with a plane mirror in place of the final polarizer/analyzer as well as other techniques outlined herein will potentially further increase the image brightness and system efficiency.

Many projection formats can be used in conjunction with the disclosed video display systems. In addition to curved, direction-sensitive, high reflectance screens, less expensive, more widely dispersive screens can be used with this system. A regular movie screen or even a wall proves adequate with a system of such high brightness. By vertical mounting of the unit or the attachment to the projection lens of a front-surface mirror, the image can be displayed on a bedroom ceiling. This technique allows for convenient viewing of video imagery while lying in bed, without causing neck or back strain.

Rear-screen projection can be achieved as well.

Conventional rear-screen television utilizes a lenticular lens and a Fresnel lens for adequate brightness. This adds a discernible pattern to the image and produces a limited angle of viewing both horizontally and vertically. This type of screen, like a conventional CRT, reflects ambient light to the viewer, creating glare which adds to the viewer's eye strain. With the present system, brightness is much higher, allowing for a broader viewing angle as well as more streamlined, lightweight and aesthetically pleasing display units.

The high brightness allows for the use of a gray matte (i.e., textured) screen material with wide dispersion angles. This creates an image that is viewable from practically any angle with uniform brightness and no glare. This type of glareless screen, coupled with the ability to vary the brightness and color temperature of the display by selection of bulb type and operating voltage, may also provide a significantly less fatiguing display for individuals who must spend long hours staring at a video display terminal.

One of the most efficient types of screen (front or rear) can be made using holography. With a hologram, a diffuser can be produced with a predetermined dispersion pattern, creating as much diffusion as desired, with precisely tailored brightness distribution characteristics. Efficiency can approach 100%. The interference pattern can be made optically for simple specifications or by computer generation for more complex characteristics. Bleached or gelatin phase holograms or metalized embossed holograms can be used to produce the actual screen with high efficiency.

With rear-screen projection, rather than locating the projector several feet behind the screen to allow the image to expand sufficiently to fill the screen, one or more mirrors can be used to reflect the beam one or more times to allow image expansion within a smaller cabinet size. For instance, a cabinet approximately 18" deep could be used to fill a rear projection screen with a diagonal measurement of 50".

Figure 46:
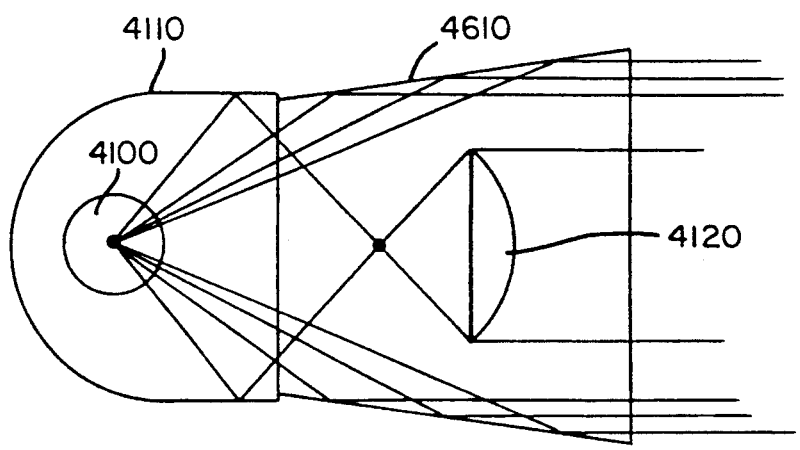
FIG. 46 is a schematic view of an alternate embodiment of a section of the electronic image projection system in which a parabolic surface is used to capture and collimate light that misses an elliptical reflector in a light collection system.

When an image projected on a screen is viewed in an environment where there is much ambient light, the areas of the screen that should be dark become filled with the ambient light, reducing contrast in the image. A type of screen can be constructed which will provide a bright image with high contrast in high ambient light situations in both front and rear projection. The front projection version of this screen is depicted in FIG. 46 and comprises a regular front projection screen such as a beaded, flat white or metallic coated screen. On top of the screen is a black mask with relatively thin horizontal slits. A lenticular lens whose cylindrical lenslets are oriented horizontally is placed on top of the slit mask. There is one slit for every cylindrical lenslet. For maximum versatility, the slit mask is adjustable in the vertical direction. Light from the projector focuses an image on the lenticular lens sheet of this screen, breaking the image into many horizontal sub-images corresponding to the number of horizontal cylindrical lenslets. Each lenslet focuses its image component to a thin line which passes through the corresponding slit in the mask to be reflected from the screen behind it. This reflected light is re-expanded by the cylindrical lenslet for viewing with high visibility from all angles. Ambient light arriving at the screen from any height other than that of the projector (which makes up most ambient light), will be focused by the lenslets onto the black light absorbing layer and will not be visible to the viewers.

The rear projection version of this screen is constructed by placing two horizontally oriented lenticular lens sheets back-to-back with their flat sides towards each other. The slit mask described above is placed between the lenticular lens sheets. Optionally a highly transmissive rear screen material can be placed next to the slit mask (also between the lens sheets). The screen operates in the same manner as the front projection version to eliminate ambient light reaching the viewer. In both front and rear configurations, the slit mask can be adjusted up or down to allow the light from the projector to pass exactly through the slits, depending on the projector's height in relation to the screen.

Figure 17:
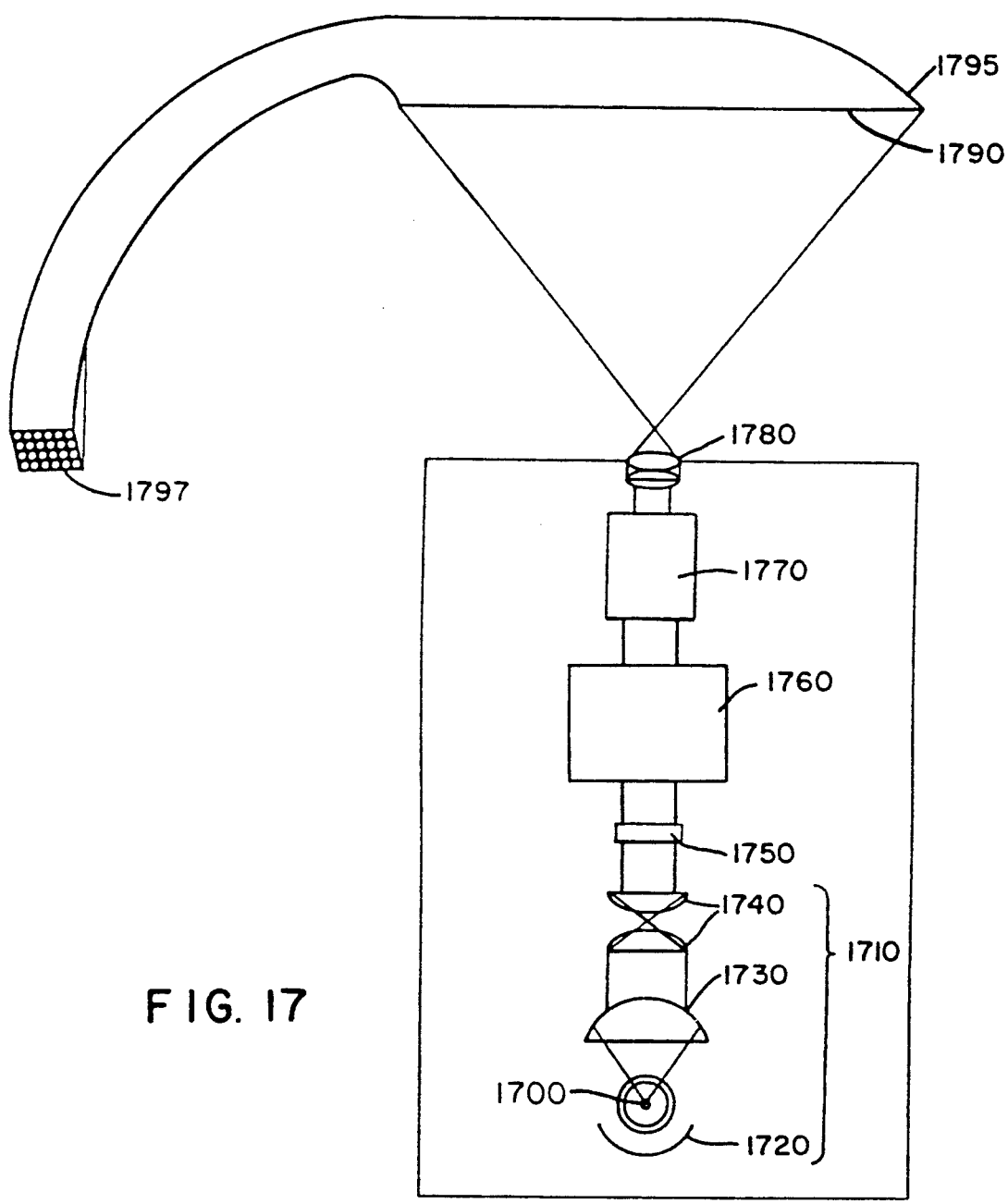
FIG. 17 is a schematic diagram of the preferred embodiment of the invention.

Another method could be used to reduce ambient light reflection. The video projector's image can be focused onto the input end of a coherent fiber optic bundle. This is shown in FIG. 17 as 1795 which places the input end of the fiber bundle into the projected beam instead of screen 1790. The other end of the fibers 1797 can be flat or polished into lenses or can be coupled to lenses. Thus each fiber, separated from neighboring fibers, can magnify (due to fiber separation and due to the lens) and deliver to a rear-screen a portion of the image (preferably one pixel or part of a pixel per fiber), magnified a predetermined amount. The composite image will appear continuous, creating a very large image, with only a few inches of cabinet thickness since the fibers can bend. This technique also eliminates the need for any other subsystem to fill the spaces between pixels. Using the fiber optic screen with the fibers spread apart at the output end, no lenses, and no screen, in conjunction with black, light absorbing material to fill the spaces between the fibers will produce a bright image in an area with high ambient light such as in an outdoor stadium. This is because a majority of the surface area of the output of the fiber bundle will be absorptive to ambient light, while all of the image bearing light will still be sent to the viewer. However this is done at the cost of creating a pixel-like structure due to the spaces introduced between the fibers. When viewing a large projected image in this situation however, the viewers are generally positioned at some distance from the screen which will make the pixel structure virtually invisible to the viewers.

Figure 14:
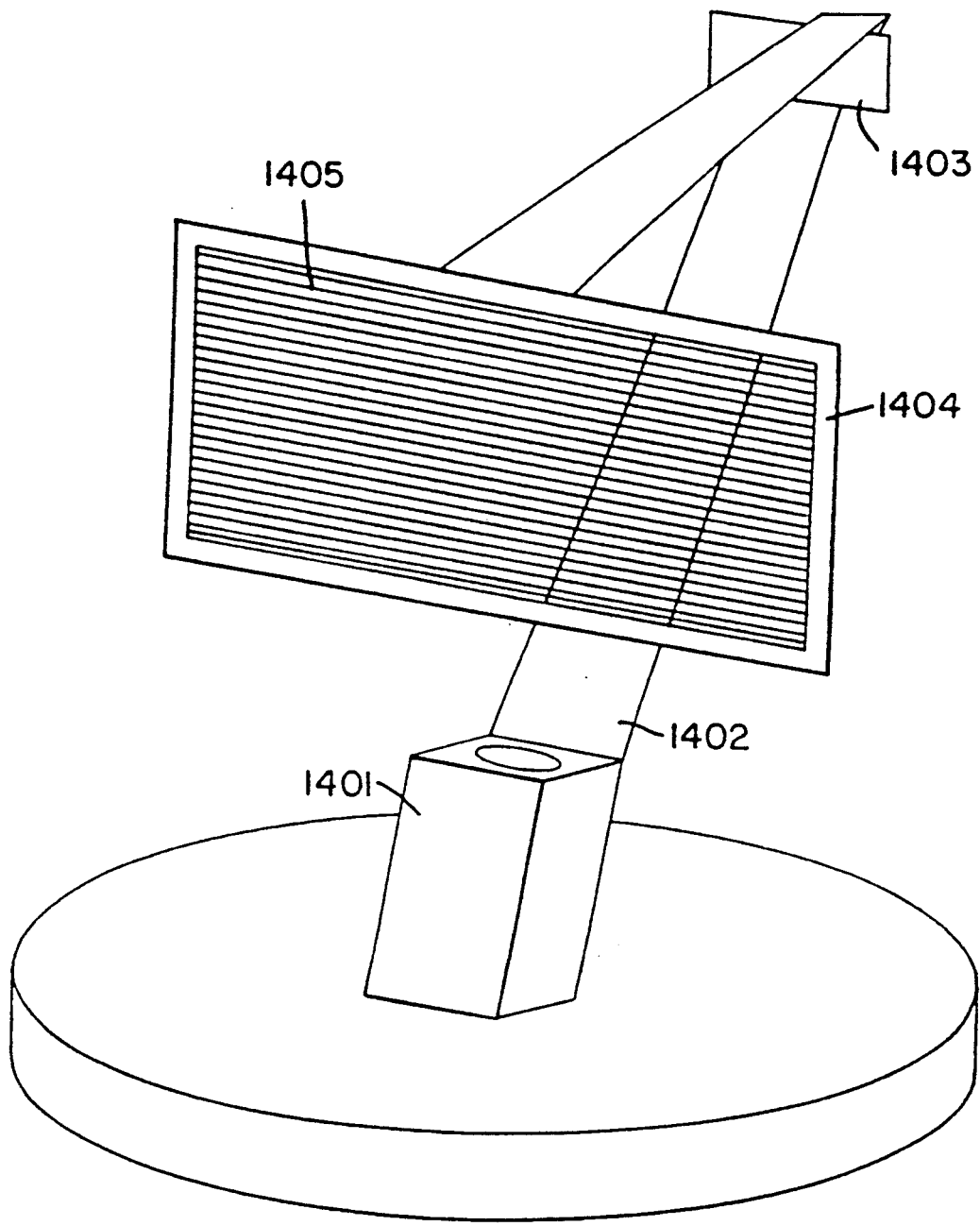
FIG. 14 is a schematic view of a rear-screen projection system utilizing the present invention with a venetian-blind type of rear-projection screen.

An example of an artistic and futuristic projection system is illustrated by FIG. 14. The video projector 1401 can be mounted to an upright 1402 projecting an image onto a mirror 1403. Mirror 1403 can reflect the image to focus onto a special rear screen 1404 mounted in a frame which appears to be "hanging in space." The screen itself can be made of extremely thin slats 1405 of almost any rear projection material. By mounting an axle onto the ends of each slat with a gear on each, a motor drive can be used to open (slats lying flat and parallel to the floor) and close the slats (lying perpendicular to the floor, creating a solid rear screen for projection). In the open position, the screen will appear as a transparent window in space. When the projection unit is turned on, by remote control for instance, the slats can simultaneously and quickly be closed, creating a "video image in space."

Whatever projection method is used, two other important problems can occur. Unless the surface being projected upon is perpendicular to the optical axis of the projection beam, the image will suffer from keystoning and blurring of the parts of the picture not precisely focused on the screen surface. This problem is inherent if the projector is mounted on the floor, on a low table, or on the ceiling while the screen is centered on a wall. CRT systems handle keystoning by varying the electromagnetic scan line deflection. Some light-valve based systems, however, have predefined pixel locations and thus cannot utilize this technique.

Consequently a type of anamorphic lens system can be constructed. A zoom lens normally changes the size of a projected image by changing the relative positions between the elements of the projection optics. However this could also be accomplished if lens elements of different curvatures were used. Applicant's system could employ a lens which is shaped as if it has added to it two varying focal length lenses, one above and one below the standard lens molded into one lens. The central area of the lens, large enough to encompass the entire light beam from the light valve, creates a rectangular projected image. But if this lens is raised or lowered with respect to the light valve, the magnification varies across the image, causing a trapezoidal image predistortion with either the top or bottom of the image of the light valve being the largest side of the trapezoid. Thus, the lens is adjusted up or down, depending on the angle the video projector is making with the screen and thereby the keystone effect is cancelled.

The variable focus problem can be corrected by a little-known photographic technique known as "Scheimpflug correction." If a scene to be photographed has a large depth and a fairly large aperture is used, the only way to simultaneously focus all elements of the scene is to tilt the lens and film plane such that a line drawn through all objects in the scene intersects the line drawn through the film plane at the same point that it intersects a line drawn through the lens plane. In a camera, this is accomplished by bellows. Using the same logic, a mechanical adjustment that tilts the light valve plane and the plane of the projection optics, creating an intersection with a line passing through the screen plane, will cause the entire image to be in focus, even though the projector's beam is not perpendicularly aimed at the screen.

Science fiction has always portrayed the video display of the future as a thin large screen that hangs on the wall and modern day technologists have been working towards that end for decades. With an image projected onto a wall, the idea is almost realized. However, projection onto a wall mandates that the projection distance be included as part of the system because nothing may be placed between the projection lens and the wall. Applicant has devised a new type of screen which would eliminate this intervening space or projection distance. With this screen, the projector can be placed underneath it or even be built into the screen itself, and yet the entire device thickness need not exceed a few inches. This screen takes advantage of the phenomenon that a beam of light of small diameter shone on a surface at a very oblique angle can be spread over a huge distance. When the propagation direction of the light beam is nearly parallel to a surface, the beam can illuminate the entire surface, even if the surface is hundreds of times larger than the diameter of the beam, with no projection distance necessary before the light hits the surface. Spreading of a light beam by shining on an oblique surface "expands" the light beam's dimensions in one direction. If the surface could then re-direct the very wide beam, onto another surface, again at an oblique angle, but orthogonal to the first surface, the beam could again be spread in the orthogonal direction with no projection distance required.

Figure 47:
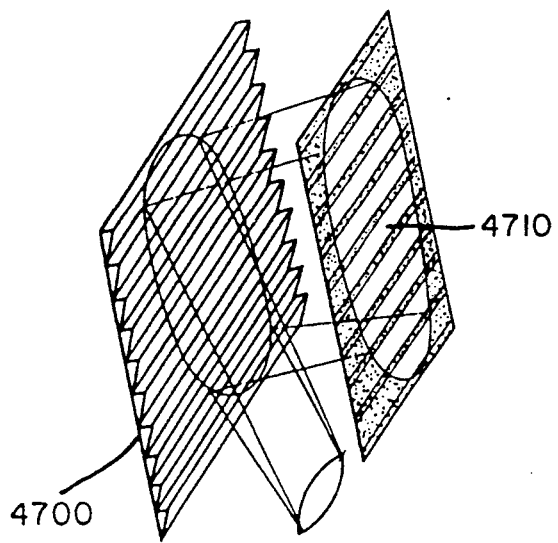
FIG. 47 is a schematic view of the operation of a "Fresnel mirror" used in an analysis of the operation of an element of the electronic image projection system.

This re-direction is realized by a surface with saw-tooth shape elements with the sloping side of each saw-tooth mirrored 4700, forming a "Fresnel mirror." As shown in FIG. 47, this will spread the light over a large area, but will create horizontal stripes of light with dark horizontal stripes between them 4710. The smaller these reflectors, the more of them there are, and the less noticeable are the black bars in the image. To make the light coverage continuous and eliminate the dark stripes, the sloping surface of each saw-tooth need only be curved slightly to expand the segment of light that hits a given saw-tooth sufficiently to cover half of the dark band on either side of the light band reflected by the saw-tooth. Alternatively, a lenticular lens can be placed between the sawtoothed surface and the imaging area.

An alternate method of producing a surface that will behave as required is to use known techniques to produce a holographic surface that will re-direct the light into the right directions.

Figure 48:
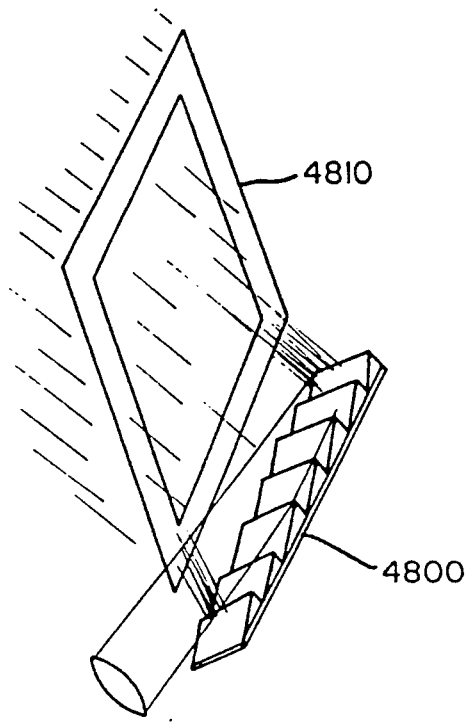
FIG. 48 is a schematic view of one embodiment of the thin screen section of the electronic image projection system utilizing a Fresnel mirror and a rear screen.
Figure 49:
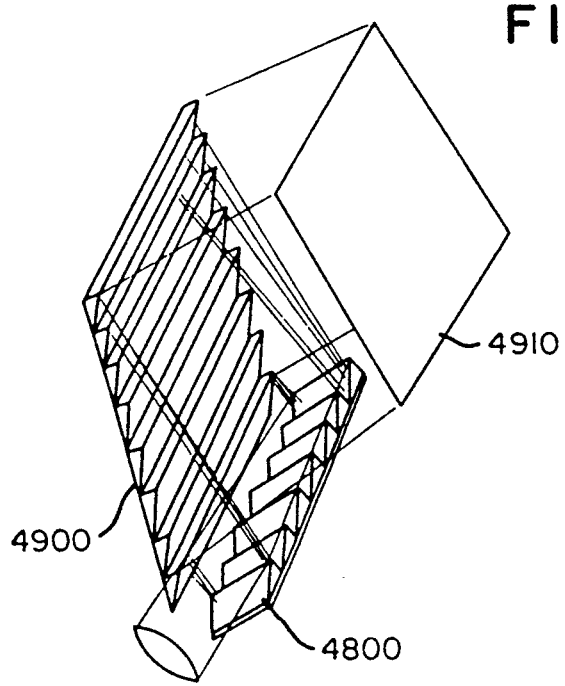
FIG. 49 is a schematic view of the thin screen section of the electronic image projection system utilizing two Fresnel mirrors and a rear screen.

If the light beam aimed at such a "Fresnel mirror," contains an image, the image will be spread in one direction onto the surface of the Fresnel mirror. If the Fresnel mirror 4800 is placed at an oblique angle to a rear screen 4810, as is shown in FIG. 48, the image will now be expanded in the orthogonal direction, filling the entire screen. However, since the image viewed from a rear screen appears brightest when looking at the screen towards the source illuminating the screen, the screen would be its brightest only when viewed at an oblique angle. Adding a second Fresnel mirror 4900 to re-direct the light in a direction normal to the screen 4910 makes the image visible on the screen brightest when viewing in a normal fashion. (See FIG. 49.)

Alternatively, instead of utilizing curved saw-tooth surfaces or lenticular lenses after reflection from each Fresnel surface, a spherical lens array can be placed just before the final viewing screen to eliminate spaces between sections of the image.

Two distortions are created by projecting onto a screen by way of Fresnel mirrors. Since the image spreads out in all directions as it propagates, the image will be wider the further it has to go, with the furthest end being wider than the nearest end. This trapezoidal distortion will be repeated in the orthogonal direction when reflecting from the second Fresnel mirror. These two trapezoidal distortions can be corrected by pre-distorting the image trapezoidally in both axes with appropriate lenses in the opposite directions of the trapezoidal distortions that will be encountered due to spreading.

The second distortion is focus distortion due to the widely varying distance from the projection lens to the near part of the image versus the distance from the projection lens to the far part of the image. This focus distortion can be corrected by tilting the projection lens with respect to the light valve plane in the direction opposite to the screen tilt. This tilt uses Scheimpflug correction (described above) so that the entire image is in focus on the screen, even though it is being projected at oblique angles. Such a screen system could be used for the projection of any type of image, including slides and movies as well. .

Although projection systems generally project their images on some sort of screen, in some instances it would be advantageous to project directly onto the retina of one's eye. Since a light valve, such as an LCD, can be made very small and lightweight, and using some of the techniques listed herein, an efficient projector can be made which is very compact and lightweight. It then becomes feasible to mount such a system on a headband or pair of glasses so as to give the viewer his own private viewing screen. Because the entire retina can be projected upon, the viewer can see his entire field of view covered with the image. If the image is projected into one eye only, the viewer will be able to see the projected image all around him, but, it will appear superimposed on the real world. This technique could be especially useful for private viewing of a movie or confidential data, without others seeing it, or for providing a computer screen to be connected to a computer in place of a monitor. This application would free the viewer's body and head from being constrained to one position for long periods of time.

In place of a conventional projection lens or condenser system, compact optics such as lens arrays can be used to image each pixel onto the retina with a corresponding lenslet for each pixel. Alternately, compound holographic optical element could be used or multiple curved reflectors facing each other's reflective surfaces, with on and off-axis elements to reflect and image a light valve onto the retina could be used.

The present invention lends itself to three-dimensional video projection. One method of accomplishing 3-D projection is to use two projection systems with the polarizers of one light valve system perpendicular to the polarizers of the other light valve system. Sending stereoscopic video signals, derived from two displaced cameras for instance, and projecting onto a non-depolarizing screen will allow viewers wearing polarized glasses to see full color 3-D video. A single lens 3-D video projection system can be constructed by placing both light valve systems in one enclosure. Internally, the two orthogonally polarized stereoscopic images can be joined by a MacNeille prism. Alternately, instead of using the second mirror 503 of the first "striped mirror pair" 502 and 503 of FIG. 5, the horizontally displaced spaces between the pixels of one light valve can be filled by the pixels of the other light valve through a simple beam splitter setup, creating a horizontally interlaced, orthogonally polarized 3-D image pair for projection through the single projection lens. Striped mirror 502 can be tilted at a 45 degree angle with respect to the axis of the light from the first light valve. The light from the pixels of this light valve will pass through the clear areas of the striped mirror. The second light valve, whose axis is perpendicular to the axis of the first light valve, reflects its light from the mirrored areas of the striped mirror, causing an interlaced composite image made from both images, with orthogonal polarization.

Another method of 3-D projection which can be used is auto-stereoscopic 3-D projection. This method does not require any special glasses for 3-D viewing. Two identical lenticular lens screens, with their cylinders oriented vertically, placed back-to-back, optionally, with a thin translucent screen between them are projected upon at different angles by two or more video projectors, bearing stereo or multiple-angles-of-view information. The images can be viewed from the opposite side of the screen at various locations in space. As one moves to various locations, around the screen, the images are viewable, one at a time, without image overlap. This creates several orthoscopic as well as pseudoscopic viewing zones in space. If one positions his eyes in an orthoscopic viewing zone such that one image goes to each eye, a 3-D view will be visible. Many viewers will be able to view an orthoscopic 3-D video image from several angles and positions at once. This type of screen can also be used in front projection with a regular screen behind a single lenticular lens.

Another method of preparing stereo visual data for 3-D viewing uses half wave plate strips to rotate the plane of polarization 90° for alternating columns of pixels. The columns would be addressed so that every other column would produce a right-eye image and the intervening columns would produce a lefteye image. Alternately, instead of alternating columns, alternating rows could be used for the presentation of left and right eye images. Other presentation patterns could be used to present a more uniform integration of left and right eye images such as having each row consist of alternating left and right eye image pixels followed by a row offset by one pixel such that a checkerboard pattern of left and right eye pixel images is produced. All pixels corresponding to one eye's image can be covered with a half wave plate so that one eye's image is polarized orthogonal to the other eye's image. With this arrangement a single projector with three or even one light valve can be used to project onto a non-depolarizing screen for viewing with polarized glasses and the stereo images will always be in registration without requiring alignment.

If using any of the methods described herein for filling in spaces between pixels, the data for each eye's view can be made to overlap the data for the other eye's view on the screen. This will cause each eye's image to appear continuous without holes, lines, pixels or other spaces.

Half wave plates may be made pixel-sized and placed over the correct pixels by photo-lithography technology. A photographic mask, corresponding to the pattern of pixels to be viewed by one eye, is imaged with U.V. onto photoresist which is coated onto birefringent plastic of the proper thickness. Once the photoresist is developed away in the exposed area (or unexposed areas, depending on the resist used), a chemical can be used to dissolve away the plastic that is exposed. Subsequently, the remaining resist is washed away, leaving a mask to be placed on the light valve. Alternatively, a master dye can be similarly made of metal which can then be used to punch out holes in the appropriate places in a sheet of birefringent plastic to produce the mask for the light valve.

A light valve that is addressed in alternating vertical columns of right and left eye views can be projected onto a lenticular lens screen (in front or rear projection) to produce an auto-stereoscopic display which can be viewed without glasses to produce a 3-D image.

With the use of digital circuits and computer capability built into the system, the system can be used to process images so as to turn a two-dimensional image into a three-dimensional image. One method of doing this requires pre-processing of the movie to convert it to 3-D. The conversion need be done only once, with the converted version being stored for projection at a later time. With this technique, objects in a scene which should appear to the viewer to be located somewhere other than in the plane of the screen can be selected during pre-processing and marked. Software can direct a computer to follow the marked object from frame to frame. This allows the operator to select an object only once until it disappears from view, eliminating the need to mark the object in every frame. Once an object in a scene is selected and marked and the depth at which it is to appear is determined and input, the computer can generate a duplicate image of that object at a spacing to the primary image that will cause the eyes to see the merged image at the desired depth. Using, for instance, the stereo system, described above, in which two projection systems have their images perpendicularly polarized, to be viewed by someone wearing polarized glasses, the computer can generate this duplicated image for projection with polarization perpendicular to the first image. The projector will project this duplicate image on the screen next to its counterpart image, separated by a distance, which determines the depth at which a viewer will see the composite image. When an object is selected to change its depth, inputting this fact and indicating its new depth will cause the computer to change the distance between the two component images to be projected on the screen. This will cause the viewer to see the composite image formed in his brain by binocular fusion at the new depth.

Another technique can be used to create depth in an image, utilizing the above-described projection systems. With this technique however, conversion to 3-D occurs as the image is projected with no human intervention or preprocessing necessary. The imagery however should be shot with this system in mind if the depth created is to be realistic. By having the projector store, for example, three frames at a time and project, as the stereo frames to be viewed, frames 1 and 4 at any given time (4 being the current frame being shown, for instance, and 1 being the frame which was shown four frames ago), a 3-D view is created using glasses or an autostereo screen as described herein. The faster an object moves, the larger the distance will be between the left and right eye images and thus the further behind or in front of the screen the image will appear to the viewer. Consequently, motion of objects should be coordinated with their depth to provide the most realistic three-dimensional imagery.

Various recently developed technological innovations such as wireless transmission of sound from the projector to speakers, wireless transmission of cable and VCR signals to the projector, a built-in VCR and/or a built-in computer when built into a projection system as described herein will produce a projection system with much broader use than any other system available today.

While the preferred and alternate embodiments of the invention have been illustrated in detail, modifications and adaptations of such embodiments will be apparent to those skilled in the art. However, it is to be expressly understood that such modifications and adaptations are within the spirit and scope of the present invention as set forth in the following claims.

What is claimed is:

1. An electronic image projection system, comprising:
   a light source;
   a light valve means for forming an image on which information can be present as pixels or lines, said light valve means including one of:
      a single light valve having perceived dead spaces caused by presence of relatively darker pixels or lines adjacent to relatively lighter pixels or lines and real dead spaces between pixels, or lines defined by actual non-information bearing spaces between pixels or lines, and
      a plurality of light valves having at least one of real dead spaces between pixels or lines defined by actual non-information bearing spaces between pixels or lines and perceived dead spaces caused by presence of relatively darker pixels or lines adjacent to relatively lighter pixels or lines;
   means for projecting the image formed by said light valve means onto a viewing area; and
   means to substantially eliminate perception of perceived dead spaces and real dead spaces between pixels or lines in the image projected by the single light valve and to substantially eliminate perception of at least one of real dead spaces between pixels or lines and perceived dead spaces in the image projected by the plurality of light valves.

2. The electronic image projection system of claim 1, further comprising:
   a pixel storage element associated with each pixel for storing a respective pixel signal; and
   control means associated with said pixel storage elements for controlling the operation thereof, said control means, pixel storage elements and light valve forming an active matrix light valve.

3. The electronic image projection system of claim 1, wherein said control means associated with each pixel includes a transistor, said transistor when turned on by a gate signal, conducts a voltage of a specific value associated with the desired brightness at its respective pixel.

4. The electronic image projection system of claim 3, wherein said transistor is a field effect transistor.

5. The electronic image projection system of claim 1, wherein substantially no light emanates from said dead spaces.

6. The electronic image projection system of claim 1, further comprising a light-blocking covering positioned between pixels or lines.

7. The electronic image projection claim 1, further comprising a heat sink adapted to dissipate heat energy from said projecting means and/or said active matrix light valve.

8. The electronic image projection system of claim 1, wherein said projection means includes lens elements coated for heat reduction.

9. The electronic image projection system of claim 1, further comprising heat absorbing elements adapted to dissipate heat energy.

10. The electronic image projection system of claim 1, further comprising a fluid means adapted to dissipate heat energy.

11. The electronic image projection system of claim 1, wherein said projecting means further comprises reflective optics constructed of a metallic substance.

12. The electronic image projection system of claim 1, further comprising a heat sensing device for sensing heat in proximity to the active matrix light valve, wherein said device monitors temperature and biases the active matrix, light valve to counter temperature fluctuation effects.

13. The electronic image projection system of claim 1, further comprising a plurality of light valves to project multiple images onto the viewing area to produce a black and white or colored image.

14. The electronic image projection system of claim 1, further comprising dichroic optics, wherein said dichroic optics overlap differently colored light valve projected images permitting said images to be focused onto a screen with a single projection lens system.

15. The electronic image projection system of claim 1, further comprising a mirror system to duplicate the image of the pixels or lines into the dead spaces between pixels.

16. The electronic image projection system of claim 1, further comprising lenses to fill the dead spaces between pixels or lines.

17. The electronic image projection system of claim 16, wherein said lenses are arranged in a lens array.

18. The electronic image projection system of claim 17, wherein said lens array is lenticular.

19. The electronic image projection system of claim 1, wherein said light valve is a full-color light valve, comprising pixels or lines of a plurality of colors.

20. The electronic image projection system of claim 19, wherein light emanating from one of the colored pixels or lines overlaps light emanating from another colored pixel or line.

21. The electronic image projection system of claim 20, wherein substantially no light emanates from said dead spaces.

22. The electronic image projection system of claim 20, wherein image is replicated to fill the dead spaces between pixels.

23. The electronic image projection system of claim 20, wherein light emanating from each of the plurality of colored pixels or lines is individually optically expanded, to fill the dead spaces between pixels or lines.

24. The electronic image projection system of claim 1, further comprising:
   a liquid crystal container, wherein said container is stepped to produce different cavity lengths of liquid crystal corresponding to different wavelengths of light to be projected through different areas of the liquid crystal display.

25. The electronic image projection system of claim 1, further comprising means for projecting the image onto a ceiling.

26. The electronic image projection system of claim 1, wherein said viewing area comprises a venetian blind type of screen comprising a plurality of rotatable slats wherein such slats are substantially rigid and mechanically rotatable.

27. The electronic image projection system of claim 1, further comprising a projection lens system, wherein said lens system trapezoidally predistorts the image to compensate for keystone distortion resulting from projection of the image onto a surface such that the surface is not normal to the optical axis of the projection lens.

28. The electronic image projection system of claim 1, wherein said system projects onto a surface which is not normal to the optical axis of the projection optics, wherein the light valve and projection optics are tilted so that their planes intersect at a line which also intersects the plane of the surface being projected upon.

29. The electronic image projection system of claim 1, further comprising a plurality of projection means, wherein the projection means project polarized stereoscopically-related images onto a non-depolarizing screen to be viewed in 3-D.

30. The electronic image projection system of claim 29, wherein said stereoscopically-related images are optically integrated before being further projected by a single projection lens system onto a screen 31. The electronic image projection system of claim 1, further comprising a plurality of projection means, wherein said projection means projects images emanating therefrom onto a screen comprising two lenticular lenses positioned back-to-back, restricting angle of view of each image.

32. The electronic image projection system of claim 1, further comprising a sound suppression system for eliminating system cooling noise.

33. The electronic image projection system of claim 32, wherein said sound suppression system comprises sound absorbing material.

34. The electronic image projection system of claim 32, wherein said sound suppression system further comprises barriers to deflect sound.

35. The electronic image projection system of claim 32, wherein said sound suppression system further comprises:
   a microphone;
   a speaker; and
   a circuit to alter phase of a sound signal detected by the microphone before sending it to the speaker.

36. The electronic image projection system of claim 1, wherein the viewing area has a surface which is textured to reduce glare.

37. The electronic image projection system of claim 1, wherein said viewing area is darkly colored.

38. The electronic image projection system of claim 1, wherein electronic signals relating to formation of the image are digitized.

39. The electronic image projection system of claim 1, wherein high resolution data is used for the display of a high resolution image.

40. The electronic image projection system of claim 1, wherein the image enters one of two ends of a coherent fiber-optic bundle and is subsequently viewed at the other end of the fiber-optic bundle.

41. The electronic image projection system of claim 40, wherein lenses magnify the light emanating from the fiber-optic bundle before it is viewed.

42. The electronic image projection system of claim 1, wherein the means for projecting further comprises a means to expand the pixel or line images to substantially eliminate said dead spaces.

43. The electronic image projection system of claim 1, wherein the means for projecting duplicates all or part of the pixel or line images to substantially eliminate said dead spaces.

44. An electronic image projection system of claim 1, further comprising a means for coloring the image, wherein said means for coloring is external to the light valve.

45. The electronic image projection system of claim 44, wherein it means for coloring comprises color 46. The electronic image projection system of claim 44, wherein said means for coloring comprises a system utilizing dichroic mirrors.

47. The electronic image projection system of claim 44, wherein said means for coloring comprises holographic color filters.

48. The electronic image projection system of claim 1, further comprising:
   a beam of light from a light source;
   a light valve;
   dichroic mirrors;
   and lenses, wherein said lenses produce separate beams
of light which are colored by said dichroic mirrors before said beams f light illuminate said light valve.

49. The image formation system of claim 48, wherein offset mirrors are used to integrate said separate beams of light into a larger beam with interdispersed colors.

50. The electronic image projection system of claim 1, wherein the light valve operates by reflection.

51. The electronic image projection system of claim 1, wherein said light valve uses the birefringence of liquid crystals to modulate light.

52. The electronic image projection system of claim 1, wherein said light valve uses the scattering effect of liquid crystals to modulate light.

53. The electronic image projection system of claim 1, wherein said light valve uses polymer dispersed liquid crystals (PDLC) to modulate light.

54. The electronic image projection system of claim 1, wherein a single light valve is divided into sections, each addressed with different image information.

55. The electronic image projection system of claim 1, wherein each of said different sections are addressed with information corresponding to a different color.

56. The electronic image projection system of claim 1, wherein said light valve is a liquid crystal display.

57. The electronic image projection system of claim 1, comprising dichroic optics, wherein said dichroic optics overlap differently colored images.

58. The electronic image projection system of claim 1, comprising dichroic optics, wherein said dichroic optics divides light produced by a light source into differently colored beams.

59. The electronic image projection system of claim 1, wherein said control means associated with each pixel or line includes a gas, which, when made conductive, conducts a voltage of a specific valve associated with the desired brightness at its respective pixel or line.

60. The image formation system of claim 48, wherein a light beam is divided into a plurality of smaller beams by said lenses before said smaller beams are colored by dichroic mirrors 61. The image formation system of claim 48, wherein a light beam divided into separately colored beams by said dichroic mirrors, before being further divided into smaller individually colored beams.

62. The electronic image projection system of claim 1, wherein the pixels or lines of a multi-colored light valve are addressed, such that each pixel or line is given data whose value corresponds to the amount of one color of the light present in the image at that particular location, creating a system of color monads, instead of color triads as is normally done, to represent the color of an image.

63. The electronic image projection system of claim 1, wherein one or more wedges are used to cause pixel or line images to overlap.

64. The electronic image projection system of claim 1, wherein an optical filtering means is utilized between the image forming plane of the light valve and the surface on which the image is projected to reduce the visibility of pixels or lines in the projected image.

65. The electronic image projection system of claim 1, wherein striped mirrors are used to cause differently colored pixel or line images to overlap.

66. The electronic image projection system of claim 1, wherein striped mirrors are used to create a multiplicity of colored beams from a beam of white light.

67. The electronic image projection system of claim 1, further comprising:
a condenser means; and
a subsystem for superimposing red, green and blue images to form a full color image.

68. The electronic image projection system of claim 1, further comprising a MacNeille type polarizer.

69. The electronic image projection system of claim 1, wherein said means for projecting includes optics having a sapphire coating.

70. The electronic image projection system according to claim 1, wherein said means for projecting includes optics having a diamond coating.

71. The electronic image projection system of claim 1, further comprising a lens positioned after the light valve to correct for path length differences between the light valves and the projection lens.

72. The electronic image projection system of claim 1, further comprising a lens array positioned after the light valve, wherein said array comprises lenslets which produce a magnified virtual image of a pixel or line in the light valve for projection onto the viewing area by said means for projecting.

73. The electronic image projection system of claim 1, further comprising a lens array positioned after the light valve, wherein said array comprises lenslets which produce a magnified real image of a pixel or line in the light valve for projection onto the viewing area by said means for projecting.

74. The electronic image projection system of claim 1, further comprising a first and a second lens array positioned after the light valve, wherein said second lens array forms a magnified virtual image of the first lens array for projection onto a viewing area by said means for projecting.

75. The electronic image projection system of claim 1, further comprising a first and a second lens array positioned after the light valve, wherein said second lens array forms a magnified real image of the first lens array for projection onto a viewing area by said means for projecting.

76. The electronic image projection system of claim 1, further comprising a means for cooling including a tube with an orifice, wherein said tube directs a high velocity, high pressure stream of air.

77. The electronic image projection system of claim 1, further comprising a spatial filter to eliminate the appearance of dead spaces.

78. The electronic image projection system of claim 77, wherein said spatial filter is positioned in the vicinity of the lens.

79. The electronic image projection system of claim 77, further comprising:
an intermediate focus lens positioned between the light valve and the projection lens to form an intermediate focus within the space between the light valve and the projection lens for spatial filtering, wherein said spatial filtering is performed before the light re-expands and passes through the projection lens.

80. The electronic image projection system of claim 77, wherein said filter is a phase filter.

81. The electronic image projection system of claim 1, further comprising wedges to create at least one extra image on the viewing area, wherein said extra image fills spaces between pixels or lines in the other image projected to the viewing area.

82. The electronic image projection system of claim 76, wherein the wedges are used to create duplicate images to fill the spaces between pixels or lines in the projected image in both the horizontal and vertical directions.

83. The electronic image projection system of claim 1, wherein white light from said source is separated into a multiplicity of colored light beams which illuminate said light valve wherein the multiplicity of colored beams are modulated with image information; and
means to recombine red, green and blue components of the beams to form full color image bearing components; and wherein said components are projected to the viewing area by the means for projecting.

84. The electronic image projection system of claim 1, wherein light from said source is separated into a multiplicity of differently colored beams which address the light valve during a first period of time;
color filters, wherein said filters are moved into a different position during a second period of time;
wherein the multiplicity of colored beams produced illuminates the light valve differently than in the first time period with the information addressing the light valve electronically selected accordingly such that the proper color of light illuminates the proper place on the light valve so that the proper information is projected to a viewing surface and the motion is repeated periodically.

85. The electronic image projection system of claim 84, wherein the image projected onto the viewing area having a plurality of segments changes at least from a first to a second to a third time segment, such that red information is displayed on one of the viewing area segments, during the first time segment, green information is displayed on said first viewing area segment during said second time segment and blue information is displayed on said first viewing area segment during the third time segment so that a full color image is perceived by the viewer without the appearance of individual red, green and blue pixel or line areas.

86. The electronic image projection system of claim 1, wherein a full color light valve forms a full color image and further comprising:
a displacing means to displace the image projected to the viewing area wherein over a period of time, red data from one image is superimposed on green data from another image which is superimposed on blue data from another image, creating the appearance of a full color image without the appearance of individual red, green and blue pixels or lines in the image.

87. The electronic image projection system of claim 86, wherein said light valve is a full color light valve, wherein a full color image is formed on said light valve and projected to said viewing area during a first segment of time;
addressing information to the light valve is altered during a second segment of time, wherein the image displayed on the full color light valve is shifted by one pixel or line;

a movable element placed after the light valve, wherein said element is shifted so as to shift the image projected on the viewing area in the opposite direction by one pixel or line during a second time period; and wherein the image is shifted on the light valve one pixel or line in the same direction it was shifted in the previous time period while the movable optical element after the light valve moves, causing the image on the screen to shift in the opposite direction one more pixel or line during a third time period, such that all three images projected onto the viewing area during the three time periods are in perfect registration, producing a full color image without the appearance of individual red, green and blue pixels or lines on the viewing area.

88. The electronic image projection system of claim 86, in which said displacing means consists of counter rotating mirrors.

89. The electronic image projection system of claim 86, in which said displacing means is an oscillating mirror.

90. The electronic image projection system of claim 86, in which said displacing means is an expandable prism which is caused to oscillate electronically.

91. The electronic image projection system of claim 1, utilizing the technique of "time share scanning" in which the image projected onto the viewing area has discrete pixels or lines and wherein different elements of the image are projected to different sections of the viewing area at different time segments.

92. The electronic image projection system of claim 91, wherein red pixels or lines projected onto the viewing area during one time period are superimposed onto green pixels or lines projected to the same viewing area during a second time period and are superimposed on blue pixels or lines projected to the same viewing area during a third time period wherein said image is a full-color image without the appearance of individual red, green and blue pixels or lines on the viewing area.

93. The electronic image projection system of claim 91, wherein said image comprises image elements and wherein a first image element is projected onto the viewing area during a first time segment; and a second image element is projected onto the same viewing area where spaces existed between image elements in the first time period to eliminate the appearance of spaces between image elements in the viewed image.

94. The electronic image projection system of claim 91, in which an image is projected onto the viewing area during a first segment of time;

a corresponding image is projected to the same viewing area but displaced slightly so that the image elements project onto the viewing area where spaces existed in the image projected to the viewing area during the first segment of time and wherein the data projected to the viewing area during the second segment of time corresponds to actual data information for the spaces between the image elements projected to the viewing area during the first period of time, causing a perceived projected image with a higher resolution than that projected onto the viewing area during any one time period.

95. The electronic image projection system of claim 91, wherein large areas within the scene that are one color appear that color over at least one-third of the image area during all time segments.

96. The electronic image projection system of claim 91, further comprising dichroic mirrors, wherein said mirrors are used to produce colored light beams which address the light valve to maximize the amount of source light in the image.

97. The electronic image projection system of claim 1, further comprising additional light valves, wherein the light valves modulate light which is subsequently projected onto the viewing area, wherein presentation of data from the multiplicity of light valves on the viewing area creates a higher resolution image than would be displayed without the multiplicity of light valves.

98. The electronic image projection system of claim 97, wherein said light valves contain spaces between pixels or lines; and wherein light valve images are caused to overlap on said viewing area, wherein information bearing pixels or lines of one light valve create an image on the viewing area which overlaps the image of the spaces between pixels or line sin the image of another light valve projected to the viewing area.

99. The electronic image projection system of claim 97, wherein the image of one light valve projected to the screen abuts the image from another light valve projected to the screen.

100. The electronic image projection system of claim 1, wherein said light valve is a single full color light valve, wherein said light valve is addressed such that each pixel on the light valve corresponds to a different pixel int he actual scene, thereby displaying information about only one color in any one pixel in the scene, instead of utilizing a triad consisting of one red, one green, and one blue pixel to represent each pixel in the scene.

101. The electronic image projection system of claim 1, wherein the light source is a microwave excited plasma.

102. The electronic image projection system of claim 1, further comprising a filter to alter color temperature of the light source to produce an improved image.

103. The electronic image projection system of claim 1, further comprising at least a second light source, wherein at least two of the light sources are used simultaneously.

104. The electronic image projection system of claim 103 wherein beams of light from the light sources used are collimated and made contiguous by at least one mirror.

105. The electronic image projection system of claim 103, wherein multiple beams from said multiple sources are collimated and made contiguous by at least one prism.

106. The electronic image projection system of claim 103, wherein said multiple beams produced by said multiple light sources are focused to adjacent areas using at least one mirror to cause the multiple beams to expand from those areas generally in the same direction.

107. The electronic image projection system of claim 103 wherein multiple beams are intercepted at least partially by mirrors so as to redistribute the light to form a single beam with a desired intensity profile.

108. The electronic image projection system of claim 1, further comprising multiple condenser paths to transmit light from the light source into the projection system.

109. The electronic image projection system of claim 108, wherein said multiple condenser paths utilize light emanating from the light source through its top as well as through its sides.

110. The electronic image projection system of claim 1, further comprising:
a condensing system to collect light from the light source, said condensing system comprising:
a spherical mirror;
a condenser lens; and
a section of a parabolic mirror surrounding the light source to collimate light which would not pass through the condenser lens.

111. The electronic image projection system of claim 1, further comprising at least another light source, wherein two or more light sources are used to form the image projected onto the viewing area.

112. The electronic image projection system of claim 111, wherein beams produced by the said two or more light sources are optically combined so that they can be used to illuminate said light valve.

113. The electronic image projection system of claim 1, comprising:
a light source;
a light collection system, wherein said collection system comprises:
an elliptical reflector around the light source;
a condenser lens to collimate light emanating from a second focus of said elliptical reflector and a second lens to capture and collimate light which misses the elliptical reflector and therefore does not pass through the condenser lens.

114. The electronic image projection system of claim 1, comprising:
a light source;
a light collection system, said collection system comprising an elliptical reflector around the light source;
a condenser lens to collimate light emanating from the second focus of the elliptical reflector and a section of a parabolic mirror to capture and collimate light which misses the elliptical mirror and therefore does not pass through the condenser lens.

115. The electronic image projection system of claim 1, further comprising:
three light valves, each of which modulated light of a different color;
a combiner cube utilized to combine the three colored images produced by the three light valves, said combiner cube having four equilateral triangular prisms whose faces are appropriately coated with dichroic coatings and said light valves all requiring input light of the same polarization; and
a halfwave plate after the light valve whose light is to be transmitted through the prism cube to maximize efficiency based on polarization produced by Brewster's angle effects.

116. The electronic image projection system of claim 115, wherein internal faces of the combiner prism cube are coated to operate as a MacNeille prism and act as analyzers for the light valves.

117. The electronic image projection system of claim 1, further comprising a light collection means, comprising:
an elliptical mirror with a light source placed at the first focus of said elliptical mirror;
a collimating lens placed at a second focus of the ellipse to focus light originating from the light source which misses the elliptical mirror; and
a collimating lens beyond the second focus of the elliptical mirror to collimate light coming from the second focus.

118. The electronic image projection system of claim 1, further comprising:
a light collection means;
said light collection means including an elliptical mirror with the light source placed at the first focus of the elliptical mirror;
a focusing lens which gathers light emanating from a second focus of the elliptical mirror and brings it to a third focus;
a second elliptical surface to capture light that missed the first elliptical surface, said second elliptical surface curved to bring light that hits it coming from the first focus of the first ellipse to the place in space where the focusing lens comes to a focus; and
a collimating lens beyond the third focus to collimate light emanating from the focusing lens and from the second elliptical surface.

119. The electronic display system according to claim 1 comprising a light source and light collection means, said light collection means consisting of a light source and a "Fresnel elliptical reflector" with the light source at the focus of the ellipse, said Fresnel elliptical reflector consisting of multiple segments of an ellipse side by side forming sawtooth surfaces, the sum of which acts like a standard elliptical reflector while the diameter of the opening at the end of the Fresnel elliptical reflector can remain smaller than the diameter of a standard elliptical reflector.

120. The electronic image projection system of claim 1, comprising a "light tunnel" at one or more points in the means for projecting to prevent light from escaping outside of the means for projecting, said light tunnel having a reflective inner surface.

121. The electronic image projection system of claim 120, wherein said light tunnel is shaped as a cylinder.

122. The electronic image projection system of claim 120, wherein said light tunnel is shaped such that its opening is rectangular.

123. The electronic image projection system of claim 1, further comprising:
a non-image concentrator wherein light sent into the connector is funneled down to an opening which is smaller than the size of the filament or arc in the light source.

124. The electronic image projection system of claim 1, wherein said light valve makes use of polarized light and further comprising:
a MacNeille prism to polarize light in the system for use by said light valve; mirrors to rotate the plane of polarization of one of the beams exiting the MacNeille prism by 90 degrees so that its new plane of polarization matches that of the second beam exiting the MacNeille prism.

125. The electronic image projection system of claim 124, wherein the two collimated beams from the MacNeille prism are made contiguous.

126. The electronic image projection system of claim 124, wherein the two beams emanating from the MacNeille prism are brought to two adjacent foci such that they then expand together, forming a single expanding beam.

127. The electronic image projection system of claim 1, further comprising:
a first beam emanating from a MacNeille prism, wherein said first beam becomes parallel to a second beam emanating from the MacNeille prism; and a halfwave plate in one of the first or second beams emanating from the MacNeille prism, wherein both beams emanating from the prism become polarized in the same plane.

128. The electronic image projection system of claim 127, wherein
the two beams emanating from the MacNeille prism are made contiguous forming a single beam; and
cylindrical lenses to readjust the aspect ratio of that new single beam.

129. The electronic image projection system of claim 1, wherein said light source is white and is split into three colored beams, wherein each of the three colored beams travels through a respective MacNeille plate for polarization and use in the means for projecting.

130. The electronic image projection system of claim 1 wherein said light valve requires polarized light; and
a "Fresnel MacNeille beam splitter," comprising:
two Fresnel prisms whose flat faces are coated with a multilayer coating necessary to form MacNeille prisms wherein said prisms are glued together along their flat surfaces to polarize light within the system for use by at least one light valve.

131. The electronic image projection system of claim 1, wherein said light valve uses polarization and wherein said means for projecting comprises lenses, wherein said lenses have sufficient focal lengths and anti-reflection coatings, wherein polarized light is not significantly depolarized by passage through lenses.

132. The electronic image projection system of claim 1,
wherein said light valve utilizes polarized light, and further comprising:
at least one MacNeille polarizing element placed in series with a conventional polarizer to produce polarized light of high purity for use by at least one light valve.

133. The electronic image projection system of claim 1, further comprising at least one lens array before the light valve, wherein said array increases the amount of light that passes through the light valve.

134. The electronic image projection system of claim 133, further comprising a second lens array, wherein said lens arrays are used before the light valve for more uniform illumination of pixel holes.

135. The electronic image projection system of claim 133, wherein said lens arrays focus an image of the light source into each pixel hole.

136. The electronic image projection system of claim 133, wherein the lenslets of the lens arrays before the light valve comprise a Galilean type of telescope so as to take the collimated light illuminating the lens arrays and shrink it to smaller collimated beams which will fit into each pixel hole.

137. The electronic image projection system of claim 1, further comprising:
fiber optics in a bundle, wherein one end of the bundle receives the illuminating light from the light source; and another end of the bundle is arranged such that one fiber is adjacent to each pixel hole and is substantially the same size as a pixel hole to direct the light into the pixel holes.

138. The electronic image projection system of claim 1, wherein said light source is voltage or current controlled to allow the alteration of brightness and/or color temperature of the image projected.

139. The electronic image projection system of claim 1, further comprising a wireless transmission system to connect an output of an audio amplifier in the system to speakers and amplifiers.

140. The electronic image projection system of claim 1, further comprising a wireless transmission system capable of receiving video from a small transmitter connected to a cable box or VCR, wherein said box or VCR will send a video signal to the projection system.

141. The electronic image projection system of claim 1, further comprising a video cassette player.

142. The electronic image projection system of claim 1, further comprising a computer.

143. The electronic display system according to claim 1 comprising a light source and light collection means, said light collection means consisting of a light source and a "Fresnel parabolic reflector" with the light source at the focus of the parabola, said Fresnel parabolic reflector consisting of multiple segments of a parabola side by side forming sawtooth surfaces, the sum of which acts like a standard parabolic reflector while the diameter of the opening at the end of the Fresnel parabolic reflector can remain smaller than the diameter of a standard parabolic reflector.

144. An electronic image projection system, comprising:
a light source;
a light valve means having a plurality of pixels or lines arranged in a matrix for forming a black and white image, said light valve means including one of:
a single light valve having perceived dead spaces caused by presence of relatively darker pixels or lines adjacent to relatively lighter pixels or lines and real dead spaces between pixels or lines defined by actual non-information bearing spaces between pixels or lines; and
a plurality of light valves having at least one of real dead spaces between pixels or lines defined by actual non-information bearing spaces between pixels or lines and perceived dead spaces caused by presence or relatively darker pixels or lines adjacent to relatively lighter pixels or lines;
a solid state pixel or line storage element associated with each pixel or line for storing a respective pixel or line control signal;
control means associated with said solid state pixel or line storage elements for controlling the operation thereof, said control means, pixel or line storage elements and light valve forming an active matrix light valve; and
means for projecting the image formed by said light valve onto a viewing area; and
means to substantially eliminate perception of perceived dead spaces and real dead spaces between pixels or lines in the image projected by the signals light valve and to substantially eliminate perception of at least one of real dead spaces between pixels or lines and perceived dead spaces in the image projected by the plurality of light valves.

145. An electronic image projection system comprising:
a light source;
a light valve means having a plurality of pixels or lines arranged in a matrix for forming an image, said light valve means including one of:
a single light valve having perceived dead spaces caused by presence of relatively darker pixels or lines adjacent to relatively lighter pixels or lines and real dead spaces between pixels or lines defined by actual non-information bearing spaces between pixels or lines; and a plurality of light valves having at least one of real dead spaces between pixels or lines defined by actual non-information bearing spaces between pixels or lines and perceived dead spaces caused by presence of relatively darker pixels or lines adjacent to relatively lighter pixels or lines;

a solid state pixel or line storage element associated with each pixel or line for storing a respective pixel or line control signal;

control means associated with said solid state pixel or line storage elements for controlling the operation thereof, said control means, pixel or line storage elements and light valve forming an active matrix light valve; and means for projecting the image formed by said light valve onto a viewing area; and means to substantially eliminate perception of perceived dead spaces and real dead spaced between pixels or lines in the image projected by the single light valve and to substantially eliminate perception of at least one of real dead spaces between pixels or lines and perceived dead spaces in the image projected by the plurality of light valves such that all or part of pixel or line images are duplicated.

146. An electronic image projection system, comprising:

a light source;

a light valve means having a plurality of pixels or lines arranged in a matrix for forming an image, said light valve means including one of:

a single light valve having perceived dead spaces caused by presence of relatively darker pixels or lines adjacent to relatively lighter pixels or lines and real dead spaces between pixels or lines defined by actual non-information bearing spaces between pixels or lines; and a plurality of light valves having at least one of real dead spaces between pixels or lines defined by actual non-information bearing spaces between pixels or lines and perceived dead spaces caused by presence of relatively darker pixels or lines adjacent to relatively lighter pixels or lines;

a solid state pixel or line storage element associated with each pixel or line for storing a respective pixel or line control signal;

control means associated with said solid state pixel or line storage elements for controlling the operation thereof, said control means, pixel or line storage elements and light valve forming an active matrix light valve; and means for projecting the image formed by said light valve onto a viewing area; and means to substantially eliminate perception of perceived dead spaces and real dead spaces between pixels or lines in the image projected by the single light valve and to substantially eliminate perception of at least one of real dead spaces between pixels or lines and perceived dead spaces in the image projected by the plurality of light valves.

147. An electronic image projection system, comprising:

a light source;

a light valve means having a plurality of pixels or lines arranged in a matrix for forming an image, said light valve means including one of:

a single light valve having perceived dead spaces caused by presence of relatively darker pixels or lines adjacent to relatively lighter pixels or lines and real dead spaces between pixels or lines defined by actual non-information bearing spaces between pixels or lines; and a plurality of light valves having at least one of real dead spaces between pixels or lines defined by actual non-information bearing spaces between pixels or lines and perceived dead spaces caused by presence of relatively darker pixels or lines adjacent to relatively lighter pixels or lines;

a solid state pixel or line storage element associated with each pixel or line for storing a respective pixel or line control signal;

control means associated with said solid state pixel or line storage elements for controlling the operation thereof, said control means, pixel or line storage elements and light valve forming an active matrix light valve;

means for projecting the image forming by said light valve onto a viewing area;

means to substantially eliminate perception of perceived dead spaces and real dead spaces between pixels or lines in the image projected by the single light valve and to substantially eliminate perception of at least one of real dead spaces between pixels or lines and perceived dead spaces in the image projected by the plurality of light valves such that pixel or line images are expanded.

148. An electronic image projection system, comprising:

a light source;

a light valve means having a plurality of pixels or lines arranged in a matrix for forming a black and white image;

a single light valve having perceived dead spaces caused by presence of relatively darker pixels or lines adjacent to relatively lighter pixels or lines and real dead spaces between pixels or lines defined by actual non-information bearing spaces between pixels or lines; and a plurality of light valves having at least one of real dead spaces between pixels or lines defined by non-information bearing spaces between pixels or lines and perceived dead spaces caused by presence of relatively darker pixels or lines adjacent to relatively lighter pixels or lines;

a solid state pixel storage element associated with each pixel or line for storing a respective pixel or line control signal;

control means associated with said solid state pixel or line storage elements for controlling the operation thereof, said control means, pixel or line storage elements and light valve forming an active matrix light valve;

means for projecting the image formed by said light valve onto a viewing area;

means to substantially eliminate perception of perceived dead spaces and real dead spaces between pixels or lines in the image projected by the single light valve and to substantially eliminate perception of at least one of real dead spaces between pixels or lines and perceived dead spaces in the image projected by the plurality of light valves such that all or part of the pixel or line images are duplicated.

149. An electronic image projection system, comprising:
- a light source;
- a light valve means having a plurality of pixels or lines arranged in a matrix for forming a black and white image, said light valve means including one of:
- a single light valve having perceived dead spaces caused by presence of relatively darker pixels or lines adjacent to relatively lighter pixels or lines and real dead spaces between pixels or lines defined by actual non-information bearing spaces between pixels or lines; and
- a plurality of light valves having at least one of real dead spaces between pixels or lines defined by actual non-information bearing spaces between pixels or lines and perceived dead spaces caused by presence of relatively darker pixels or lines adjacent to relatively lighter pixels or lines;
- a solid state pixel or line storage element associated with each pixel or line for storing a respective pixel or line control signal;
- control means associated with said solid state pixel or line storage elements for controlling the operation thereof, said control means, pixel or line storage elements and light valve forming an active matrix light valve; and
- means for projecting the image formed by said light valve onto a viewing area;
- means to substantially eliminate perception of perceived dead spaces and real dead spaces between pixels or lines in the image projected by the single light valve and to substantially eliminate perception of at least one of real dead spaces between pixels or lines and perceived dead spaces in the image projected by the plurality of light valves such that all or part of said pixels or lines are expanded.

150. A display system comprising an optical means for superimposing the red, green and blue components of a produced image to form a full color image with absence of apparent dots, lines or pixels.

151. A video display system of claim 150 in which the display consists of a CRT.

152. A display system of claim 150 in which the display includes a plasma display.

153. A display system of claim 150 in which the display system includes an electroluminescent display.

154. A display system of claim 150 in which the system includes projection.

155. The electronic image projection system of claim 150, further comprising a lens array to create real images of at least two differently colored pixels or lines from the image to be projected; and wherein said means for projecting includes a projection lens, wherein said lens produces an image of the image plane of the system and blurring the real images of the colored pixels or lines produced by the lens array.

156. The electronic image projection system of claim 155, wherein said lens arrays comprise spherical lenses.

157. The electronic image projection system of claim 155, wherein said lens arrays consist of cylindrical lenses.

158. The electronic image projection system of claim 155, wherein said lens arrays are comprised of lenslets and wherein there are more lenslets in the lens array than there are pixels or lines in the image.

159. The electronic image projection system of claim 155, further comprising a lens array, wherein said lens array is used to focus images of individual colored pixels or lines; and
wedges, wherein some of the pixel images are made to overlap other pixel images.

160. An electronic image display system, comprising:
means for producing an image comprising pixels or lines, wherein said means for producing comprises one of:
- a single image forming means having perceived dead spaces caused by presence of relatively darker pixels or lines adjacent to relatively lighter pixels or lines and real dead spaces between pixels or lines defined by actual non-information bearing spaces between pixels or lines; and
- a plurality of image forming means having at least one of real dead spaces between pixels or lines defined by actual non-information bearing spaces between pixels or lines and perceived dead spaces caused by presence of relatively darker pixels or lines adjacent to relatively lighter pixels or lines; and
means to substantially eliminate perception of perceived spaces and real dead spaces between pixels or lines in the image.

161. The electronic image projection system of claim 160 wherein the image comprises red, green and blue pixels or lines; and means to superimpose corresponding red, green and blue pixels or lines so as to create a full color image without the appearance of individual red, green and blue pixels or lines.

162. The electronic image projection system of claim 1, further comprising a lens array to create real images of at least 2 differently colored pixels or lines from the image to be projected; and wherein said means for projecting includes a projection lens, wherein said lens produces an image of the image plane of the system and blurring the real images of the colored pixels or lines produced by the lens array.

163. The electronic image projection system of claim 162, wherein said lens arrays comprise spherical lenses.

164. The electronic image projection system of claim 162, wherein said lens arrays comprise cylindrical lenses.

165. The electronic image projection system of claim 162, wherein said lens arrays are comprised of lenslets and wherein there are more lenslets in the lens array than there are pixels or lines in the image.

166. The electronic image projection system of claim 1, further comprising lens arrays to eliminate the appearance of red, green and blu pixel or lines oin the image.

167. The electronic image projection system of claim 1, further comprising a lens array, wherein said array contains more lenslets than there are pixels or lines in the image to be displayed; and a second lens array comprising lenslets wherein said second array creates individual pixel or line images that do not display individual red, green and blue pixels or lines or components within any pixel or line image created by any lenslet of the second lens array.

168. The electronic image projection system of claim 1, further comprising a lens array, wherein said lens array is used to focus images of individual colored pixels or lines; and
wedges, wherein some of the pixel images are made to overlap other pixel images.

* * * * *